(12) United States Patent
Beaston

(10) Patent No.: US 9,882,401 B2
(45) Date of Patent: Jan. 30, 2018

(54) BATTERY ENERGY STORAGE SYSTEM

(71) Applicant: Powin Energy Corporation, Tualatin, OR (US)

(72) Inventor: Virgil Lee Beaston, Tualatin, OR (US)

(73) Assignee: Powin Energy Corporation, Tualatin, OR (US)

( * ) Notice: Subject to any disclaimer, the term of this patent is extended or adjusted under 35 U.S.C. 154(b) by 162 days.

(21) Appl. No.: 14/932,688

(22) Filed: Nov. 4, 2015

(65) Prior Publication Data

US 2017/0126032 A1     May 4, 2017

(51) Int. Cl.
*H02J 7/00*     (2006.01)
*H01M 10/42*    (2006.01)

(52) U.S. Cl.
CPC ....... *H02J 7/0022* (2013.01); *H01M 10/4207* (2013.01); *H02J 7/0026* (2013.01); *H02J 7/0047* (2013.01); *H02J 7/0068* (2013.01)

(58) Field of Classification Search
CPC ...... H02J 7/0022; H02J 7/0047; H02J 7/0068; H02J 7/0026; H01M 10/4207
USPC .......................................................... 320/128
See application file for complete search history.

(56) References Cited

U.S. PATENT DOCUMENTS

| 5,952,815 | A | 9/1999 | Rouillard et al. |
| 6,172,481 | B1 | 1/2001 | Curtiss |
| 7,497,285 | B1 | 3/2009 | Radev |
| 7,583,053 | B2 | 9/2009 | Kamohara |
| 8,111,035 | B2 | 2/2012 | Rosenstock |
| 9,168,836 | B2 | 10/2015 | Jacobsen |
| 9,331,497 | B2* | 5/2016 | Beaston ............ H01M 10/4207 |
| 9,647,463 | B2 | 5/2017 | Brandl et al. |
| 2004/0189248 | A1* | 9/2004 | Boskovitch ......... B60L 11/1851 320/116 |
| 2005/0024016 | A1 | 2/2005 | Breen et al. |
| 2005/0230976 | A1 | 10/2005 | Yang |
| 2006/0116797 | A1 | 6/2006 | Moran |
| 2007/0124037 | A1 | 5/2007 | Moran |
| 2007/0191180 | A1 | 8/2007 | Yang |
| 2008/0093851 | A1 | 4/2008 | Maeda et al. |
| 2008/0309288 | A1 | 12/2008 | Benckenstein et al. |
| 2009/0222158 | A1 | 9/2009 | Kubota et al. |
| 2009/0243540 | A1 | 10/2009 | Choi et al. |
| 2010/0145562 | A1 | 6/2010 | Moran |
| 2010/0237829 | A1 | 9/2010 | Tatebayashi et al. |

(Continued)

FOREIGN PATENT DOCUMENTS

| CN | 1367565 A | 9/2002 |
| CN | 2648617 Y | 10/2004 |

(Continued)

OTHER PUBLICATIONS

Notice of Allowance dated Mar. 21, 2016, in U.S. Appl. No. 13/978,689, filed Aug. 27, 2013; 8 pages.

(Continued)

*Primary Examiner* — M'Baye Diao
(74) *Attorney, Agent, or Firm* — Sterne, Kessler, Goldstein & Fox P.L.L.C.

(57) ABSTRACT

Embodiments disclosed herein relate to a battery energy storage system (BESS) that can be used to store energy that is produced by conventional sources (e.g., coal, gas, nuclear) as well as renewable sources (e.g., wind, solar), and provide the stored energy on-demand.

18 Claims, 37 Drawing Sheets

(56) References Cited

U.S. PATENT DOCUMENTS

| | | |
|---|---|---|
| 2010/0248008 A1 | 9/2010 | Sugawara et al. |
| 2011/0014501 A1 | 1/2011 | Scheucher |
| 2011/0133920 A1 | 6/2011 | Meadors |
| 2011/0137502 A1 | 6/2011 | Kato et al. |
| 2011/0231049 A1 | 9/2011 | Le Brusq et al. |
| 2011/0244283 A1 | 10/2011 | Seto et al. |
| 2011/0313613 A1 | 12/2011 | Kawahara et al. |
| 2012/0062187 A1 | 3/2012 | Shim |
| 2012/0068715 A1 | 3/2012 | Martaeng |
| 2012/0074911 A1* | 3/2012 | Murao .................. H02J 7/0014 320/134 |
| 2012/0105001 A1 | 5/2012 | Gallegos et al. |
| 2012/0303225 A1 | 11/2012 | Futahashi et al. |
| 2013/0328530 A1 | 12/2013 | Beaston |
| 2013/0337299 A1 | 12/2013 | Sugawara |
| 2014/0015469 A1 | 1/2014 | Beaston et al. |
| 2014/0015488 A1 | 1/2014 | Despesse |
| 2014/0079963 A1 | 3/2014 | Takeuchi |
| 2014/0220396 A1 | 8/2014 | Lee et al. |
| 2014/0312828 A1* | 10/2014 | Vo ..................... H01M 10/4257 320/103 |
| 2015/0349569 A1 | 12/2015 | Christensen et al. |
| 2016/0111900 A1 | 4/2016 | Beaston et al. |
| 2016/0141894 A1 | 5/2016 | Beaston |
| 2017/0038433 A1 | 2/2017 | Beaston et al. |
| 2017/0040646 A1 | 2/2017 | Beaston |
| 2017/0077558 A1 | 3/2017 | Nystrom et al. |
| 2017/0077559 A1 | 3/2017 | Beaston |
| 2017/0106764 A1 | 4/2017 | Beaston et al. |

FOREIGN PATENT DOCUMENTS

| | | |
|---|---|---|
| CN | 2796215 Y | 7/2006 |
| CN | 1819395 A | 8/2006 |
| CN | 1011992755 A | 6/2008 |
| CN | 101222150 A | 7/2008 |
| CN | 102570568 A | 7/2012 |
| CN | 102882263 A | 1/2013 |
| CN | 202663154 U | 1/2013 |
| CN | 103253143 A | 8/2013 |
| WO | WO 2012/110497 A1 | 8/2012 |

OTHER PUBLICATIONS

U.S. Appl. No. 15/389,188, "Battery Pack Monitoring and Warranty System," to Beaston et al., filed Dec. 22, 2016.
U.S. Appl. No. 15/604,329, "World-Wide Web of Networked, Smart, Scalable, Plug & Play Battery Packs Having a Battery Pack Operating System, and Applications Thereof," to Beaston, filed May 24, 2017.
https://www.merriam-webster.com/dictionary/daisy%20chain.
Chris Bakken and Ives Meadors, applicants; U.S. Appl. No. 61/313,548; publicly available as of Jun. 9, 2011 (filed Mar. 12, 2010); 14 pages including filing receipt, provisional cover sheet, and EFS receipt.
English language abstract of Chinese Patent Publication No. CN 101222150 A, published Jul. 16, 2008, 1 page, retrieved from https://worldwide.espacenet.com.
English language abstract of Chinese Patent Publication No. CN 102570568 A, published Jul. 11, 2012, 1 page, retrieved from https://worldwide.espacenet.com.
English language abstract of Chinese Patent Publication No. CN 102882263 A, published Jan. 16, 2013, 1 page, retrieved from https://worldwide.espacenet.com.
English language abstract of Chinese Patent Publication No. CN 103253143 A, published Aug. 21, 2013, 1 page, retrieved from https://worldwide.espacenet.com.
English language abstract of Chinese Patent Publication No. CN 202663154 U, published Jan. 9, 2013, 1 page, retrieved from https://worldwide.espacenet.com.
Non-Final Office Action dated May 12, 2015, in U.S. Appl. No. 13/978,689, filed Aug. 27, 2013; 12 pages.
Final Office Action dated Sep. 21, 2015, in U.S. Appl. No. 13/978,689, filed Aug. 27, 2013; 12 pages.
Non-Final Office Action dated Nov. 23, 2015, in U.S. Appl. No. 13/978,689, filed Aug. 27, 2013; 11 pages.
International Preliminary Report on Patentability, dated Sep. 10, 2013, in International Patent Application No. PCT/CN2011/071548; 5 pages.
International Search Report and Written Opinion on Patentability, dated Dec. 1, 2011, in International Patent Application No. PCT/CN2011/071548; 10 pages.
U.S. Appl. No. 14/678,074, "-Electrical Energy Storage Unit and Control System and Applications Thereof," to Beaston, et al., filed Apr. 3, 2015.
U.S. Appl. No. 14/851,482, "Battery Pack with Integrated Battery Management System," to Beaston, et al., filed Sep. 11, 2015.
U.S. Appl. No. 14/851,460, "Battery Management System (BMS) Having Isolated, Distributed, Daisy-Chained Battery Module Controllers," to Nystrom, et al., filed Sep. 11, 2015.

* cited by examiner

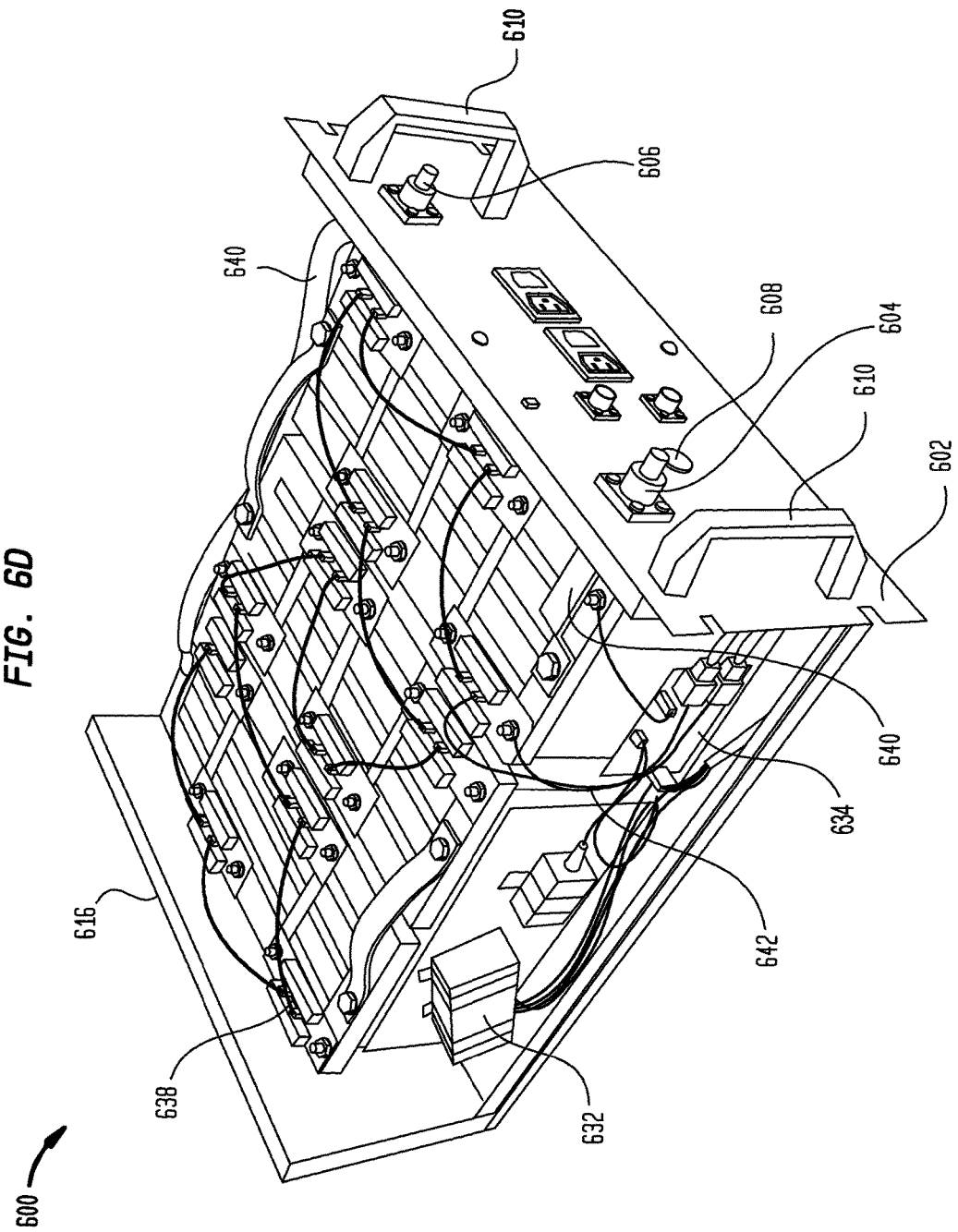

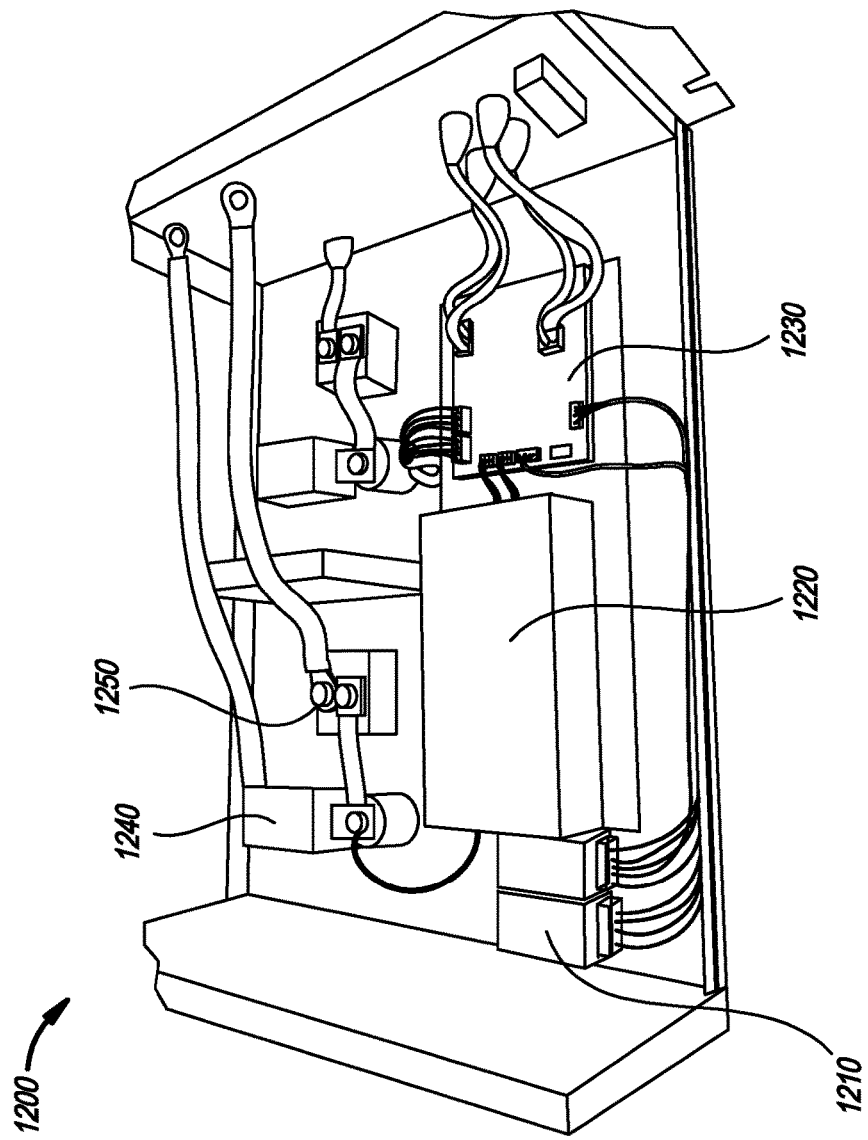

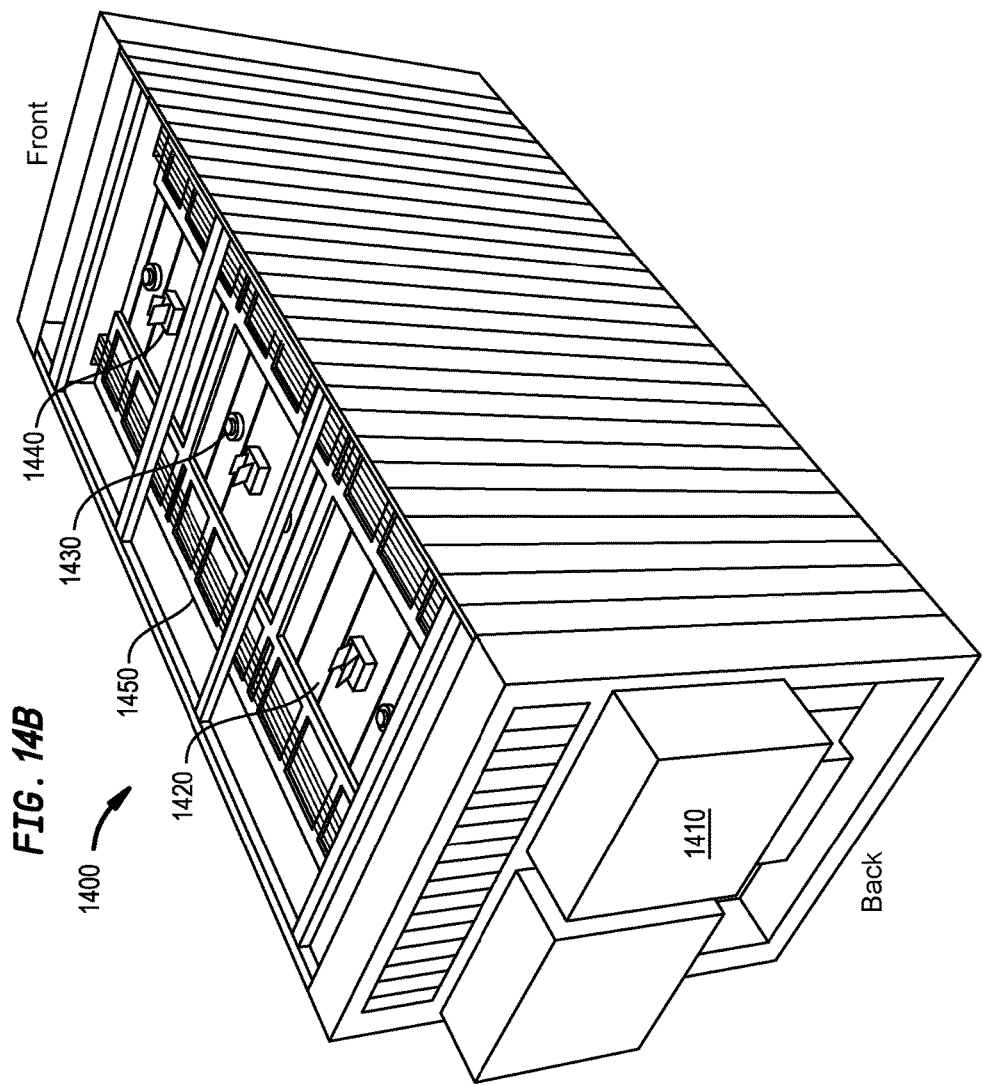

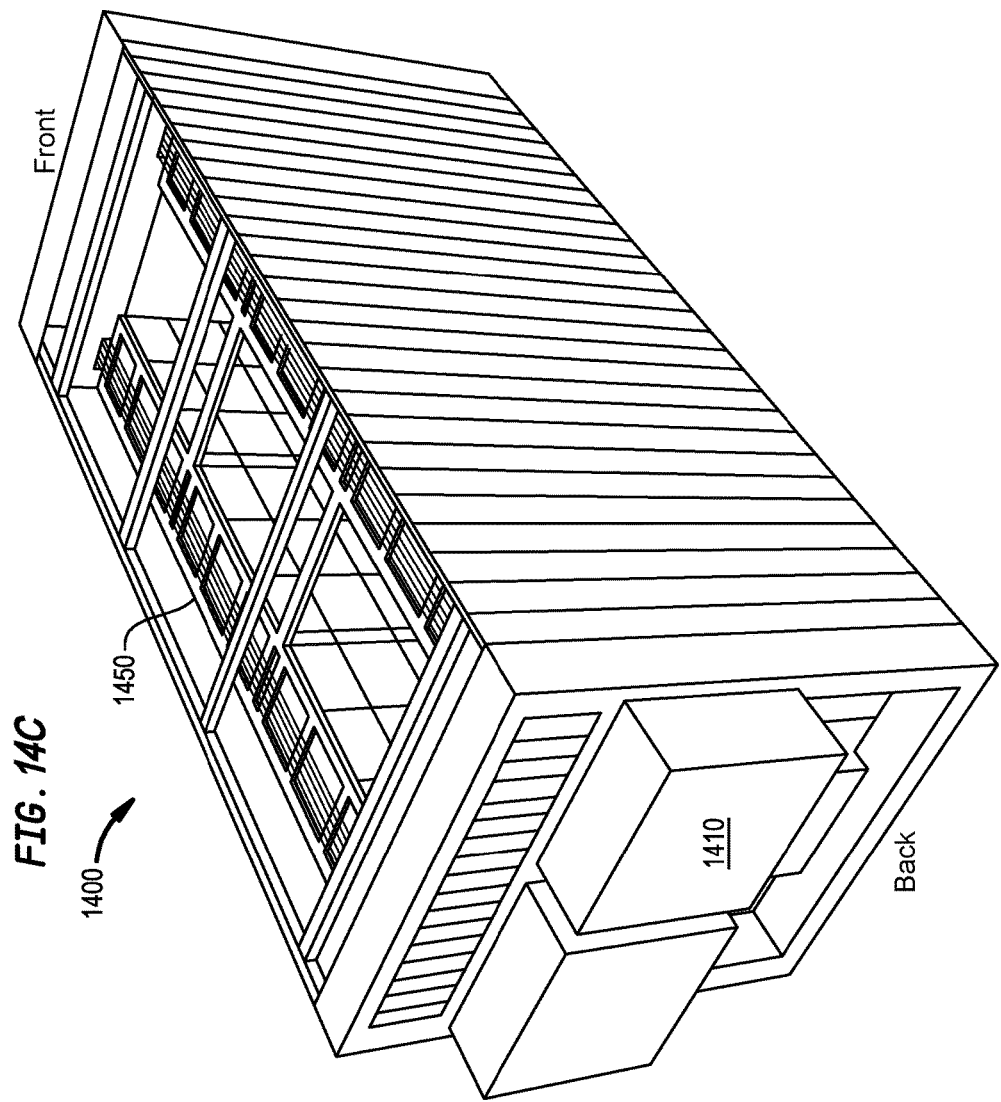

BATTERY ENERGY STORAGE SYSTEM

BACKGROUND

Field

Embodiments disclosed herein relate to a battery energy storage system (BESS) that can be used to store energy that is produced by conventional sources (e.g., coal, gas, nuclear) as well as renewable sources (e.g., wind, solar), and provide the stored energy on-demand.

Background

Electrical energy is vital to modern national economies. Increasing electrical energy demand and a trend towards increasing the use of renewable energy assets to generate electricity, however, are creating pressures on aging electrical infrastructures that have made them more vulnerable to failure, particularly during peak demand periods. In some regions, the increase in demand is such that periods of peak demand are dangerously close to exceeding the maximum supply levels that the electrical power industry can generate and transmit. New energy storage systems, methods, and apparatuses that allow electricity to be generated and used in a more cost effective and reliable manner are described herein.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 6A, 6B, 6C, and 6D are diagrams illustrating an example battery pack.

Figure 7A:
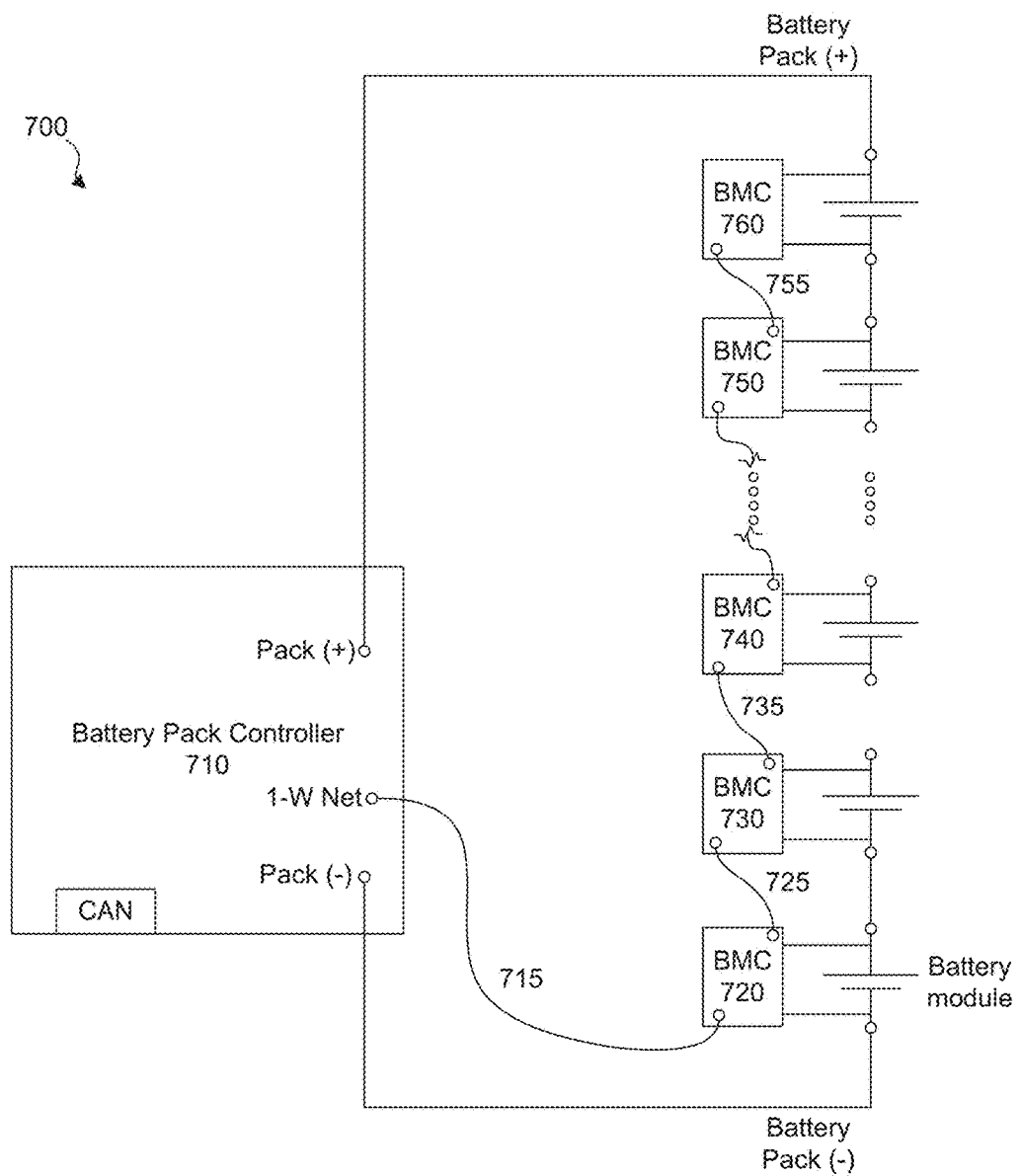

FIG. 7A is a diagram illustrating an example communication network formed by a battery pack controller and a plurality of battery module controllers.

Figure 7B:
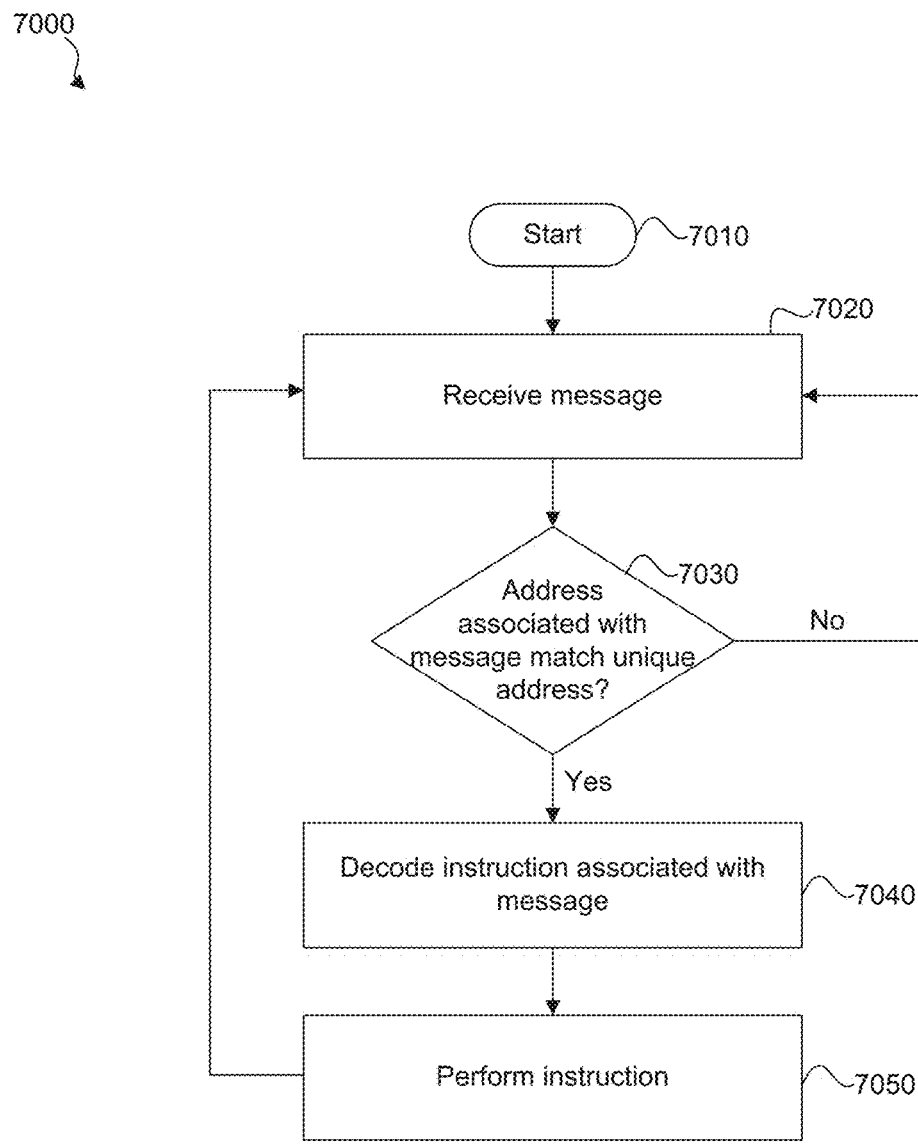

FIG. 7B is a flow diagram illustrating an example method for receiving instructions at a battery module controller.

Figure 8:
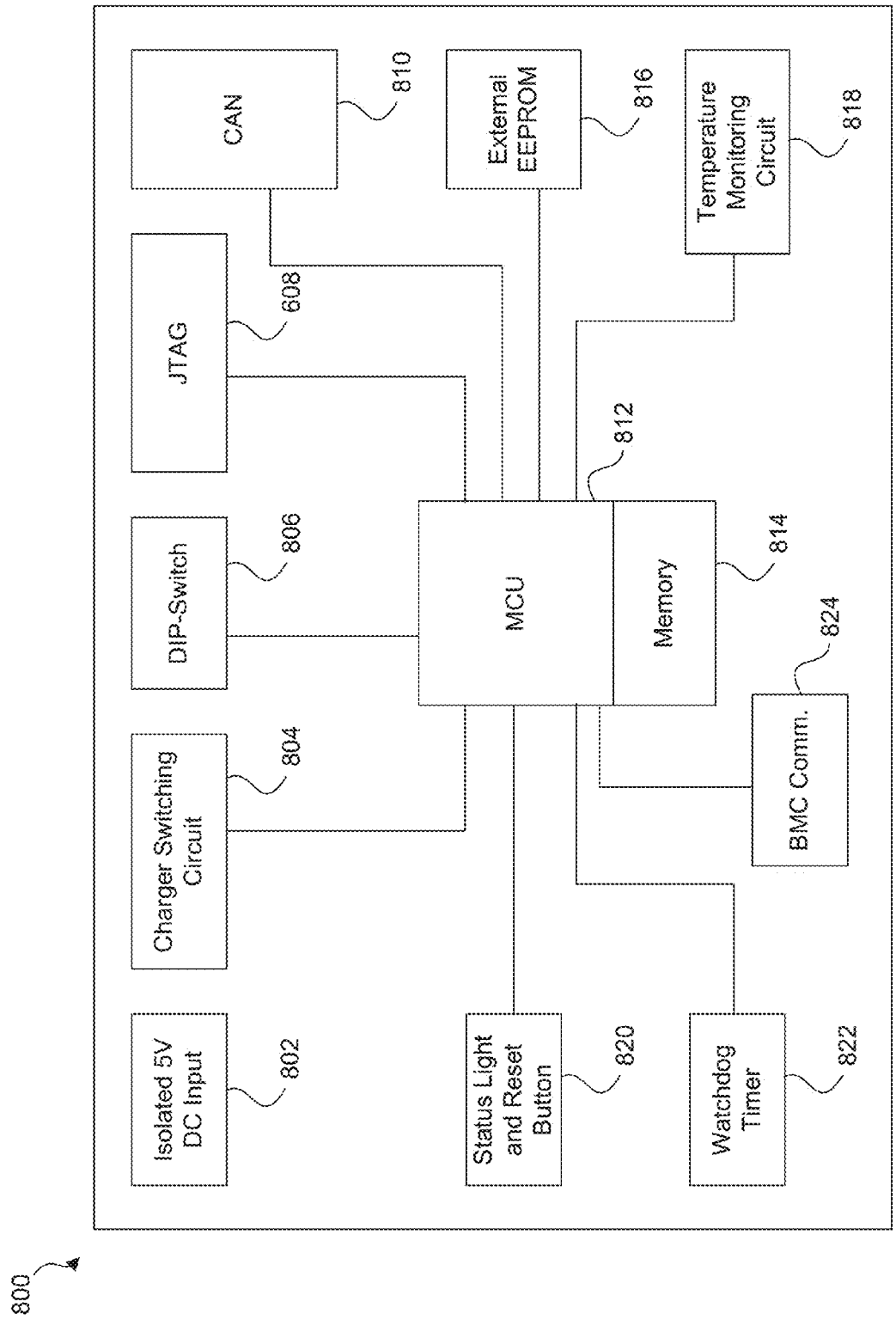

FIG. 8 is a diagram illustrating an example battery pack controller.

Figure 9:
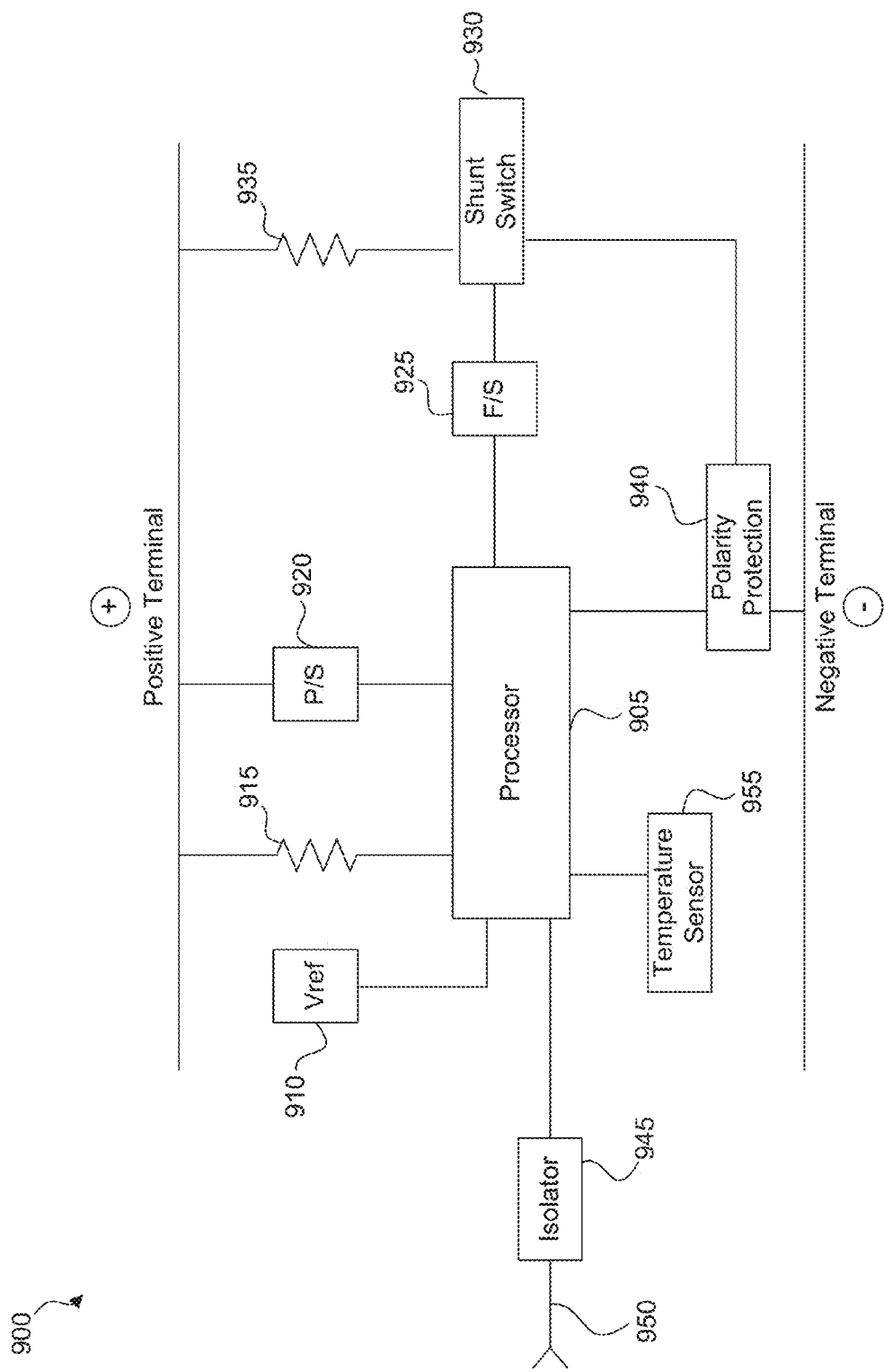

FIG. 9 is a diagram illustrating an example battery module controller.

Figure 10:
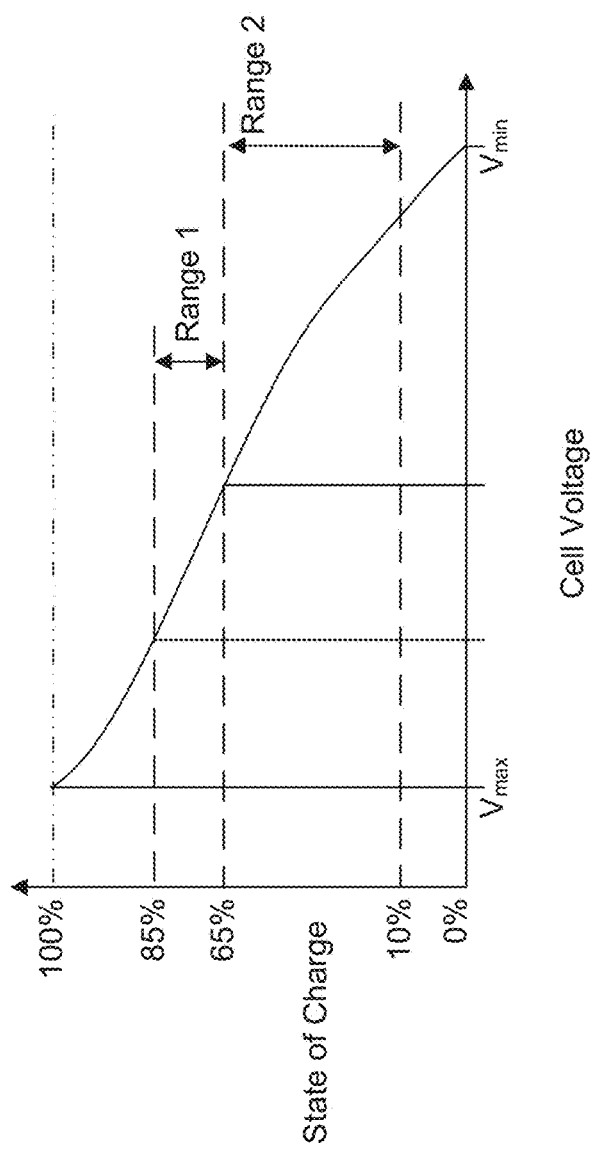

FIG. 10 is a graph illustrating state of charge (SOC) verses output voltage for an example battery pack.

Figure 11:
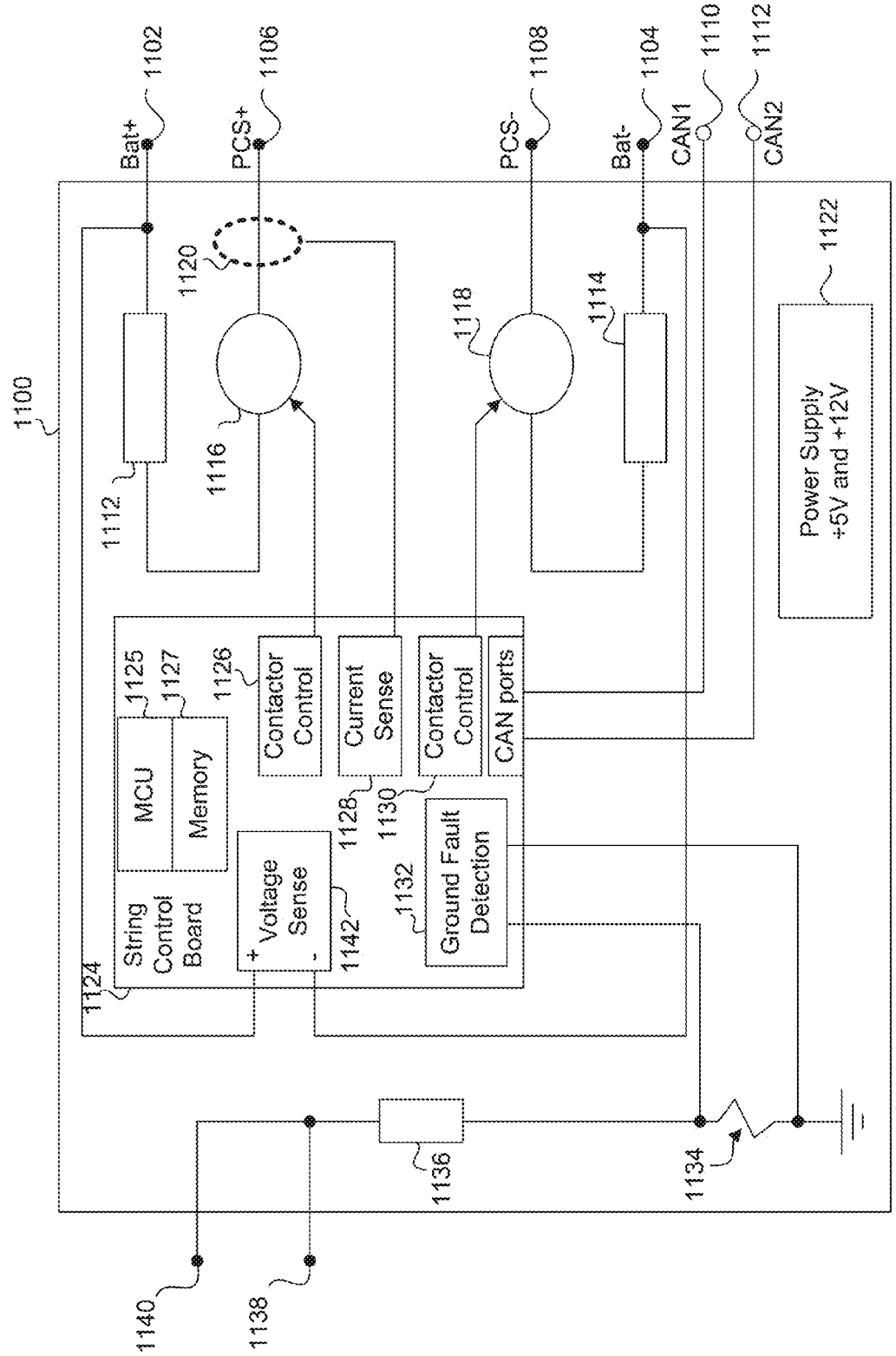

FIG. 11 is a diagram illustrating an example string controller.

Figure 12B:
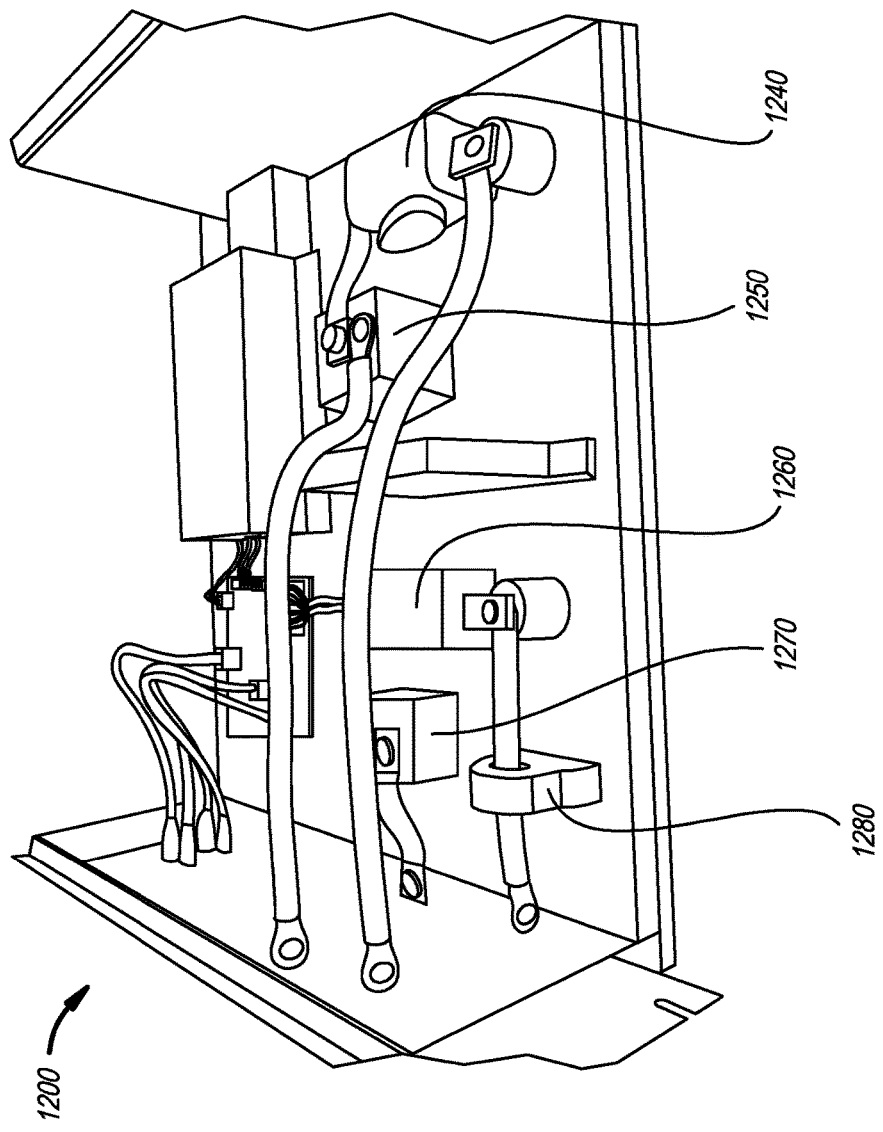

FIGS. 12A and 12B are diagrams illustrating an example string controller.

Figure 13:
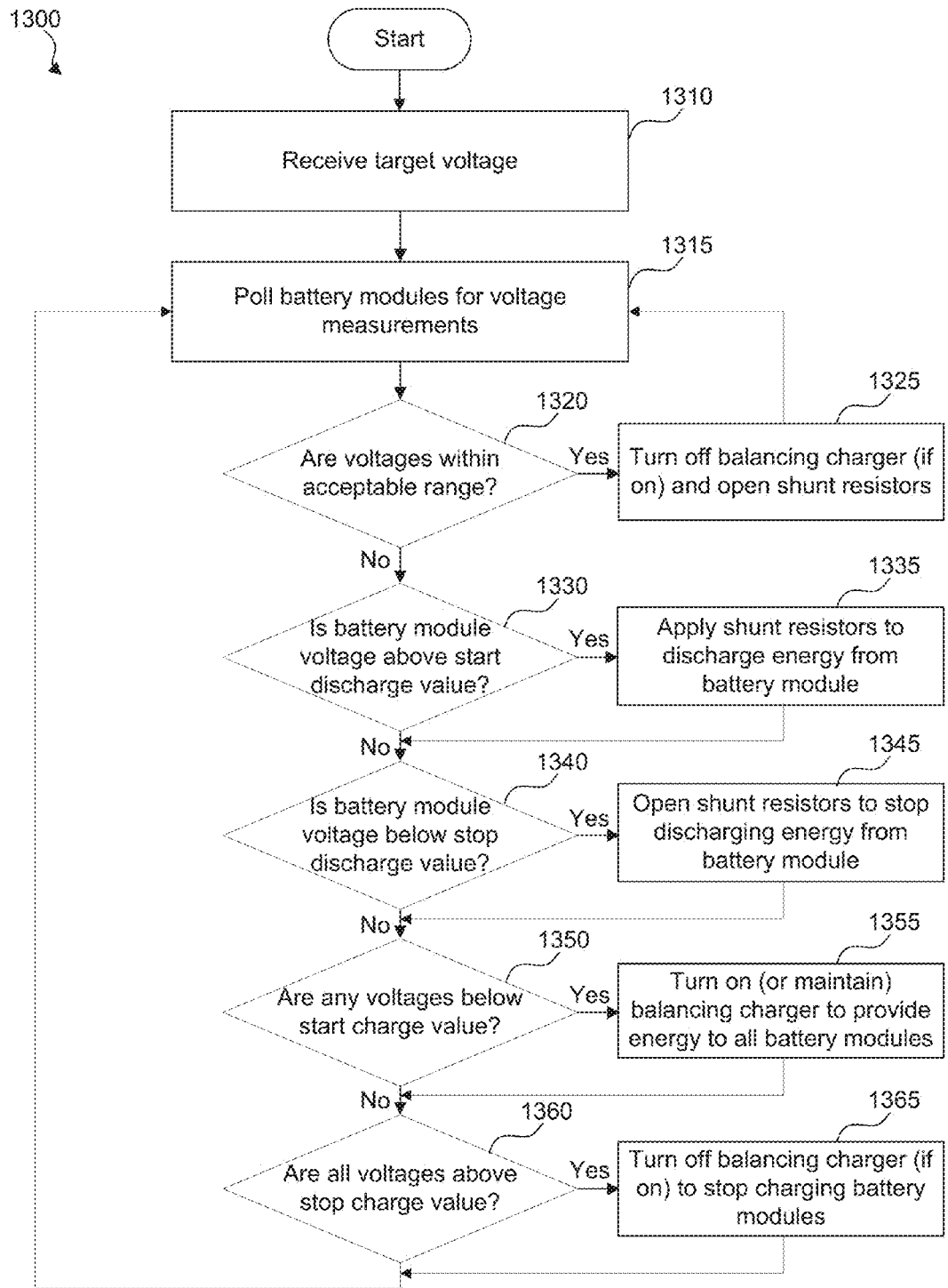

FIG. 13 is a flow diagram illustrating an example method for balancing a battery pack.

Figure 14A:
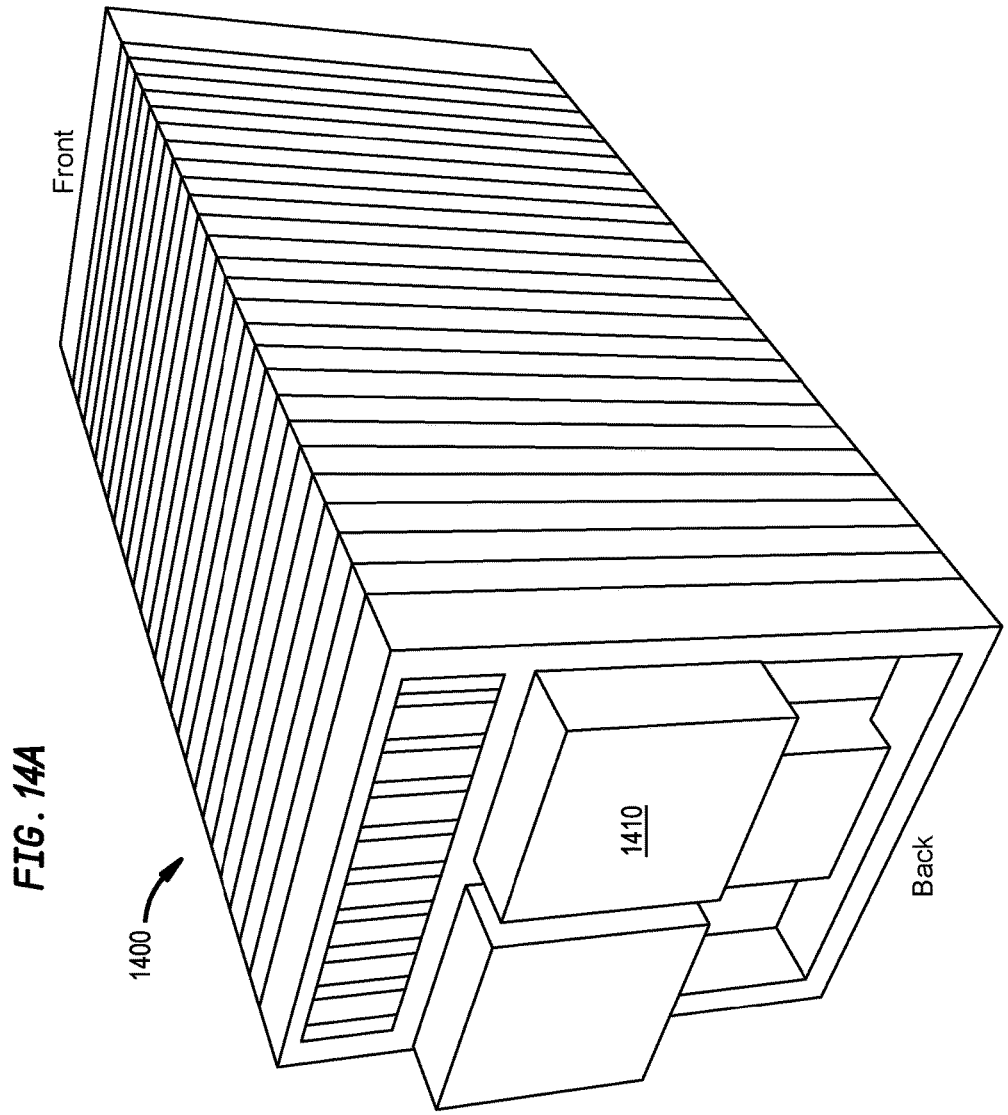

FIGS. 14A, 14B, and 14C are diagrams illustrating the housing of an example BESS.

Figure 15B:
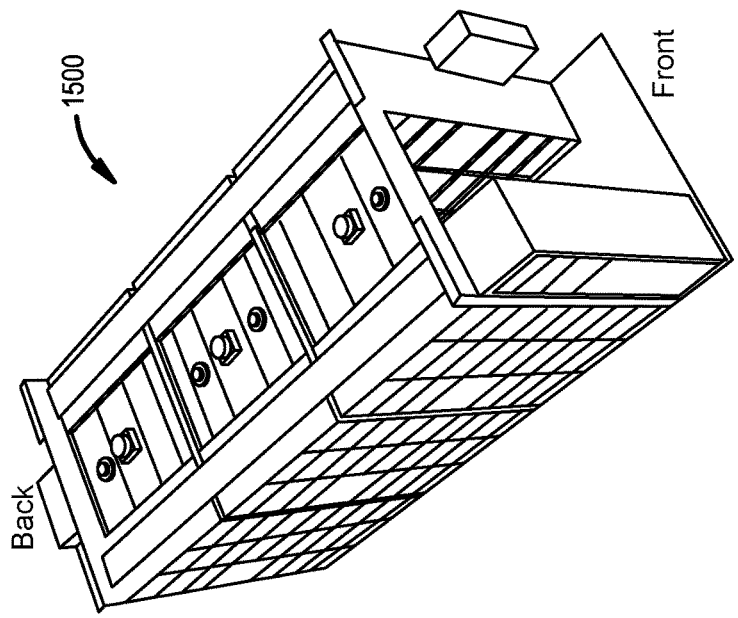
Figure 15A:
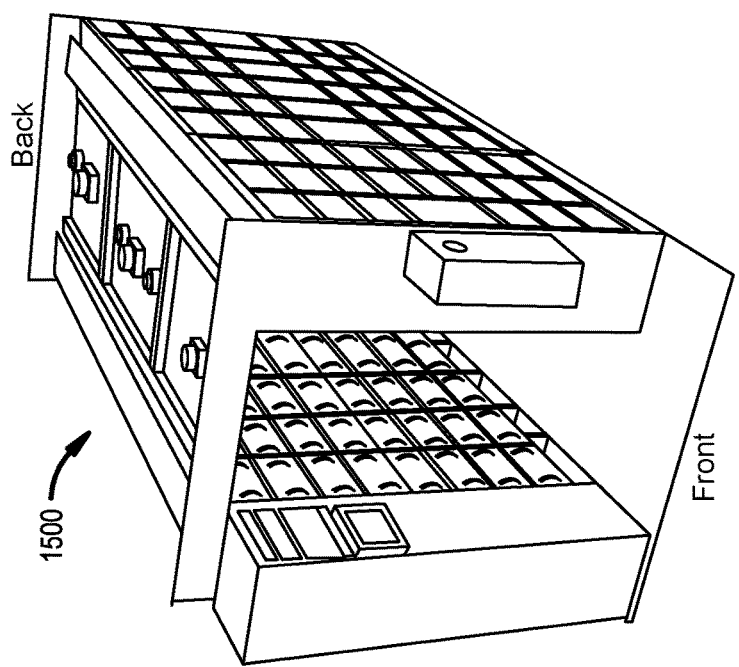
Figure 15C:
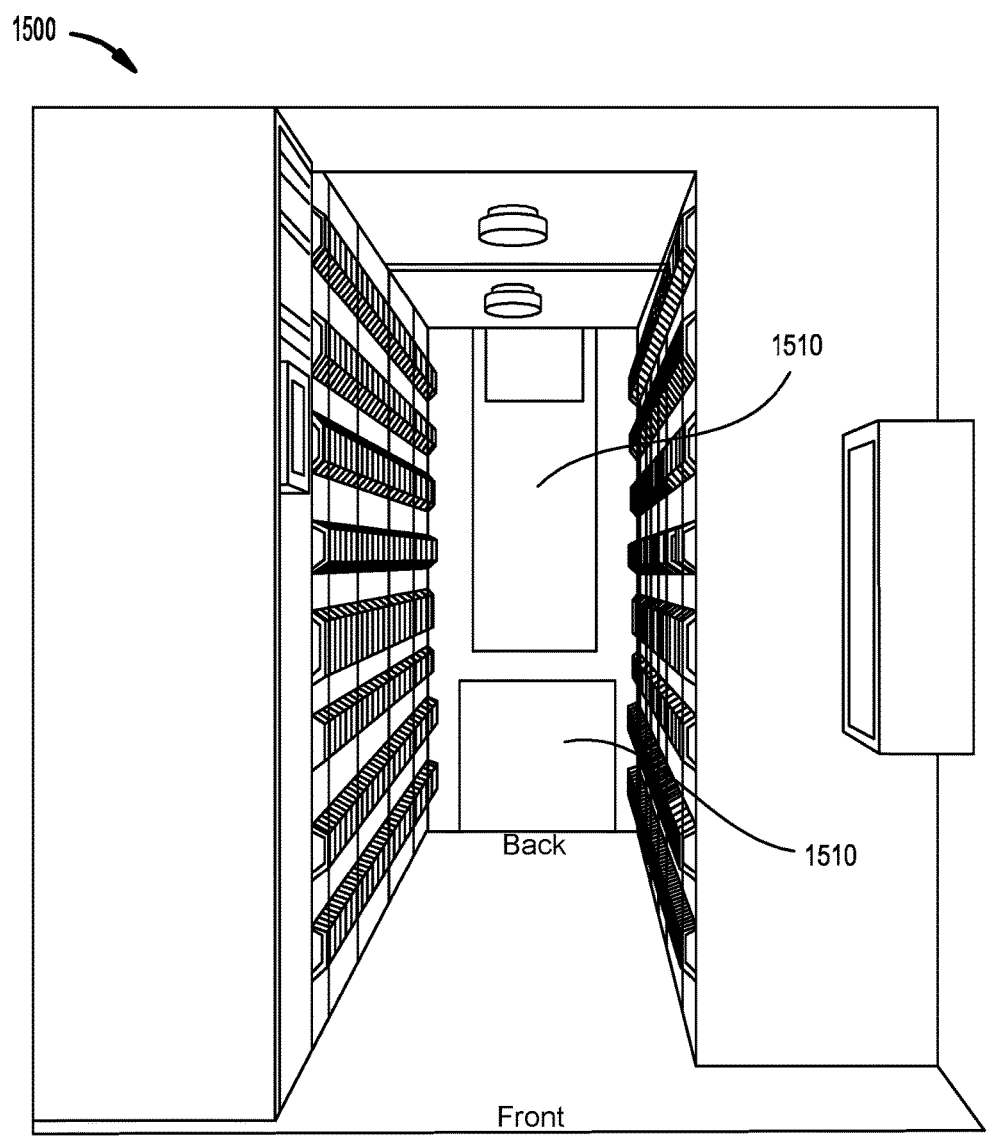

FIGS. 15A, 15B, and 15C are diagrams illustrating an example BESS with its housing removed.

Figure 16:
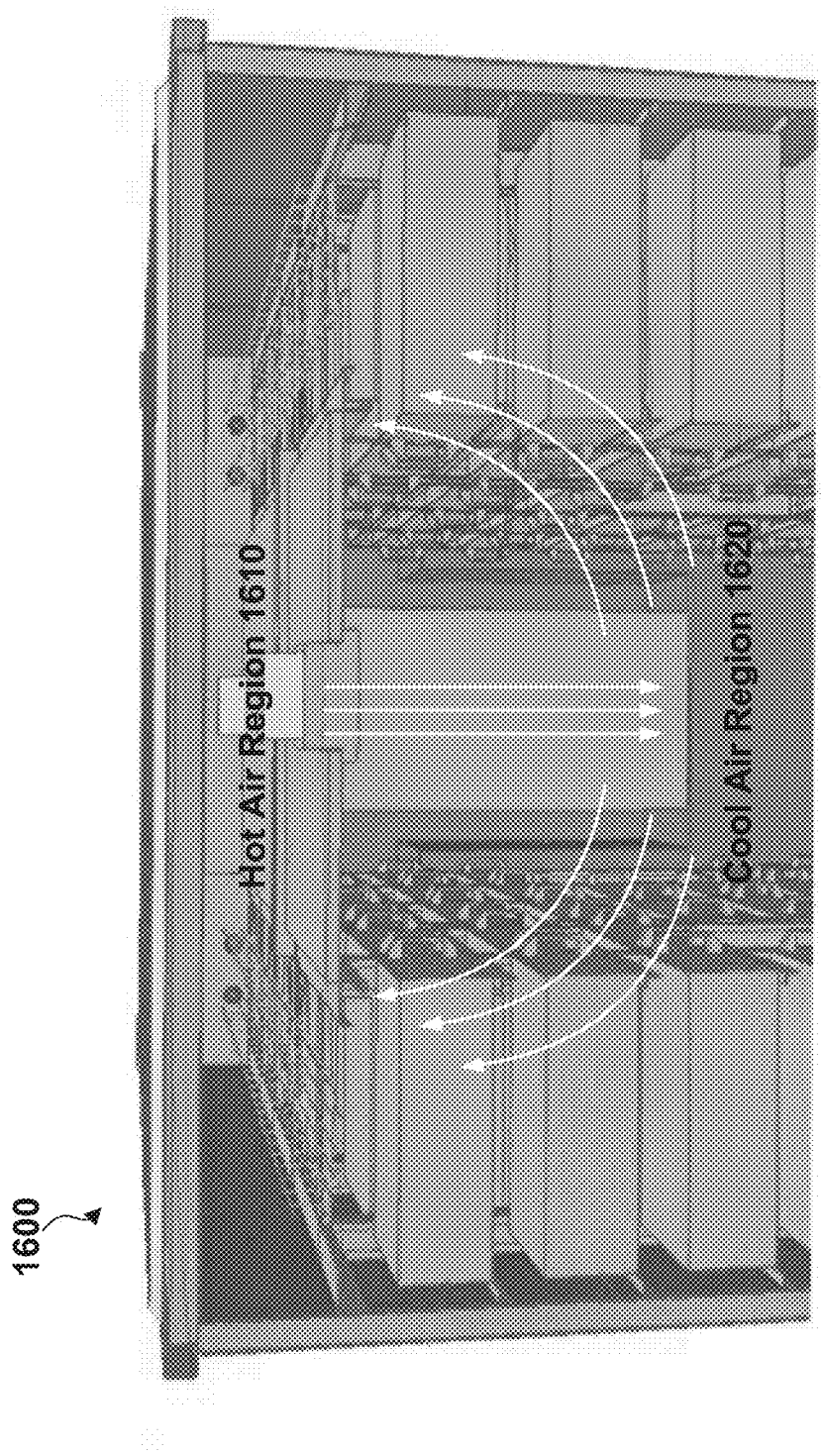

FIG. 16 is a diagram illustrating air flow in an example BESS.

Figure 17:
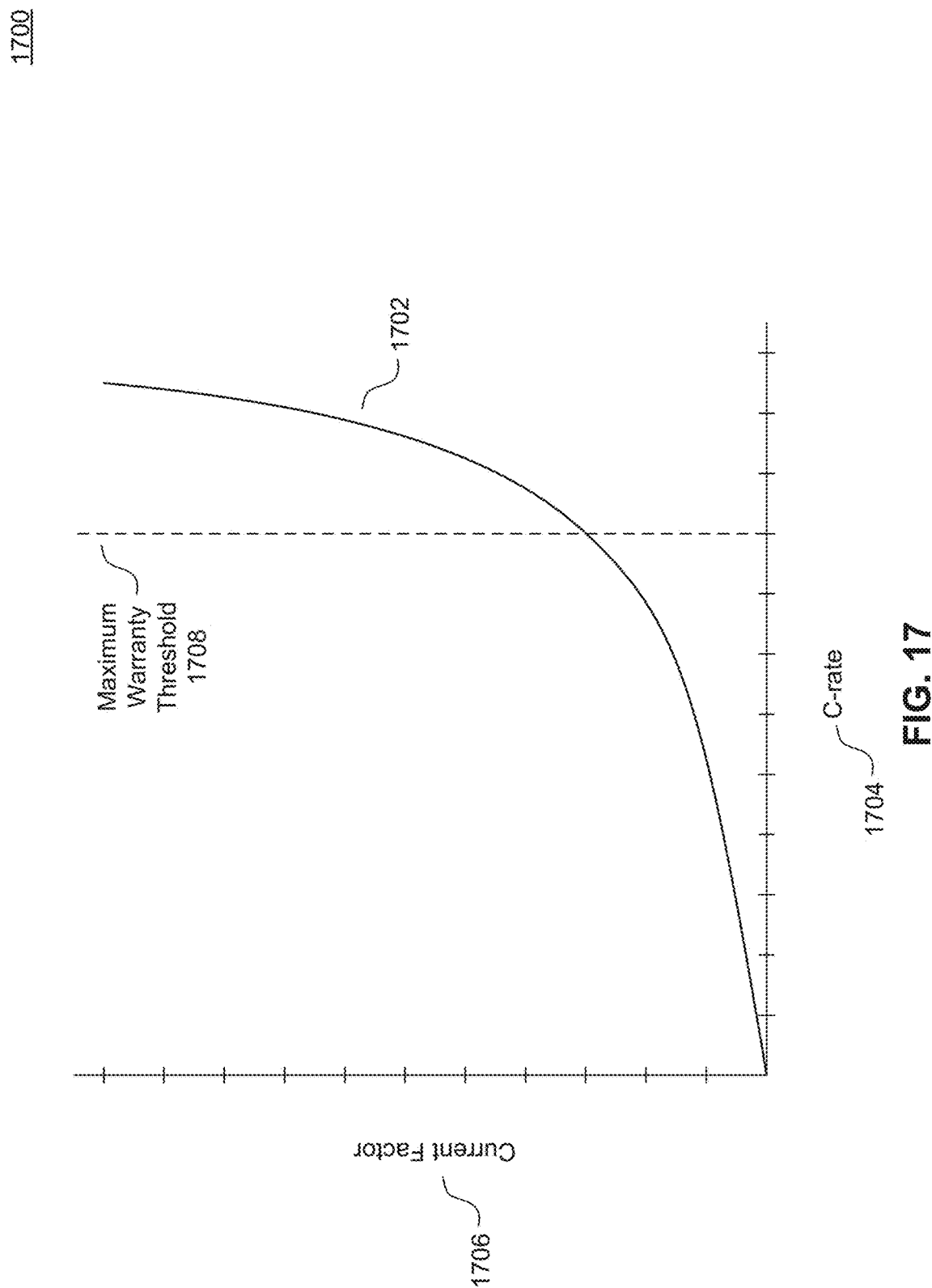

FIG. 17 is a diagram illustrating a correlation between an electric current measurement and a current factor used in the calculation of a warranty value, according to an embodiment.

Figure 18:
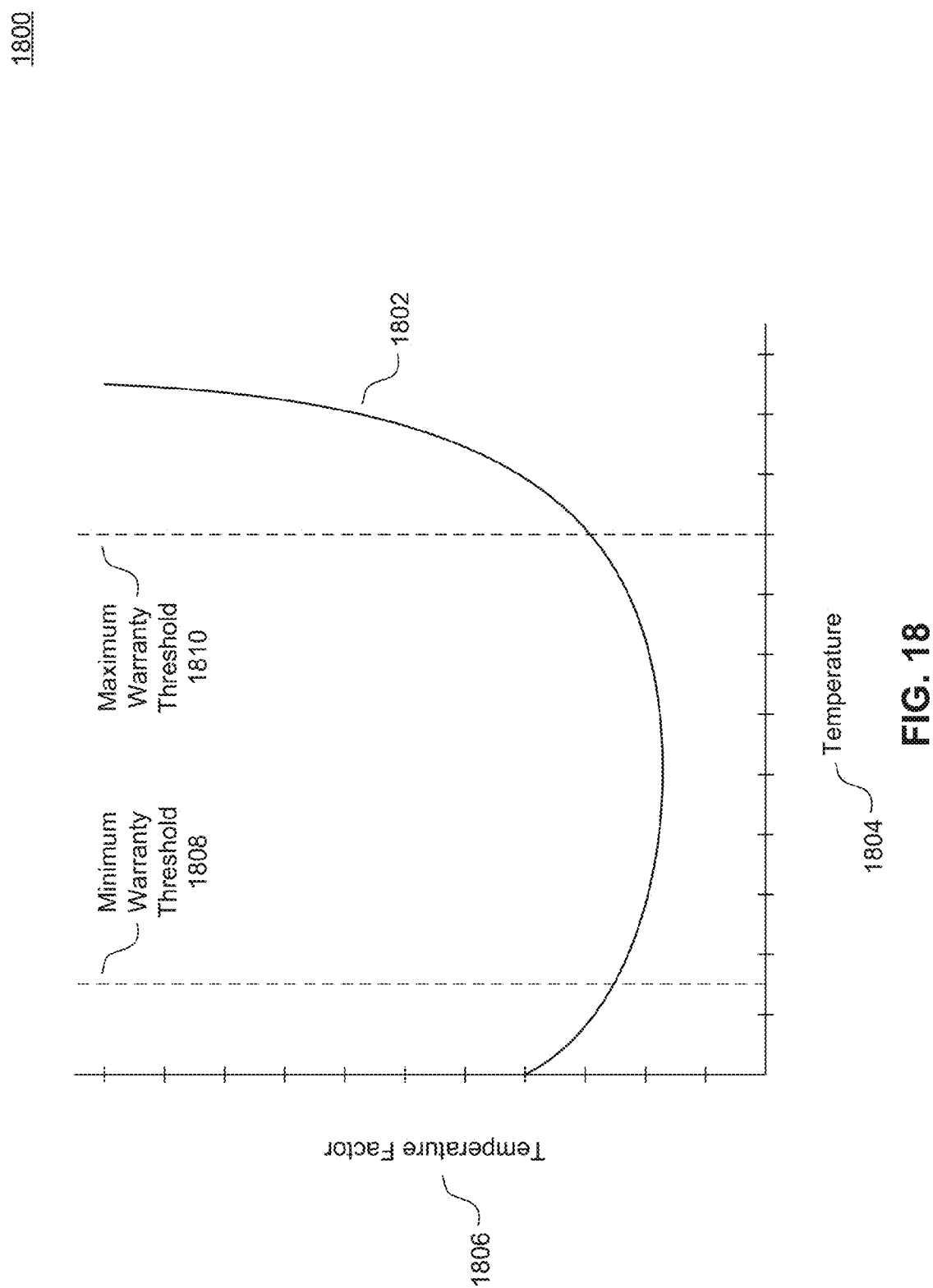

FIG. 18 is a diagram illustrating a correlation between a temperature measurement and a temperature factor used in the calculation of a warranty value, according to an embodiment.

Figure 19:
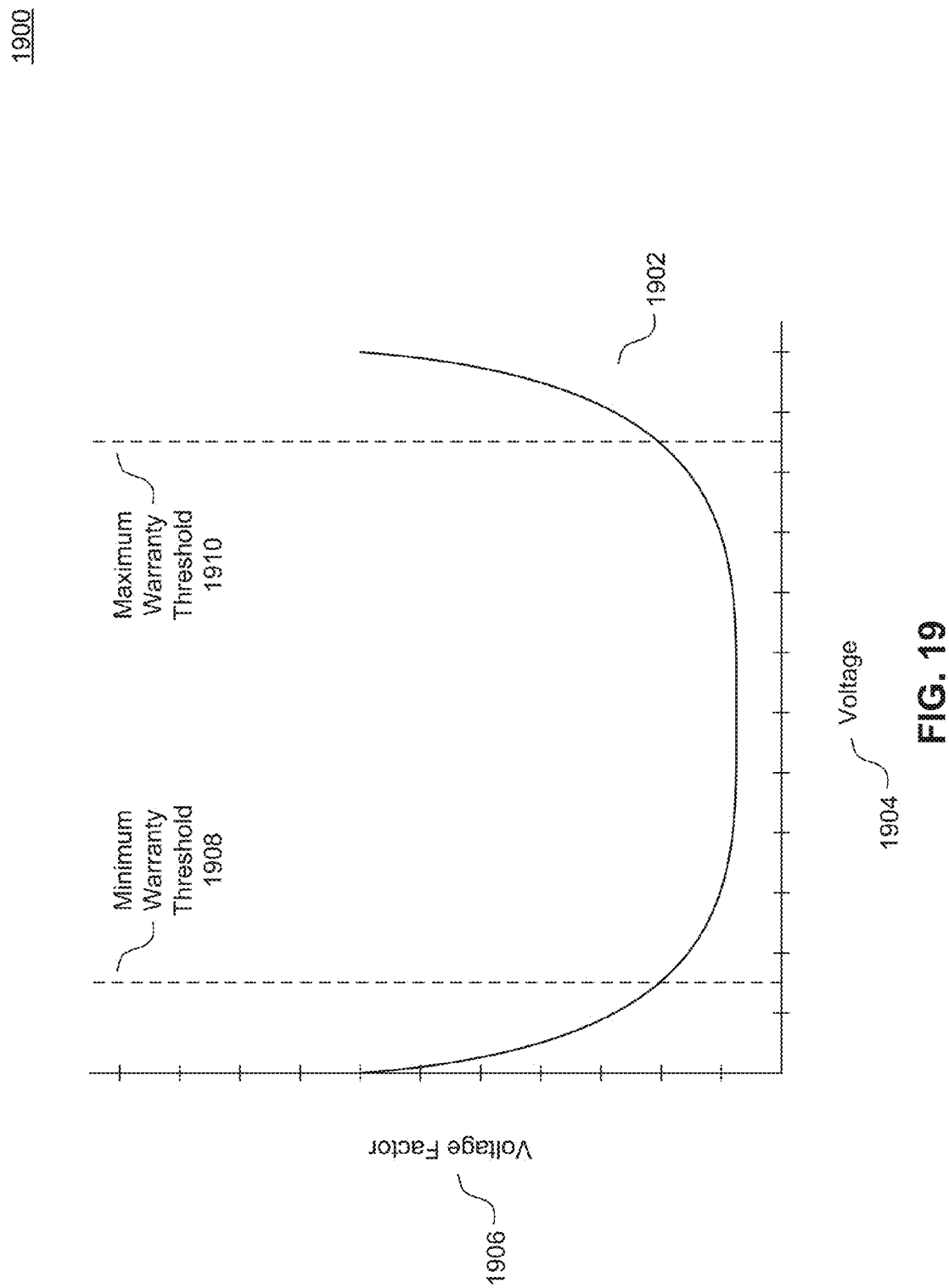

FIG. 19 is a diagram illustrating a correlation between a voltage measurement and a voltage factor used in the calculation of a warranty value, according to an embodiment.

Figure 20:
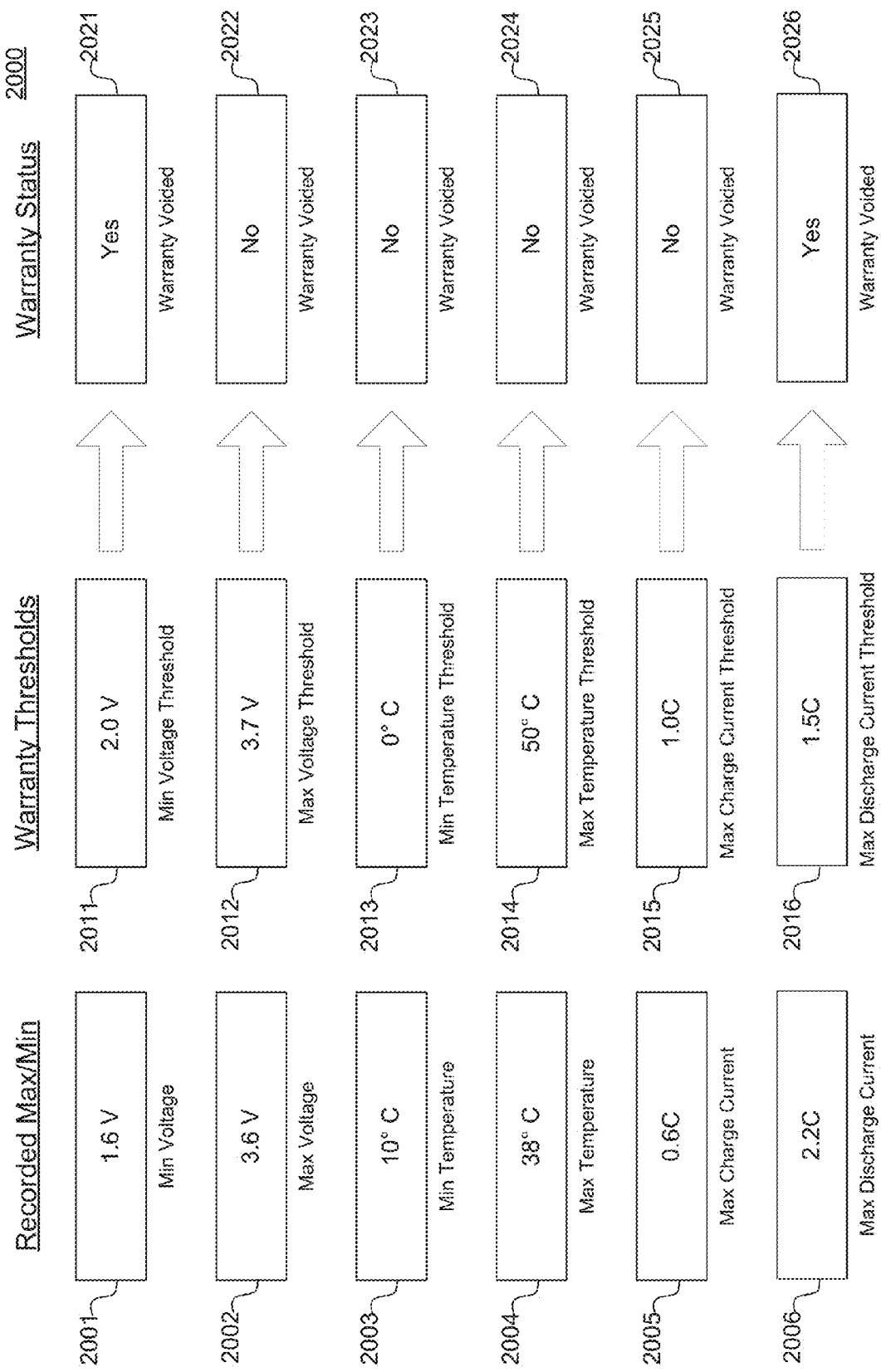

FIG. 20 is a diagram illustrating warranty thresholds used for voiding a warranty for a battery pack, according to an embodiment.

Figure 21:
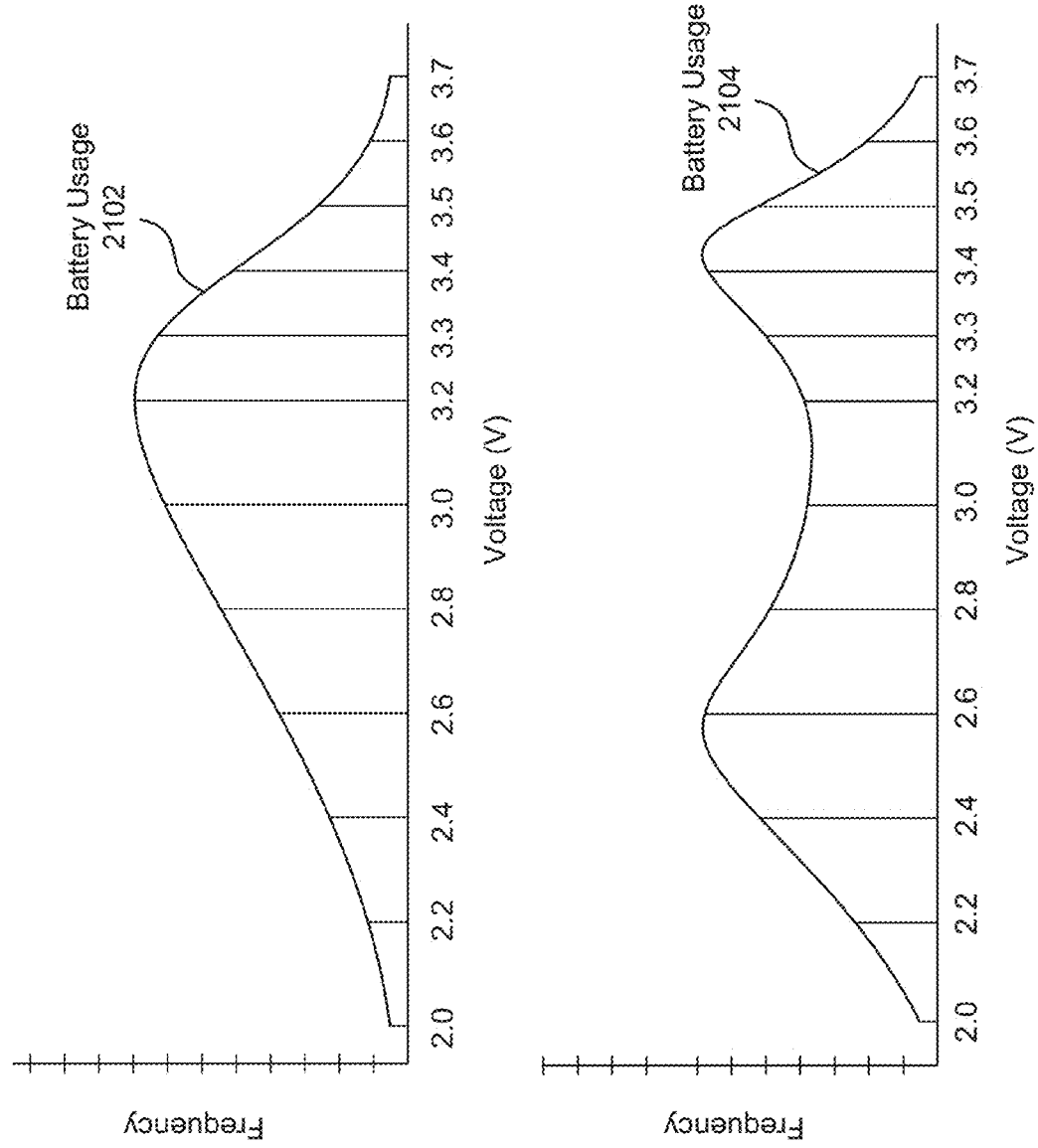

FIG. 21 is a diagram illustrating example usage of a battery pack, according to an embodiment.

Figure 22:
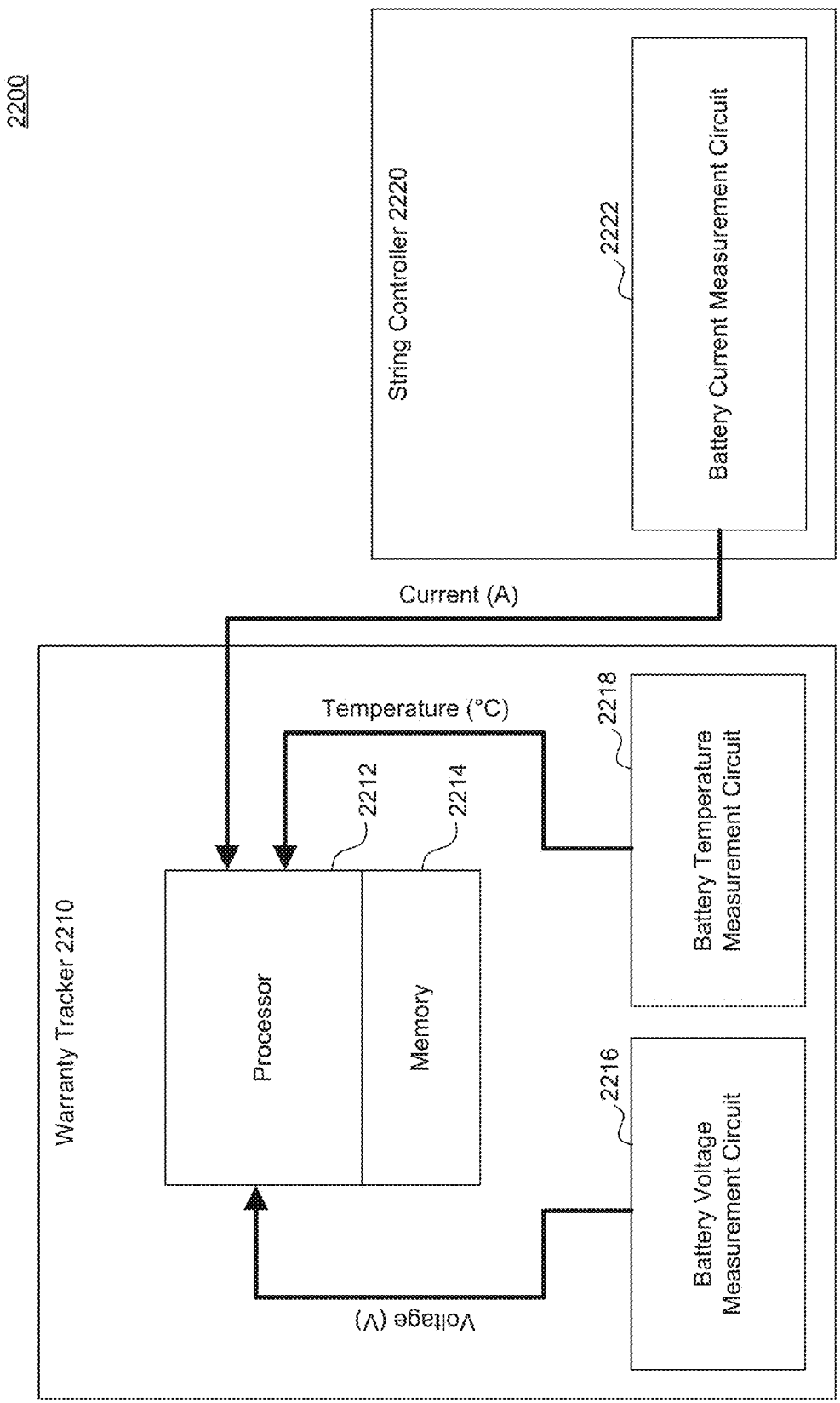

FIG. 22 is a diagram illustrating an example warranty tracker according to an embodiment.

Figure 23:
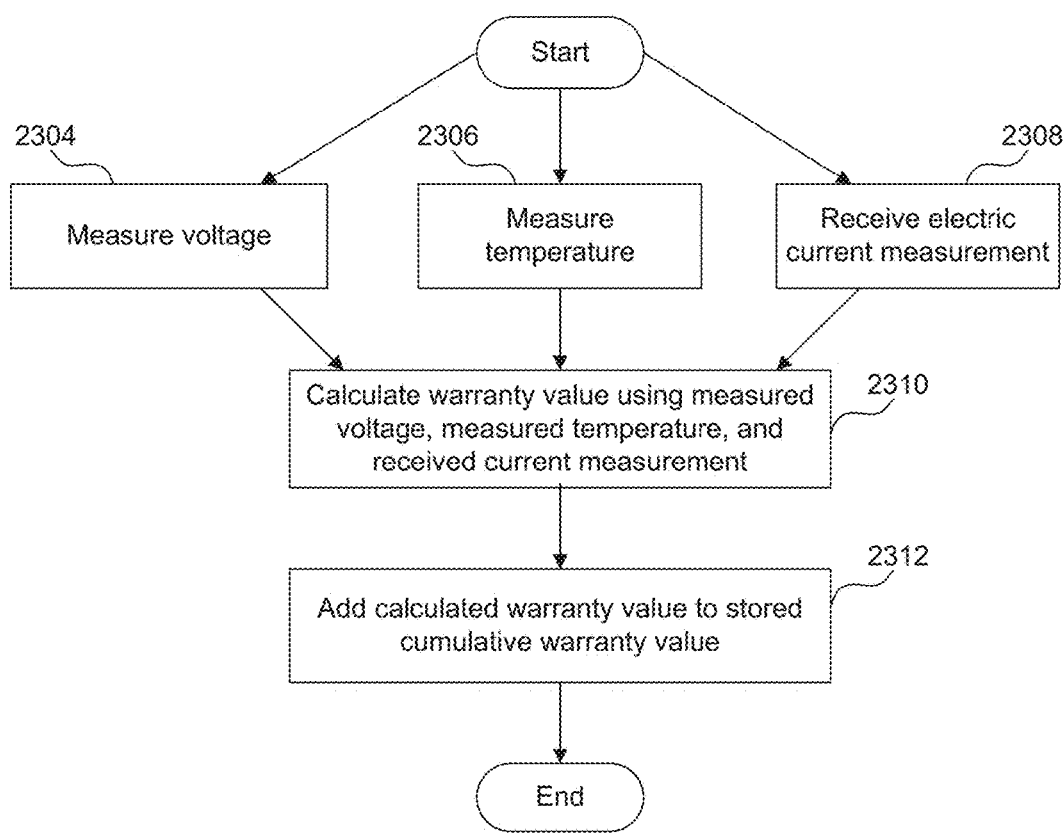

FIG. 23 is an example method for calculating and storing a cumulative warranty value, according to an embodiment.

Figure 24:
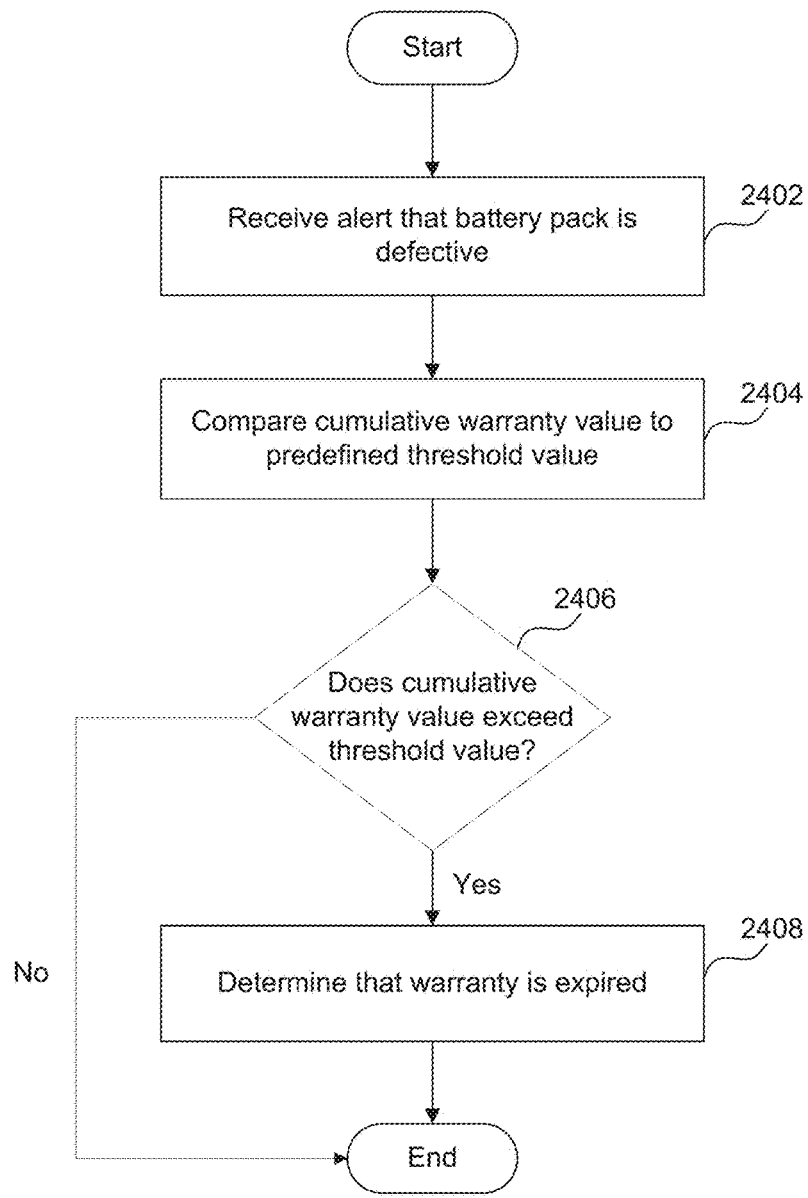

FIG. 24 is an example method for using a warranty tracker, according to an embodiment.

Figure 25:
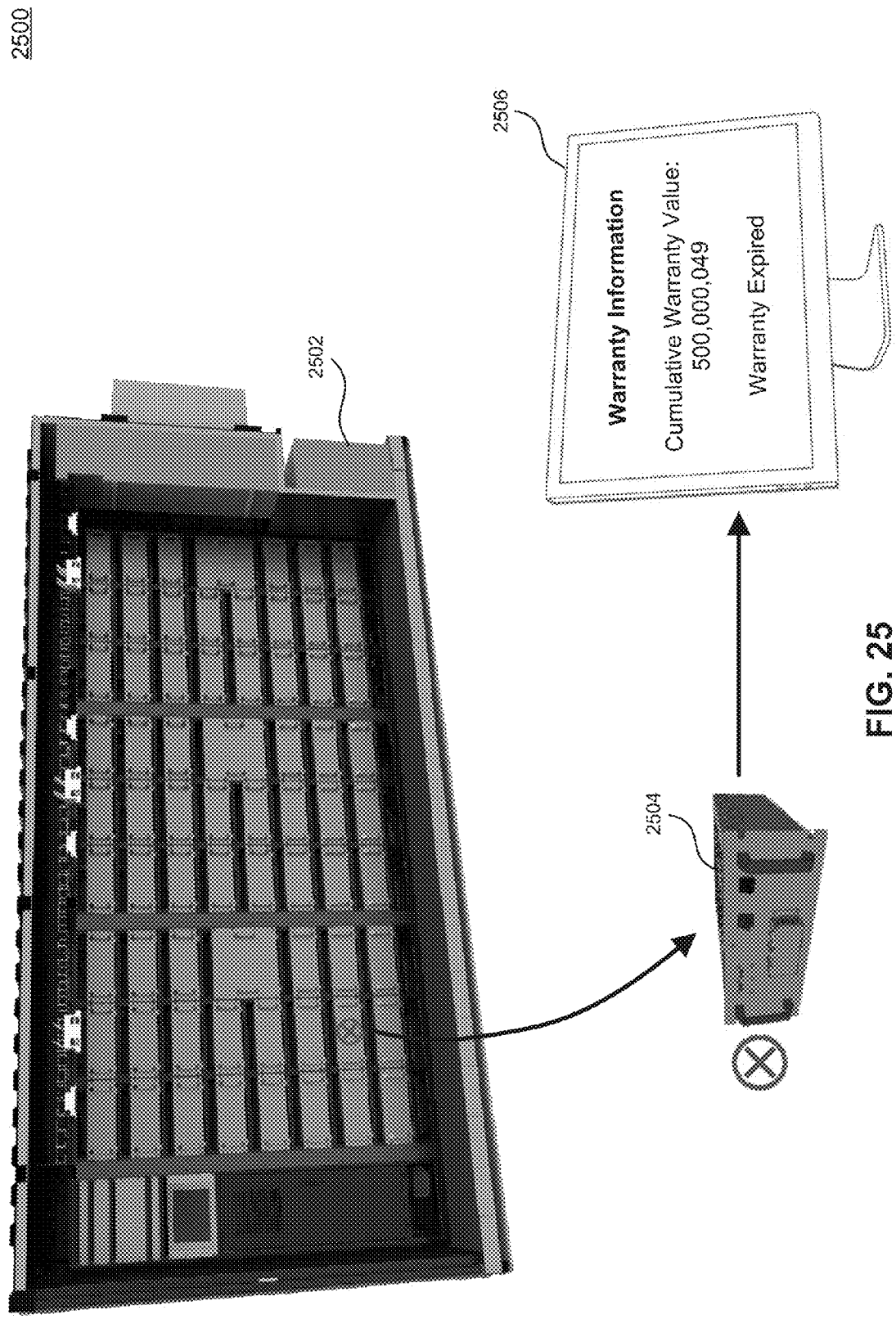

FIG. 25 is a diagram illustrating a battery pack and associated warranty information, according to an embodiment.

Figure 26:
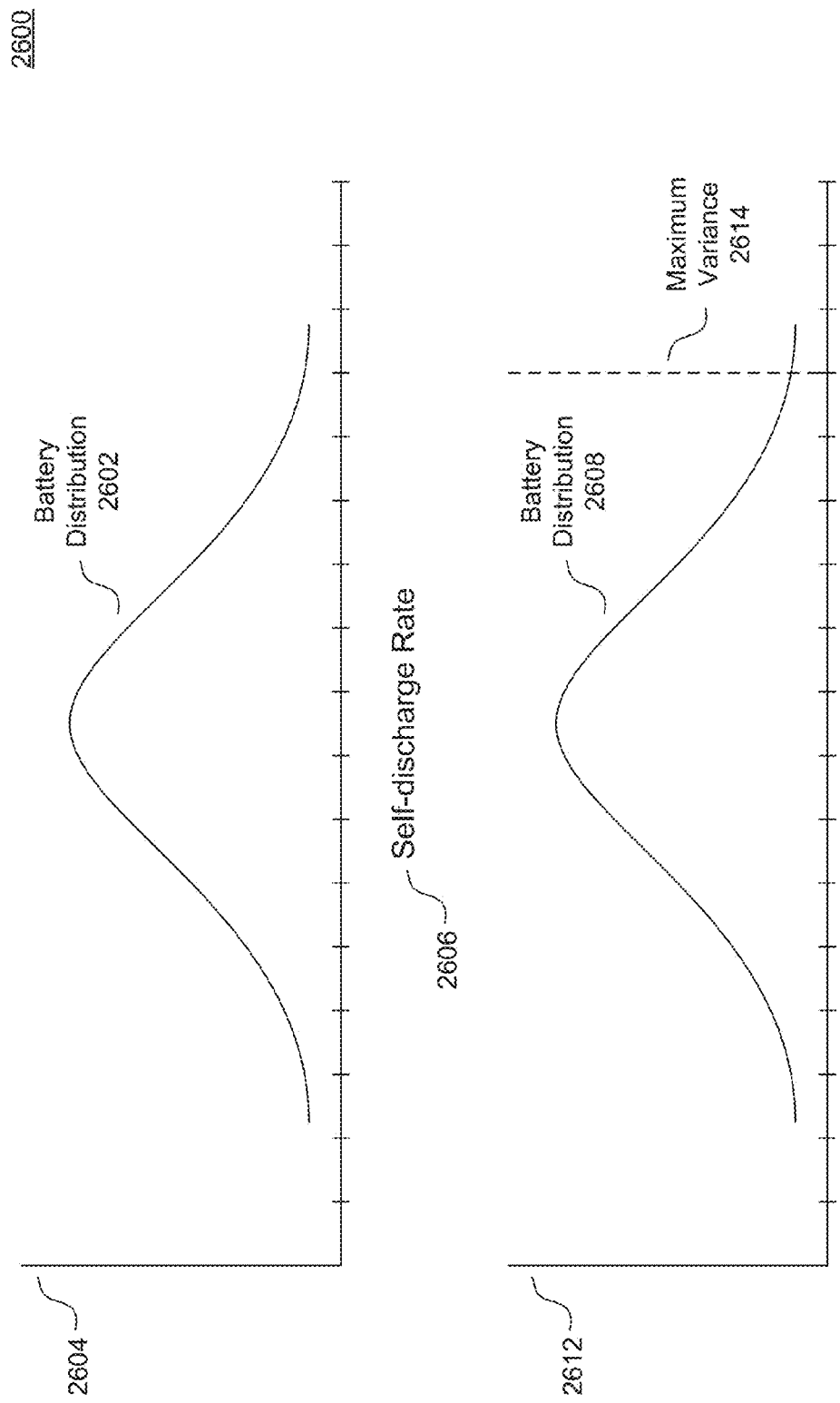

FIG. 26 is a diagram illustrating example distributions of battery packs based on self-discharge rates and charge times according to an embodiment.

Figure 27:
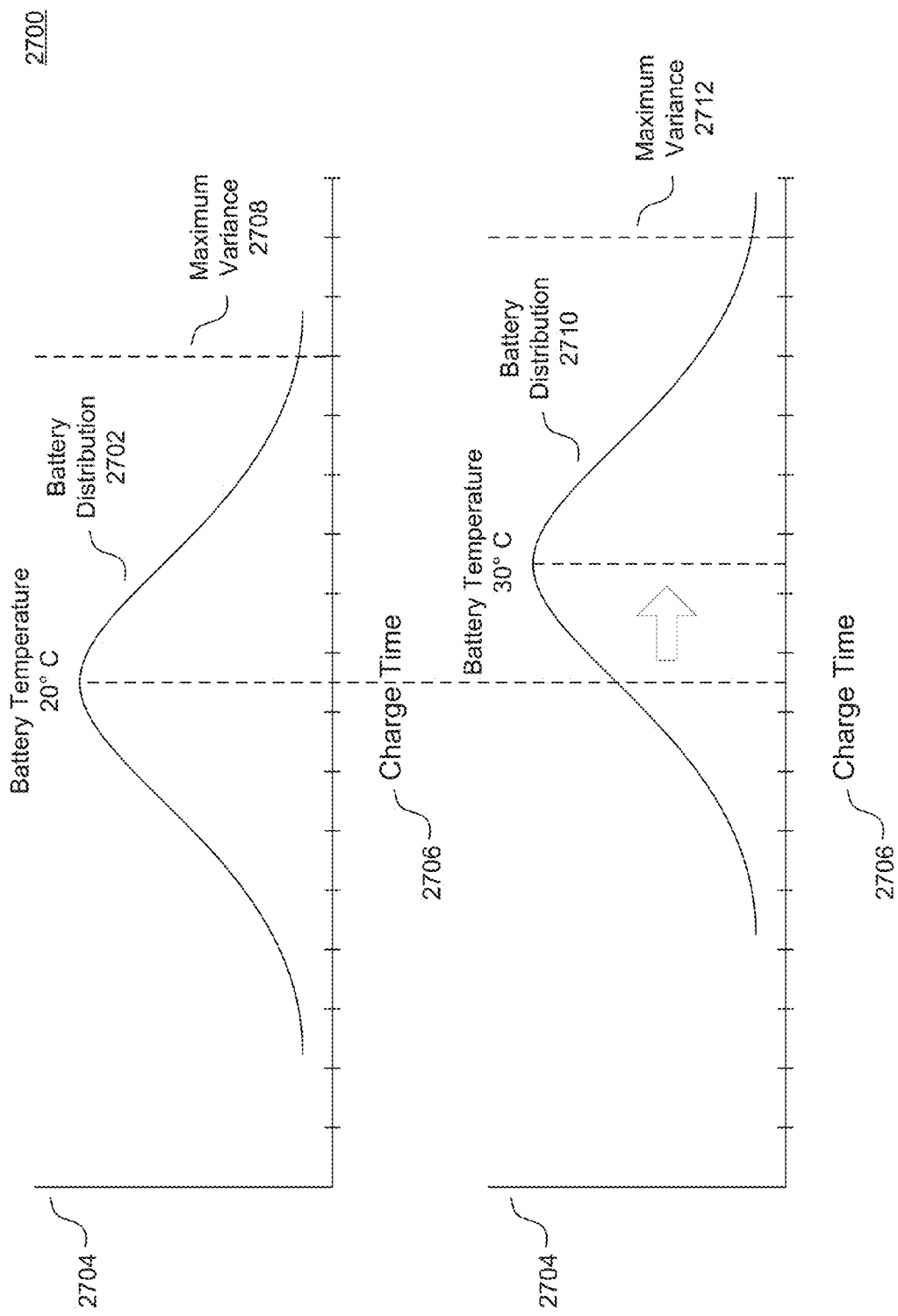

FIG. 27 is a diagram illustrating correlation between temperature and charge time of a battery pack according to an embodiment.

Figure 28:
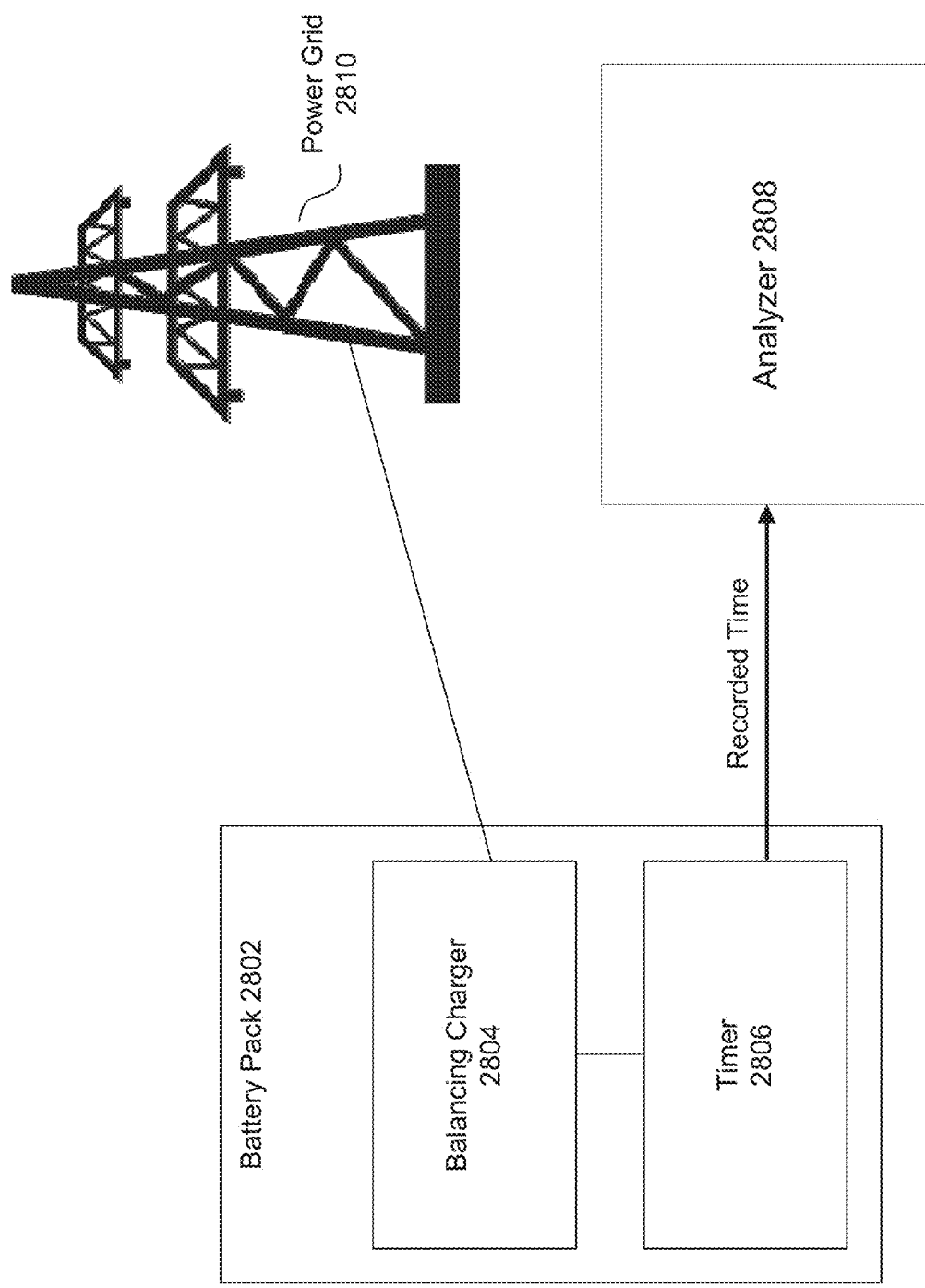

FIG. 28 is a diagram illustrating an example system for detecting a battery pack having an operating issue or defect according to an embodiment.

Figure 29:
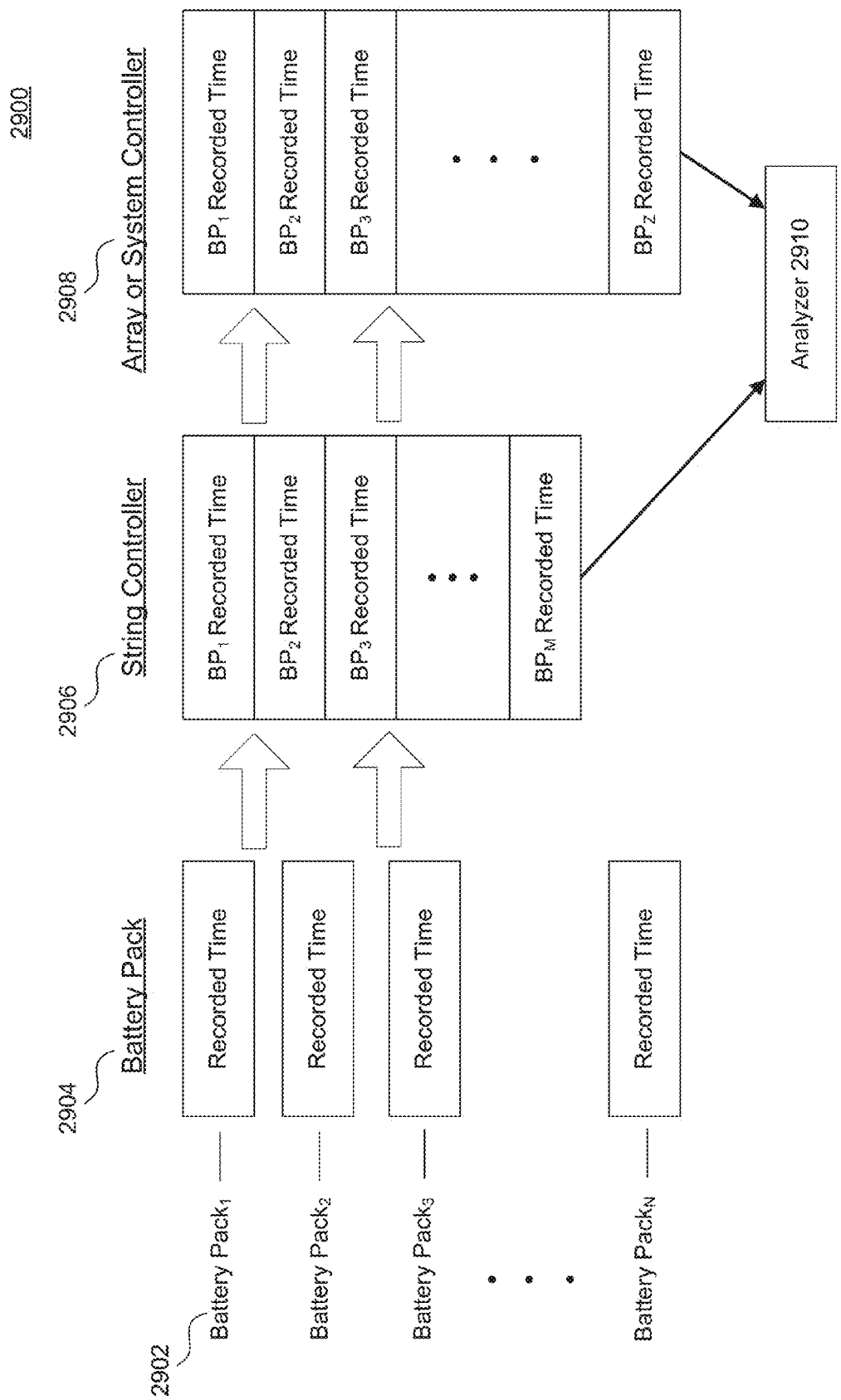

FIG. 29 is a diagram illustrating aggregation of data for analysis from an array of battery packs according to an embodiment.

Figure 30:
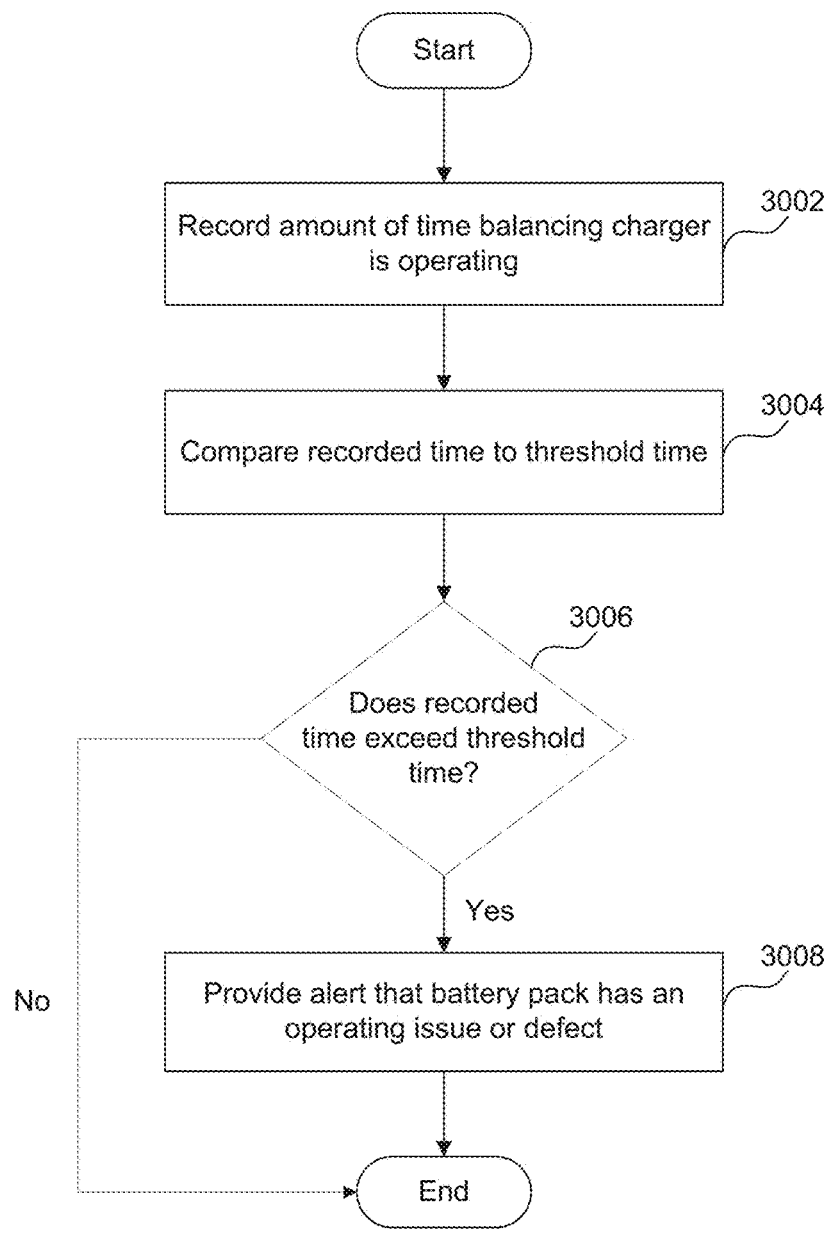

FIG. 30 is a flowchart illustrating an example method for detecting a battery pack having an operating issue or defect according to an embodiment.

In the drawings, like reference numbers may indicate identical or functionally similar elements.

DETAILED DESCRIPTION

While the present disclosure is described herein with illustrative embodiments for particular applications, it should be understood that the disclosure is not limited thereto. A person skilled in the art with access to the teachings provided herein will recognize additional modifications, applications, and embodiments within the scope thereof and additional fields in which the disclosure would be of significant utility.

The terms "embodiments" or "example embodiments" do not require that all embodiments include the discussed feature, advantage, or mode of operation. Alternate embodiments may be devised without departing from the scope or spirit of the disclosure, and well-known elements may not be described in detail or may be omitted so as not to obscure the relevant details. In addition, the terminology used herein is for the purpose of describing particular embodiments only and is not intended to be limiting. For example, as used herein, the singular forms "a," "an" and "the" are intended to include the plural forms as well, unless the context clearly indicates otherwise. It will be further understood that the terms "comprises," "comprising," "includes" and "including," when used herein, specify the presence of stated features, integers, steps, operations, elements, and components, but do not preclude the presence or addition of one or more other features, integers, steps, operations, elements, components, or groups thereof.

Conventional sources of electrical energy, such as power plants that burn fossil fuels, have an adverse effect on the environment. These adverse effects have led to the development of "clean" or "alternative" energy production using renewable energy sources, such as solar and wind. These alternative energy sources are being integrated into the power grid along with the conventional energy sources, and account for an increasing percentage of the overall amount of energy produced and consumed. However, they have yet to fully replace the conventional sources. Indeed, conventional sources still account for a majority of the energy produced on the power grid.

One reason that conventional energy sources remain a primary source of electrical energy is their ability to handle fluctuations in demand. Power plants that burn fossil fuels and other conventional sources (e.g., nuclear) typically use large generators to produce energy. To account for fluctuations in demand, these generators are typically operated below their full capacity. Thus, when demand temporarily increases or "spikes," the generators can be ramped-up to produce more energy and meet the increased demand. The excess capacity of a generator is often referred to as its "spinning reserve."

Figure 1:
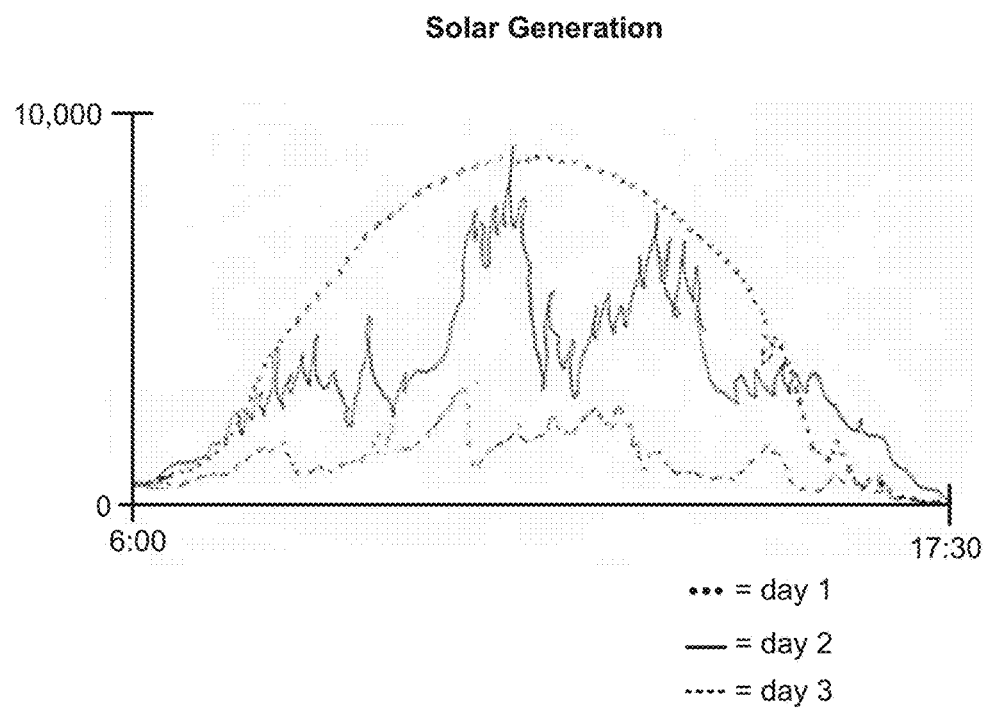
FIG. 1 is a graph illustrating energy generation by a solar plant at a location during three different days.

By contrast, alternative energy sources lack spinning reserve. That is, the source (e.g., the sun or wind) produces at its maximum level and cannot be ramped-up as desired to meet increased demand. Moreover, the amount of energy produced by these alternative sources is not as predictable as by conventional sources—the alternative sources are at the mercy of the environment. An overcast or calm day (i.e., not windy) will not produce as much energy as a sunny or windy day. Likewise, if the sun goes behind a cloud or the wind stops blowing while demand remains constant or increases, the alternative source may not be able to produce enough energy to meet the demand. FIG. 1, for example, is a graph illustrating energy generation by a solar plant at a location over three different days. As shown, the amount of energy that is produced can fluctuate significantly throughout a given day, as well as from day-to-day.

It is necessary for the power grid to provide a stable (e.g., frequency stability) and reliable source of electrical energy. When alternative energy sources are integrated into the power grid along with the conventional energy sources, the "clean" energy produced by the alternative energy sources can replace a certain amount of the energy that is produced by the conventional sources, reducing the amount of energy produced by burning fossil fuels or other controversial methods (e.g., nuclear). At the same time, the conventional energy sources can be ramped-up or down to meet demand and provide a stable frequency.

Figure 2:
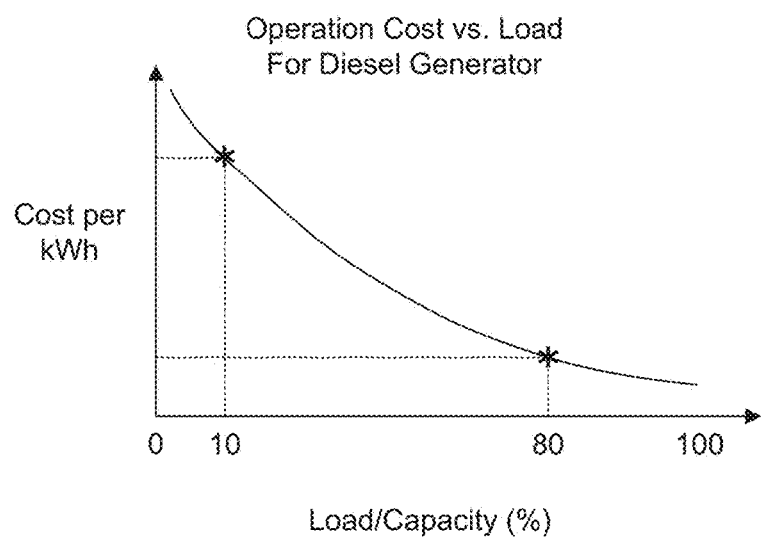
FIG. 2 is a graph illustrating the cost associated with operating an example diesel generator.

However, in addition to the initial investment, there are operation expenses associated with running generators that are used to produce energy at conventional power plants. FIG. 2 is a graph illustrating the cost associated with operating an example diesel generator. The y-axis depicts the cost per kilowatt-hour (kWh) of operating the diesel generator, and the x-axis depicts the operational load of the diesel generator. As shown, the cost per kWh is inversely proportional to the operation load of the diesel generator in FIG. 2. In other words, as the generator is ramped-up toward full capacity, the cost per kWh decreases. On the other hand, running the diesel generator of FIG. 2 at low capacity increases the cost per kWh. As FIG. 2 depicts, there can be a significant cost associated with operating a generator at low load levels.

FIG. 2 illustrates that it is not cost effective to run the generator at low capacity. But as the amount of energy that is produced by alternative sources increases, the generators at conventional power plants must be ramped-down (i.e., run at lower capacity) in order for the power grid to maintain a constant output to meet the current demand. Also, as the amount of energy produced by alternative sources fluctuates, the generators at conventional power plants must be ramped-up or down to supplement the alternative sources. These and other factors can make it more expensive and less profitable for utilities that operate conventional power plants when alternative energy sources are integrated into the power grid. Often, the utilities will try to pass along these higher costs to the consumer in the form of higher energy bills.

Figure 3:
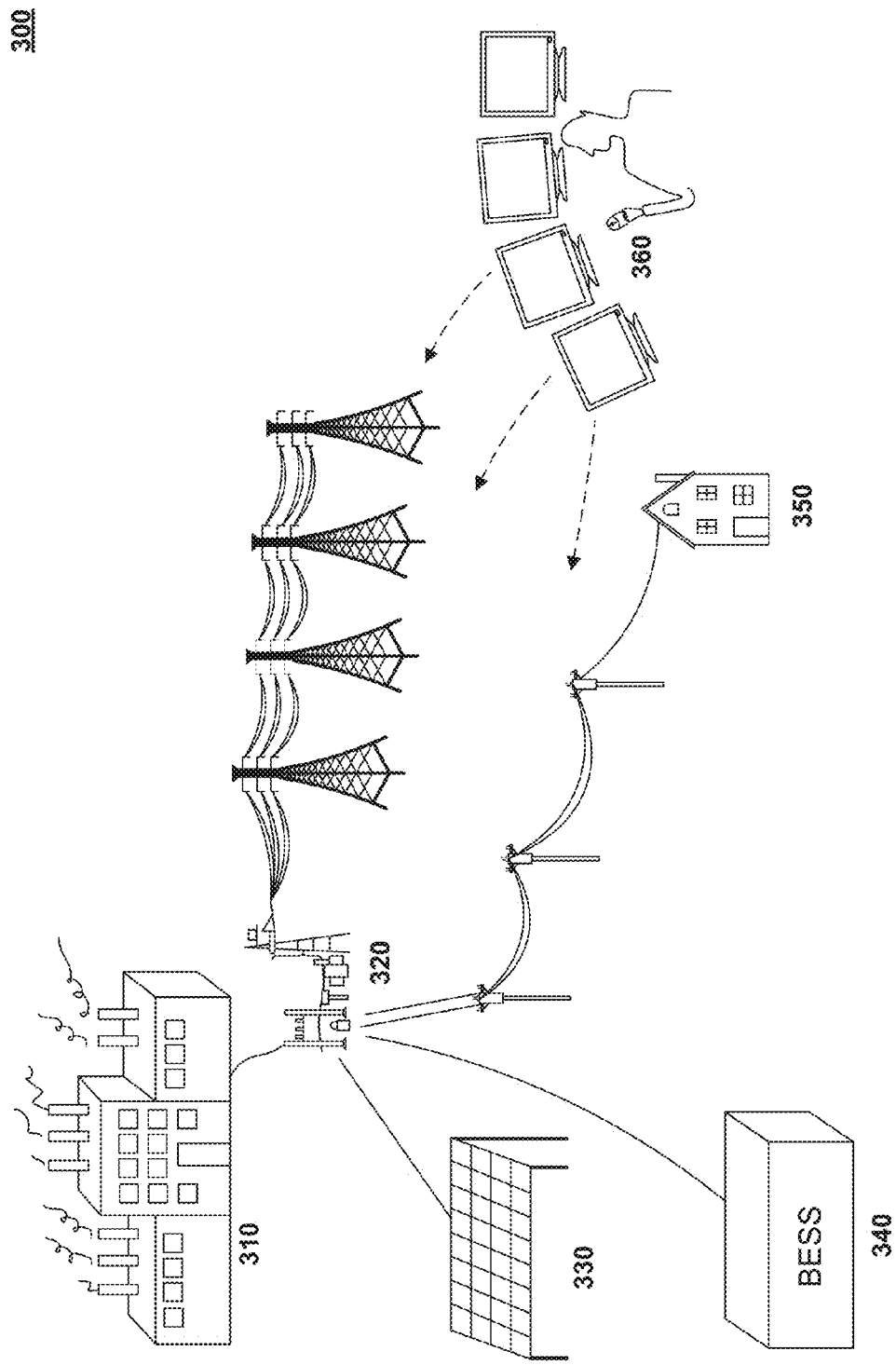
FIG. 3 is a diagram illustrating an example energy system that includes a conventional energy source, an alternative energy source, and a battery energy storage system (BESS) coupled to a power grid.

Embodiments of the battery energy storage system (BESS) described throughout this disclosure may alleviate many of the problems associated with integrating alternative (renewable) energy sources into the power grid. FIG. 3 depicts an example energy system 300 that includes conventional energy source 310 (e.g., a power plant that burns fossil fuels) and alternative energy source 330 (e.g., a solar energy plant). Both energy sources 310 and 330 are coupled to power grid 320, which can provide electrical energy to the public (depicted as house 350). Energy system 300 also includes BESS 340 coupled to power grid 320. As described in more detail below, BESS 340 includes a plurality of battery packs that can be charged and discharged on demand. In an embodiment, BESS 340 can be charged by conventional energy source 310 and/or alternative energy source 330.

BESS 340 can provide energy to power grid 320 when the output of alternative energy source 330 falls below a threshold or when alternative energy source 330 cannot produce enough energy to meet demand (e.g., BESS 340 can function as the "spinning reserve" for alternative energy source 330). For example, instead of starting a shutdown generator at conventional energy source 310 to meet a spike in demand or lack of production by alternative energy source 330, BESS 340 may discharge energy from its battery packs to provide the needed energy. As a few non-limiting examples, BESS 340 may provide 3 MW for 15 minutes, 2 MW for 30 minutes, or 1.5 MW for 45 minutes. BESS 340 may be configured to provide more or less energy for different lengths of time.

BESS 340 can also be used to assist in frequency stabilization of power grid 320. For example, BESS 340 may include electronics that monitor the line frequency of power grid 320 and deliver energy to or draw energy from power grid 320 to maintain a stable frequency (e.g., 60 Hz). As shown in FIG. 3, and described in more detail below, an operator at energy management system 360 can monitor energy demand, output, frequency, etc. of system 300, and remotely control BESS 340 to charge (draw energy from power grid 320) or discharge (provide energy to power grid 320) as needed. BESS 340 may also be automatically dispatched/controlled.

Figure 4:
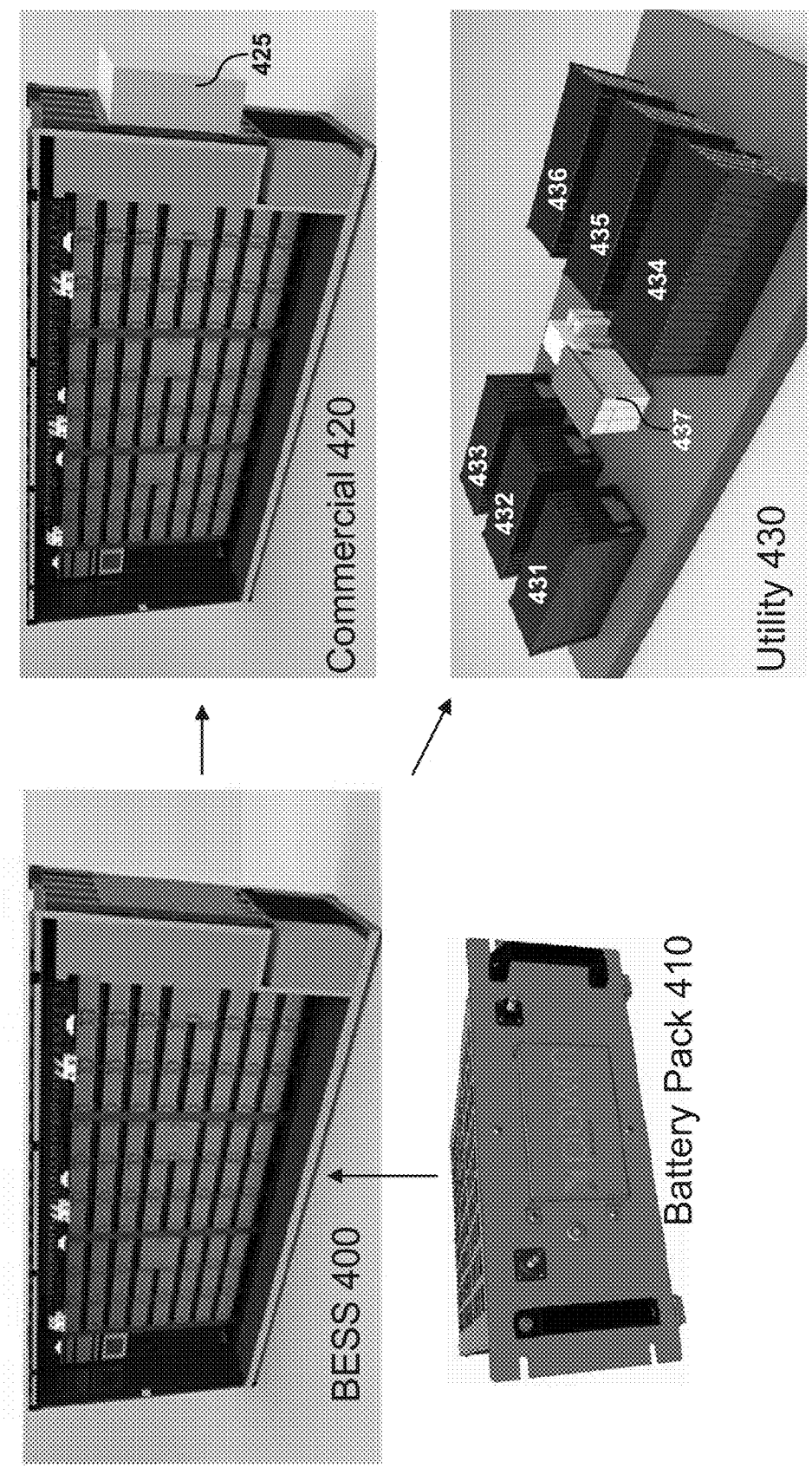
FIG. 4 is a diagram depicting a cross-sectional view of an example BESS and example deployments of one or more BESS units.

FIG. 4 illustrates an example BESS 400. Specifically, FIG. 4 illustrates a cross-sectional view of BESS 400. BESS 400 can be operated as a stand-alone system (e.g., commercial embodiment 420) or it can be combined together with other BESS units to form a part of a larger system (e.g., utility embodiment 430). In the embodiment illustrated in FIG. 4, BESS 400 is housed in a container (similar to a shipping container) and is movable (e.g., transported by a truck). Other housings known to those skilled in the art are within the scope of this disclosure.

As shown in FIG. 4, BESS 400 includes a plurality of battery packs, such as battery pack 410. As shown, the battery packs can be stacked on racks in BESS 400. This arrangement allows an operator easy access to each of the battery packs for replacement, maintenance, testing, etc. A plurality of battery packs may be connected in series, which may be referred to as a string of battery packs or a battery pack string.

In an embodiment (described in more detail below), each battery pack includes battery cells (which may be arranged into battery modules), a battery pack controller that monitors the battery cells, a balancing charger (e.g., DC power supply) that adds energy to each of the battery cells, and a distributed, daisy-chained network of battery module controllers that may take certain measurements of and remove energy from the battery cells. The battery pack controller may control the network of battery module controllers and the balancing charger to control the state-of-charge or voltage of a battery pack. In this embodiment, the battery packs that are included in BESS 400 are considered "smart" battery packs that are able to receive a target voltage or state-of-charge value and self-balance to the target level.

FIG. 4 illustrates that BESS 400 is highly scalable, ranging from a small kilowatt-hour size system to a multi-megawatt-hour size system. For example, the commercial embodiment 420 of FIG. 4 includes a single BESS unit, which may be capable of providing 400 kWh of energy (but is not limited thereto). The commercial embodiment 420 includes power control system (PCS) 425 that is mounted on the housing at the back of the BESS unit. PCS 425 includes one or more bi-directional power converters that are capable of both charging and discharging the plurality of battery packs using commands issued, for example, via a computer over a network (e.g. the Internet, an Ethernet, etc.), such as by an operator at energy monitoring station 360 of FIG. 3. PCS 425 can control both the real power and the reactive power of the bi-directional power converters. Also, in some embodiments, PCS 425 can be operated as a backup power source when grid power is not available and/or BESS 420 is disconnected from the power grid.

On the other hand, the utility embodiment 430 of FIG. 4 includes six BESS units (labeled 431-436), each of which may be capable of providing 400 kWh of energy (but are not limited thereto). Thus, utility embodiment 430 may collectively provide 2.4 MWh of energy. In the utility embodiment, each of the BESS units is electrically connected to a central PC'S 437, which includes one or more bi-directional power converters that are capable of both charging and discharging the plurality of battery packs using commands issued, for example, via a computer over a network (e.g. the Internet, an Ethernet, etc.), such as by an operator at energy monitoring station 360 of FIG. 3. PCS 437 can control both the real power and the reactive power of the bi-directional power converters. Also, in some embodiments, PCS 437 can be operated as a backup power source when grid power is not available and/or BESS is disconnected from the power grid.

Figure 5A:
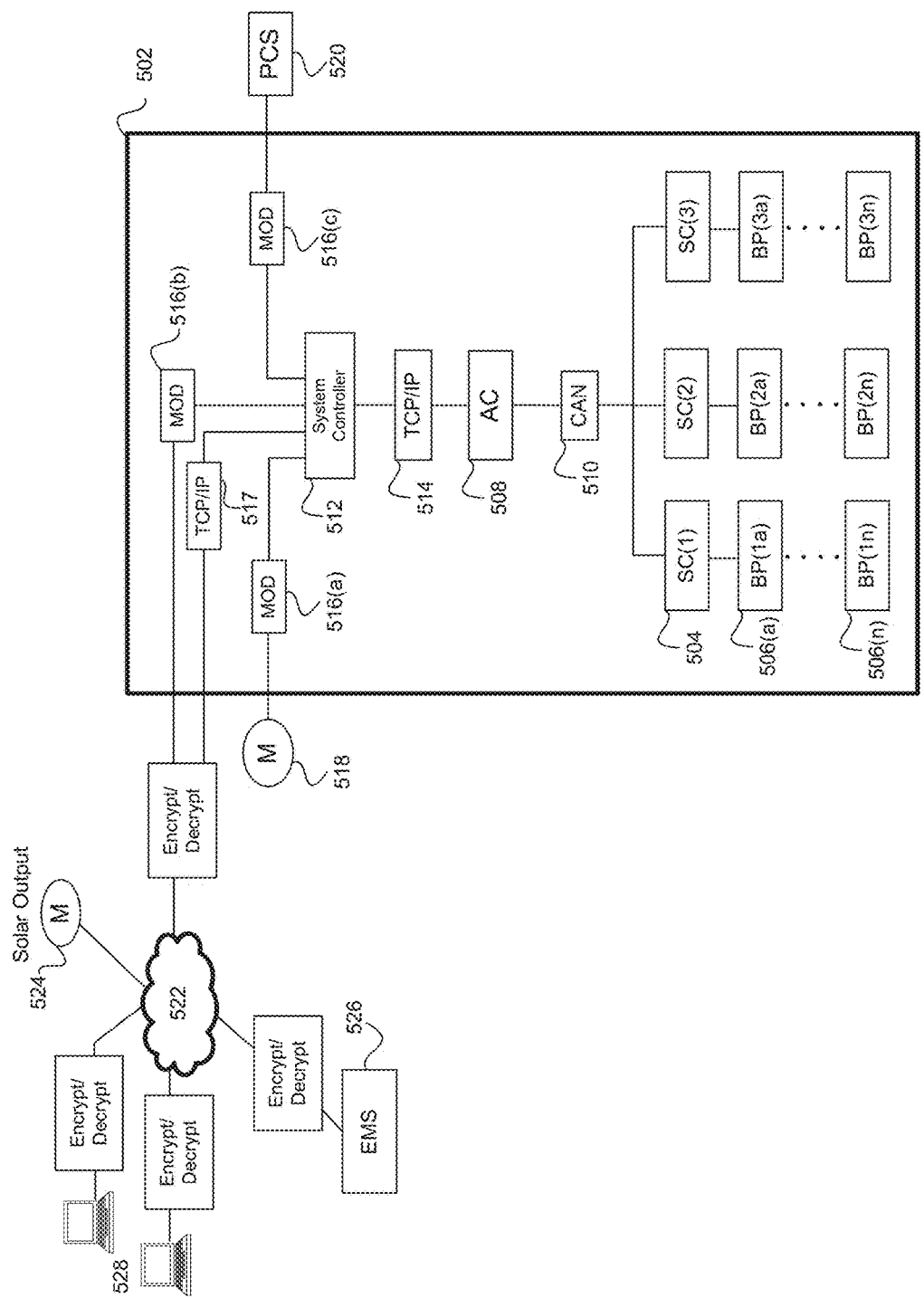
FIG. 5A is a diagram illustrating an example BESS coupled to an example energy system.

FIG. 5A is a block diagram illustrating an example BESS 502 according to an embodiment. BESS 502 may be coupled to energy management system (EMS) 526 via communication network 522. Communication network 522 may be any type communication network, including (but not limited to) the Internet, a cellular telephone network, etc. Other devices coupled to communication network 522, such as computers 528, may also communicate with BESS 502. For example, computers 528 may be disposed at the manufacturer of BESS 502 to maintain (monitor, run diagnostic tests, etc.) BESS 502. In other embodiments, computers 528 may represent mobile devices of field technicians that perform maintenance on BESS 502. As shown in FIG. 5A, communications to and from BESS 502 may be encrypted to enhance security.

Field monitoring device 524 may also be coupled to EMS 526 via communication network 522. Field monitoring device 524 may be coupled to an alternative energy source (e.g., a solar plant, a wind plant, etc.) to measure the energy generated by the alternative energy source. Likewise, monitoring device 518 may be coupled to BESS 502 and measure the energy generated by BESS 502. While two monitoring devices are illustrated in FIG. 5A, a person of skill in the art would recognize that additional monitoring devices that measure the energy generated by energy sources (conventional and/or alternative energy sources) may be connected to communication network 522 in a similar manner. An human operator and/or a computerized system at EMS 526 can analyze and monitor the output of the monitoring devices connected to communication network 522, and remotely control the operation of BESS 502. For example, EMS 526 may instruct BESS 502 to charge (draw energy from power grid 320) or discharge (provide energy to power grid 320) as needed (e.g., to meet demand, stabilize line frequency, etc.).

BESS 502 includes a hierarchy of control levels for controlling BESS 502. The control levels of BESS 502, starting with the top level are system controller, array controller, string controller, battery pack controller, and battery module controller. For example, system controller 512 may be coupled to one or more array controllers (e.g., array controller 508), each of which may be coupled to one or more string controllers (e.g., string controller 504), each of which may be coupled to one or more battery pack controllers, each of which may be coupled to one or more battery module controllers. Battery pack controllers and battery modules controllers are disposed with battery packs 506(a)-506(n), and will be discussed in more detail with respect to FIGS. 6-9 below.

As shown in FIG. 5A, system controller 512 is coupled to monitoring device 518 via communication link 516(a), to communication network 522 via communication link 516(b), and to PCS 520 via communication link 516(c). In FIG. 5A, communication links 516(a)-(c) are MOD busses, but any wired and wireless communication link may be used. In an embodiment, system controller 512 is also connected to communication network 522 by TCP/IP connection 517.

System controller 512 can monitor and report the operation of BESS 502 to EMS 526 or any other device connected to communication network 522 and configured to communicate with BESS 502. System controller 512 can also receive and process instructions from EMS 526, and relay instructions to an appropriate array controller (e.g., array controller 506) for execution. System controller 512 may also communicate with PCS 520 to control the charging and discharging of BESS 502.

Although system controller 512 is shown disposed within BESS 502 in FIG. 5A, system controller 512 may be disposed outside of and communicatively coupled to BESS 502 in other embodiments. Considering FIG. 4 again, commercial embodiment 420 may be a standalone unit used by a business, apartment, hotel, etc. A system controller may be disposed within the BESS of commercial embodiment 420 to, e.g., communicate with an EMS or a computer at the business, apartment, hotel, etc. via a communication network.

In other embodiments, such as utility embodiment 430, only one of BESS units 431-436 may include a system controller. For example, in FIG. 4, BESS unit 431 may include a system controller and BESS units 432-436 may not. In this scenario, BESS 431 is considered the master unit and is used to control BESS units 432-436, which are considered slave units. Also, in this scenario, the highest level of control included within each of BESS units 432-436 is an array controller, which is coupled to and communicates with the system controller within BESS unit 431.

Considering FIG. 5A again, system controller 512 is coupled to array controller 508 via communication link 514. Array controller 508 is coupled to one or more string controllers, such as string controller 504 via communication link 510. While FIG. 5A depicts three string controllers (SC(1)-(3)) more or less string controllers may be coupled to array controller 508. In FIG. 5A, communication link 510 is CAN bus and communication link 514 is a TCP/IP link, but other wired or wireless communication links may be used.

Each string controller in BESS 502 is coupled to one or more battery packs. For example, string controller 504 is coupled to battery packs 506(a)-(n), which are connected in series to form a battery pack string. Any number of battery packs may be connected together to form a battery pack string. Strings of battery packs can be connected in parallel in BESS 502. Two or more battery pack strings connected in parallel may be referred to as an array of battery packs or a battery pack array. In one embodiment, BESS 502 includes an array of battery packs having six battery pack strings connected in parallel, where each of the battery pack strings has 22 battery packs connected in series.

As its name suggests, a string controller may monitor and control the battery packs in the battery pack string. The functions performed by a string controller may include, but are not limited to, the following: issuing battery string contactor control commands, measuring battery string voltage; measuring battery string current; calculating battery string Amp-hour count; relaying queries between a system controller (e.g., at charging station) and battery pack controllers; processing query response messages; aggregating battery string data; performing software device ID assignment to the battery packs; detecting ground fault current in the battery string; and detect alarm and warning conditions and taking appropriate corrective actions. Example embodiments of a string controller are described below with respect to FIGS. 11, 12A, and 12B.

Likewise, an array controller may monitor and control a battery pack array. The functions performed by an array controller may include, but are not limited to, the following: sending status queries to battery pack strings, receiving and processing query responses from battery pack strings, performing battery pack string contactor control, broadcasting battery pack array data to the system controller, processing alarm messages to determine necessary actions, responding to manual commands or queries from a command line interface (e.g., at an EMS), allowing a technician to set or change the configuration settings using the command line interface, running test scripts composed of the same commands and queries understood by the command line interpreter, and broadcasting data generated by test scripts to a data server for collection.

Figure 5B:
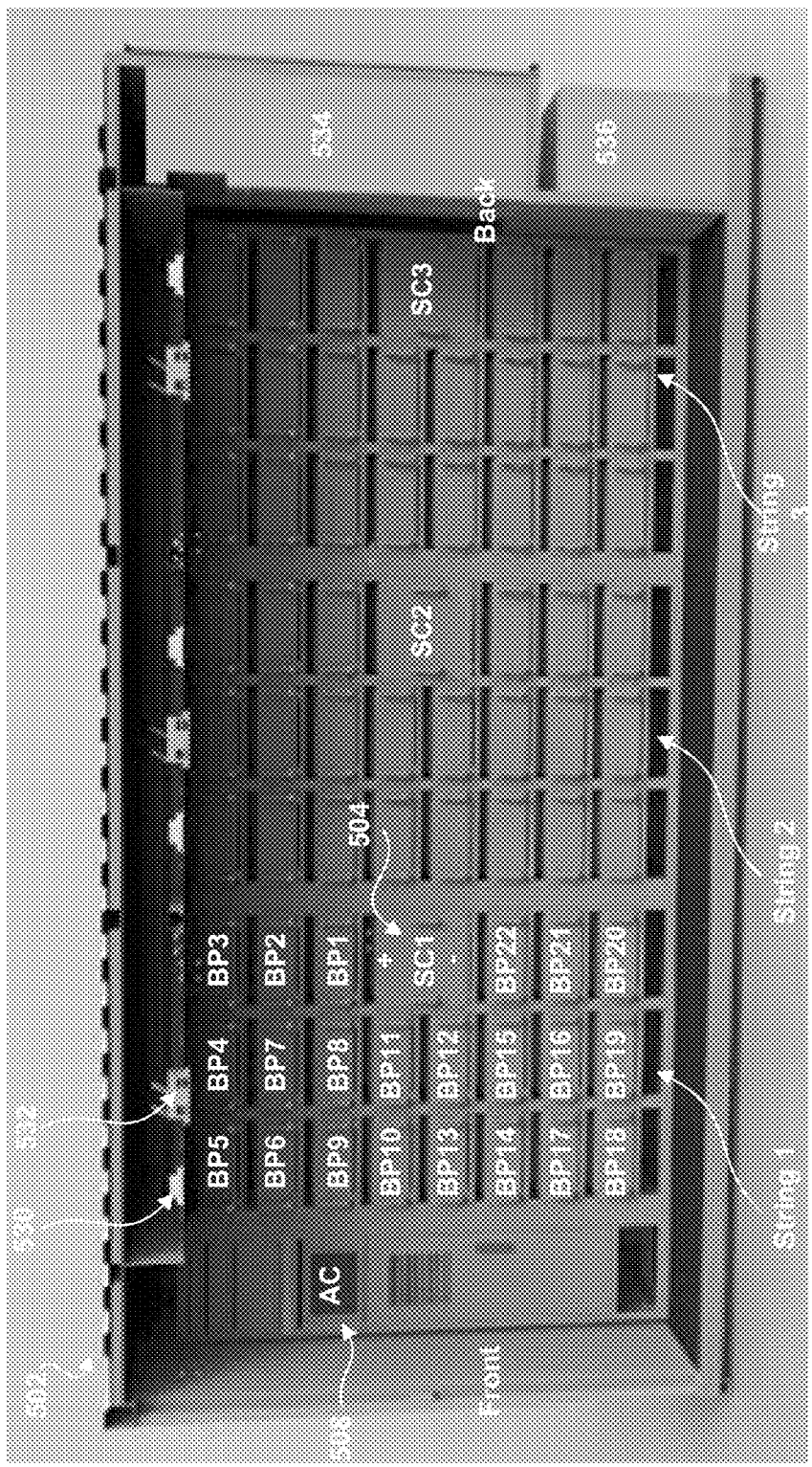
FIG. 5B is a diagram depicting a cross-sectional view of an example BESS.

FIG. 5B illustrates a cross-sectional view of an example BESS. FIG. 5B illustrates three battery pack strings ("String 1," "String 2," and "String 3"), each of which includes a string controller ("SC1," "SC2," and "SC3," respectively) and 22 battery packs connected in series. Strings 1-3 may be connected in parallel and controlled by array controller 508.

In String 1, each of the 22 battery packs is labeled ("BP1" through "BP22"), illustrating the order in which the battery packs are connected in series. That is, BP1 is connected to the positive terminal of a string controller (SC1) and to BP2, BP2 is connected to BP1 and BP3, BP3 is connected to BP2 and BP4, and so on. As shown, BP22 is connected to the negative terminal of SC1. In the illustrated arrangement, SC1 may access the middle of string 1 (i.e., BP11 and BP12). In an embodiment, this middle point is grounded and includes a ground fault detection device.

BESS 502 includes one or more lighting units 530 and one or more fans 532, which may be disposed at regular intervals in ceiling panels of BESS 502. Lighting units 530 can provide illumination to the interior of BESS 502. Fans 532 are oriented so that they blow down from the ceiling panels toward the floor of BESS 502 (i.e., they blow into the interior of BESS 502). BESS 502 also includes a split A/C unit including air handler 534 housed within the housing of BESS 502 and condenser 536 housed outside the housing of BESS 502. The A/C unit and fans 532 may be controlled (e.g., by array controller 508) to create an air flow system and regulate the temperature of the battery packs housed within BESS 502.

Example Battery Pack

Figure 6A:
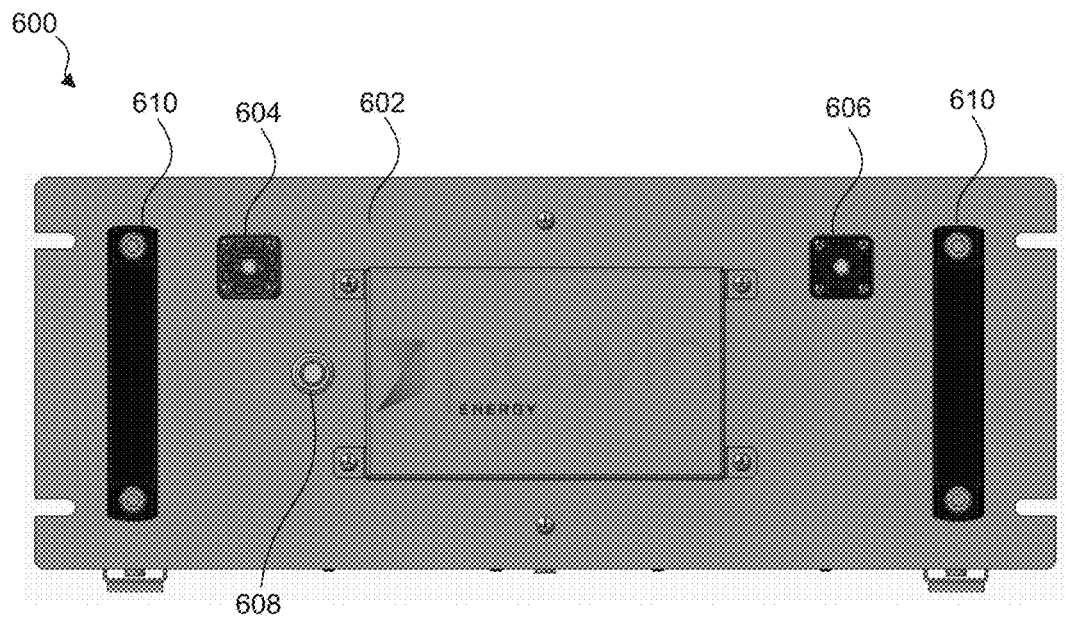
Figure 6B:
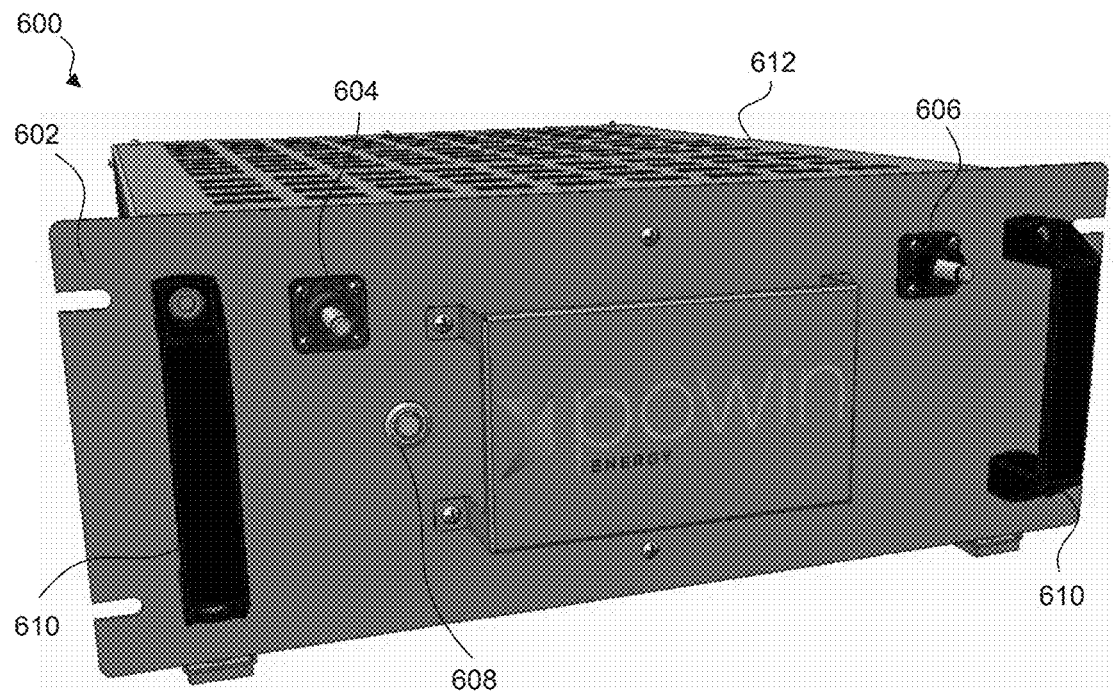
Figure 6C:
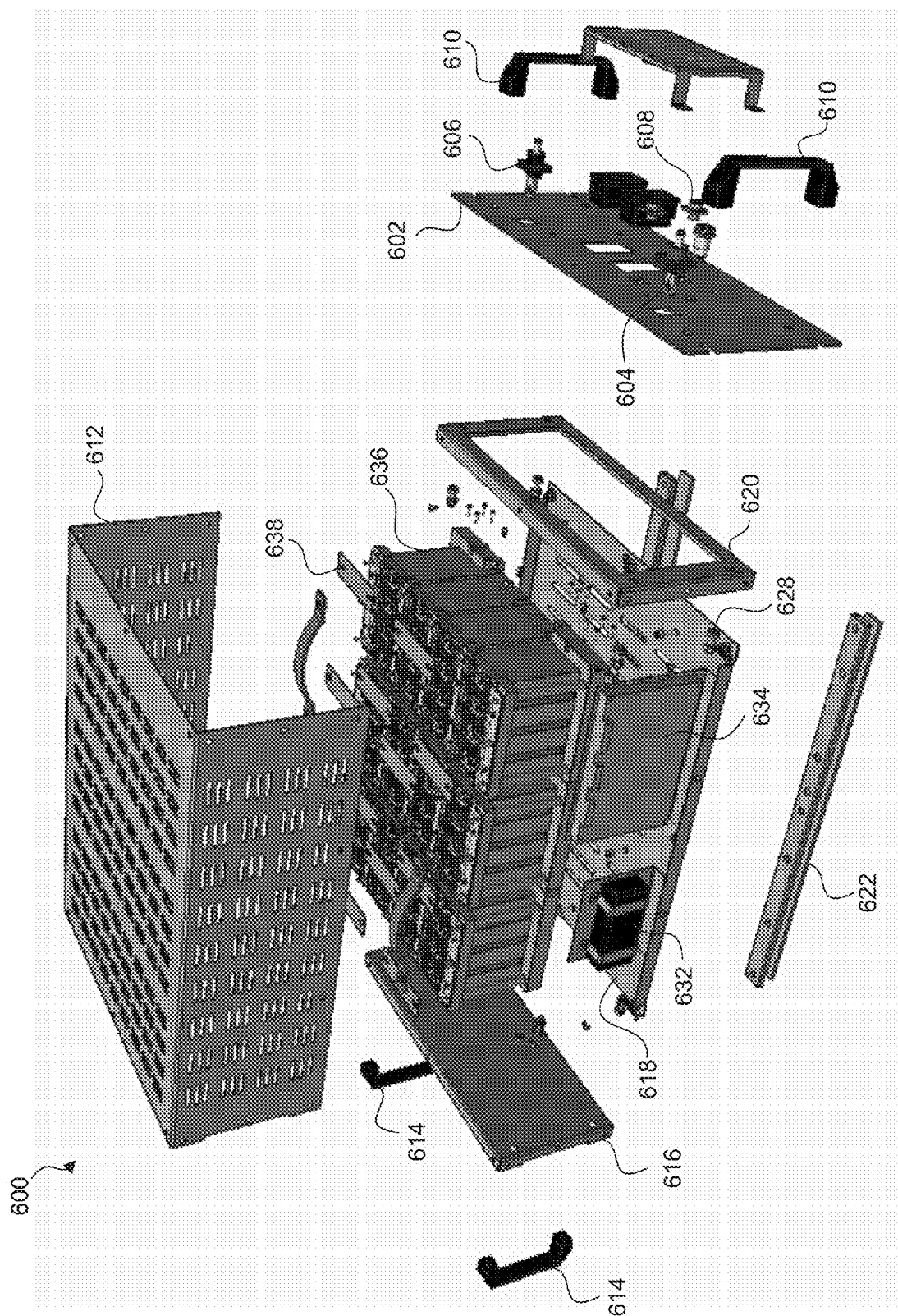

FIGS. 6A, 6B, 6C, and 6D are diagrams illustrating an example battery pack 600 according to an embodiment of the disclosure. Specifically, FIGS. 6A and 6B depict front views of battery pack 600, FIG. 6C depicts an exploded view of battery pack 600, and FIG. 6D depicts a front and side view of battery pack 600. As shown in FIGS. 6A-D, the housing of battery pack 600 may include a front panel 602, a lid or cover 612, a back panel 616, and a bottom 618. The lid 612, which includes left and right side portions, may include a plurality of air vents to facilitate air flow through battery pack 600 and aid in cooling the internal components of battery pack 600. In a non-limiting embodiment, the lid 612 is "U"-shaped and may be fabricated from a single piece of metal, plastic, or any other material known to one of ordinary skill in the art. The battery packs of FIG. 5 may be implemented as described in accordance with battery pack 600 of FIGS. 6A-D.

The housing of battery pack 600 may be assembled using fasteners 628 shown in FIG. 6C, which may be screws and bolts or any other fastener known to one of ordinary skill in the art. The housing of battery pack 600 may also include front handles 610 and back handles 614. As shown in FIG. 6C, front plate 602 may be coupled to lid 612 and bottom 618 via front panel mount 620. In one embodiment, battery pack 600 is implemented as a rack-mountable equipment module. For example, battery pack 600 may be implemented as a standard 19-inch rack (e.g., front panel 602 having a width of 19 inches, and battery pack 600 having a depth of between 22 and 24 inches and a height of 4 rack units or "U," where U is a standard unit that is equal to 1.752 inches). As shown in FIG. 6C, battery pack 600 may include one or more mounts 622 attached to bottom 618. Mount 622 may be used to secure battery pack 600 in a rack in order to arrange a plurality of battery packs in a stacked configuration (shown in BESS 400 of FIG. 4).

In FIGS. 6A-D, battery pack 600 includes a power connector 604 that may be connected to the negative terminal of the battery pack and a power connector 606 that may be connected to a positive terminal of the battery pack. In other embodiments, the power connector 604 may be used to connect to a positive terminal of the battery pack, and power connector 606 may be used to connect to a negative terminal of the battery pack. As shown in FIGS. 6A and 6B, the power connectors 604 and 606 may be provided on the front plate or panel 602 of battery pack 600. Power cables (not shown) may be attached to the power connectors 604 and 606 and used to add or remove energy from battery pack 600.

The front panel 602 of battery pack 600 may also include a status light and reset button 608. In one embodiment, status button 608 is a push button that can be depressed to reset or restart battery pack 600. In one embodiment, the outer ring around the center of button 608 may be illuminated to indicate the operating status of battery pack 600. The illumination may be generated by a light source, such as one or more light emitting diodes, that is coupled to or part of the status button 608. In this embodiment, different color illumination may indicate different operating states of the battery pack. For example, constant or steady green light may indicate that battery pack 600 is in a normal operating state; flashing or strobing green light may indicate that battery pack 600 is in a normal operating state and that battery pack 600 is currently balancing the batteries; constant or steady yellow light may indicate a warning or that battery pack 600 is in an error state; flashing or strobing yellow light may indicate a warning or that battery pack 600 is in an error state and that battery pack 600 is currently balancing the batteries; constant or steady red light may indicate that the battery pack 600 is in an alarm state; flashing or strobing red light may indicate that battery pack 600 needs to be replaced; and no light emitted from the status light may indicate that battery pack 600 has no power and/or needs to be replaced. In some embodiments, when the status light emits red light (steady or flashing) or no light, connectors in battery pack 600 or in an external controller are automatically opened to prevent charging or discharging of the batteries. As would be apparent to one of ordinary skill in the art, any color, strobing technique, etc., of illumination to indicate the operating status of battery pack 600 is within the scope of this disclosure.

Turning to FIGS. 6C-D, example components that are disposed inside the housing of battery pack 600 are shown, including (but not limited to) balancing charger 632, battery pack controller (BPC) 634, and battery module controller (BMC) 638. Balancing charger 632 may be a power supply, such as a DC power supply, and may provide energy to all of the battery cells in a battery pack. In an embodiment, balancing charger 632 may provide energy to all of the battery cells in the battery pack at the same time. BMC 638 is coupled to battery module 636 and may selectively discharge energy from the battery cells that are included in battery module 636, as well as take measurements (e.g., voltage and temperature) of battery module 636. BPC 634 may control balancing charger 632 and BMC 638 to balance or adjust the voltage and/or state of charge of a battery module to a target voltage and/or state of charge value.

As shown, battery pack 600 includes a plurality of battery modules and a BMC (e.g., battery module controller 638) is coupled to each battery module (e.g., battery module 636). In one embodiment, which is described in more detail below, n BMCs (where n is greater than or equal to 2) can be daisy-chained together and coupled to a BPC to form a single-wire communication network. In this example arrangement, each BMC may have a unique address and the BPC may communicate with each of the BMCs by addressing one or more messages to the unique address of any desired BMC. The one or more messages (which include the unique address of the BMC) may include an instruction, for example, to remove energy from a battery module, to stop removing energy from a battery module, to measure and report the temperature of the battery module, and to measure and report the voltage of the battery module. In one embodiment, BPC 634 may obtain measurements (e.g., temperature, voltage) from each of the BMCs using a polling technique. BPC 634 may calculate or receive (e.g., from a controller outside of battery pack 600) a target voltage for battery pack 600, and may use the balancing charger 632 and the network of BMCs to adjust each of the battery modules to the target voltage. Thus, battery pack 600 may be considered a smart battery pack, able to self-adjust its battery cells to a target voltage.

The electrical wiring that connects various components of battery pack 600 has been omitted from FIG. 6C to enhance viewability. However, FIG. 6D illustrates example wiring in battery pack 600. In the illustrated embodiment, balancing charger 632 and battery pack controller 634 may be connected to or mounted on the bottom 618. While shown as mounted on the left side of battery pack 600, balancing charger 632 and battery pack controller 634, as well as all other components disposed in battery pack 600, may be disposed at any location within battery pack 600.

Battery module 636 includes a plurality of battery cells. Any number of battery cells may be included in battery module 636. Example battery cells include, but are not limited to, Li ion battery cells, such as 18650 or 26650 battery cells. The battery cells may be cylindrical battery cells, prismatic battery cells, or pouch battery cells, to name a few examples. The battery cells or battery modules may be, for example, up to 100 AH battery cells or battery modules. In some embodiments, the battery cells are connected in series/parallel configuration. Example battery cell configurations include, but are not limited to, 1P16S configuration, 2P16S configuration, 3P16S configuration, 4P16S configuration, 1P12S configuration, 2P12S configuration, 3P12S configuration, and 4P12S configuration. Other configurations known to one of ordinary skill in the art are within the scope of this disclosure. Battery module 636 includes positive and negative terminals for adding energy to and removing energy from the plurality of battery cells included therein.

As shown in FIG. 6C, battery pack 600 includes 12 battery modules that form a battery assembly. In another embodiment, battery pack 600 may include 16 battery modules that form a battery assembly. In other embodiments, battery pack 600 may include 20 battery modules or 25 battery modules that form a battery assembly. As would be apparent to one of ordinary skill in the art, any number of battery modules may be connected to form the battery assembly of battery pack 600. In battery pack 600, the battery modules that are arranged as a battery assembly may be arranged in a series configuration.

In FIG. 6C, battery module controller 638 is coupled to battery module 636. Battery module controller 638 may be couple to the positive and negative terminals of battery module 636. Battery module controller 638 may be configured to perform one, some, or all of the following functions: remove energy from battery module 636, measure the voltage of battery module 636, and measure the temperature of battery module 636. As would be understood by one of ordinary skill in the art, battery module controller 638 is not limited to performing the functions just described. In one embodiment, battery module controller 638 is implemented as one or more circuits disposed on a printed circuit board. In battery pack 600, one battery module controller is coupled to or mounted on each of the battery modules in battery pack 600. Additionally, each battery module controller may be coupled to one or more adjacent battery module controllers via wiring to form a communication network. As illustrated in FIG. 7A, n battery module controllers (where n is a whole number greater than or equal to two) may be daisy-chained together and coupled to a battery pack controller to form a communication network.

FIG. 7A is a diagram illustrating an example communication network 700 formed by a battery pack controller and a plurality of battery module controllers according to an embodiment of the disclosure. In FIG. 7A, battery pack controller (BPC) 710 is coupled to n battery module controllers (BMCs) 720, 730, 740, 750, and 760. Said another way, n battery module controllers (where n is a whole number greater than or equal to two) are daisy-chained together and coupled to battery pack controller 710 to form communication network 700, which may be referred to as a distributed, daisy-chained battery management system (BMS). Specifically, BPC 710 is coupled to BMC 720 via communication wire 715, BMC 720 is coupled to BMC 730 via communication wire 725, BMC 730 is coupled to BMC 740 via communication wire 735, and BMC 750 is coupled to BMC 760 via communication wire 755 to form the communication network. Each communication wire 715, 725, 735, and 755 may be a single wire, forming a single-wire communication network that allows the BPC 710 to communicate with each of the BMCs 720-760, and vice versa. As would be apparent to one of skill in the art, any number of BMCs may be daisy chained together in communication network 700.

Each BMC in the communication network 700 may have a unique address that BPC 710 uses to communicate with individual BMCs. For example, BMC 720 may have an address of 0002, BMC 730 may have an address of 0003, BMC 740 may have an address of 0004, BMC 750 may have an address of 0005, and BMC 760 may have an address of 0006. BPC 710 may communicate with each of the BMCs by addressing one or more messages to the unique address of any desired BMC. The one or more messages (which include the unique address of the BMC) may include an instruction, for example, to remove energy from a battery module, to stop removing energy from a battery module, to measure and report the temperature of the battery module, and to measure and report the voltage of the battery module. BPC 710 may poll the BMCs to obtain measurements related to the battery modules of the battery pack, such as voltage and temperature measurements. Any polling technique known to one of skill in the art may be used. In some embodiments, BPC 710 continuously polls the BMCs for measurements in order to continuously monitor the voltage and temperature of the battery modules in the battery pack.

For example, BPC 710 may seek to communicate with BMC 740, e.g., in order to obtain temperature and voltage measurements of the battery module that BMC 740 is mounted on. In this example, BPC 710 generates and sends a message (or instruction) addressed to BMC 740 (e.g., address 0004). The other BMCs in the communication network 700 may decode the address of the message sent by BPC 710, but only the BMC (in this example, BMC 740) having the unique address of the message may respond. In this example, BMC 740 receives the message from BPC 710 (e.g., the message traverses communication wires 715, 725, and 735 to reach BMC 740), and generates and sends a response to BPC 710 via the single-wire communication network (e.g., the response traverses communication wires 735, 725, and 715 to reach BPC 710). BPC 710 may receive the response and instruct BMC 740 to perform a function (e.g., remove energy from the battery module it is mounted on). In other embodiments, other types of communication networks (other than communication network 700) may be used, such as, for example, an RS232 or RS485 communication network.

FIG. 7B is a flow diagram illustrating an example method 7000 for receiving instructions at a battery module controller, such as the battery module controller 638 of FIG. 6C or the battery module controller 720 of FIG. 7A. The battery module controller described with respect to FIG. 7B may be included in a communication network that includes more than one isolated, distributed, daisy-chained battery module controllers, such as the communication network 700 of FIG. 7A.

The method 7000 of FIG. 7B may be implemented as software or firmware that is executable by a processor. That is, each stage of the method 7000 may be implemented as one or more computer-readable instructions stored on a non-transient computer-readable storage device, which when executed by a processor causes the processor to perform one or more operations. For example, the method 7000 may be implemented as one or more computer-readable instructions that are stored in and executed by a processor of a battery module controller (e.g., battery pack module controller 638 of FIG. 6C or battery module controller 720 of FIG. 7A) that is mounted on a battery module (e.g., battery module 636 of FIG. 6C) in a battery pack (e.g., battery pack 600 of FIGS. 6A-6D).

As the description of FIG. 7B refers to components of a battery pack, for the sake of clarity, the components enumerated in an example embodiment of battery pack 600 of FIGS. 6A-6D and example communication network 700 of FIG. 7A are used to refer to specific components when describing different stages of the method 7000 of FIG. 7B. However, battery pack 600 of FIGS. 6A-6D and communication network 700 of FIG. 7A are merely examples, and the method 7000 may be implemented using embodiments of a battery pack other than the example embodiment depicted in FIGS. 6A-6D and a communication network 700 other than the example embodiment depicted in FIG. 7A.

Upon starting (stage 7010), the method 7000 proceeds to stage 7020 where the battery module controller receives a message. For example, a battery pack controller may communicate with the network of daisy-chained battery module controllers (e.g., FIG. 7A) in order to balance the batteries in a battery pack (e.g., battery pack 600 of FIGS. 6A-6D). The message may be received via a communication wire (e.g., communication wire 715 of FIG. 7A) at a communication terminal of the battery module controller. This communication may include (but is not limited to) instructing the network of battery module controllers to provide voltage and/or temperature measurements of the battery modules that they are respectively mounted on, and instructing the battery modules controllers to remove energy from or stop removing energy from the battery modules that they are respectively mounted on.

As discussed with respect to FIG. 7A, each battery module controller (e.g., BMC 720 of FIG. 7A) in a communication network (e.g., communication network 700 of FIG. 7A) may have a unique address that a battery pack controller (e.g., BPC 710 of FIG. 7A) uses to communicate with the battery module controllers. Thus, the message that is received at stage 7020 may include an address of the battery module controller that it is intended for and an instruction to be executed by that battery module controller. At stage 7030, the battery module controller determines whether the address included in the message matches the battery module controller's unique address. If the addresses do not match, the method 7000 returns to stage 7020 and the battery module controller waits for a new message. That is, the battery module controller ignores the instruction associated with the message in response to determining that the address associated with the message does not match the unique address of the battery module controller. If the addresses do match, the method 7000 advances to stage 7040.

In stage 7040, the battery module controller decodes the instruction that is included in the message and the method 7000 advances to stage 7050. In stage 7050, the battery module controller performs the instruction. Again, the instruction may be (but is not limited to) measure and report the temperature of the battery module, measure and report the voltage of the battery module, remove energy from the battery module (e.g., apply one or more shunt resistors across the terminals of the battery module), stop removing energy from the battery module (e.g., stop applying the one or more shunt resistors across the terminals of the battery module), or calibrate voltage measurements before measuring the voltage of the battery module. In various embodiments, temperature and voltage measurements may be sent as actual temperature and voltage values, or as encoded data that may be decoded after reporting the measurement. After stage 7050, the method 7000 loops back to stage 7020 and the battery module controller waits for a new message.

FIG. 8 is a diagram illustrating an example battery pack controller 800 according to an embodiment of the disclosure. Battery pack controller 634 of FIGS. 6C and 6D may be implemented as described in accordance with battery pack controller 800 of FIG. 8. Battery pack controller 710 of FIG. 7A may be implemented as described in accordance with battery pack controller 800 of FIG. 8.

As shown in FIG. 8, the example battery pack controller 800 includes a DC input 802 (which may be an isolated 5V DC input), a charger switching circuit 804, a DIP-switch 806, a JTAG connection 808, a CAN (CANBus) connection 810, a microprocessor unit (MCU) 812, memory 814, an external EEPROM 816, a temperature monitoring circuit 818, a status light and reset button 820, a watchdog timer 822, and a battery module controller (BMC) communication connection 824.

In one embodiment, battery pack controller 800 may be powered from energy stored in the battery cells. Battery pack controller 800 may be connected to the battery cells by DC input 802. In other embodiments, battery pack controller 800 may be powered from an AC to DC power supply connected to DC input 802. In these embodiments, a DC-DC power supply may then convert the input DC power to one or more power levels appropriate for operating the various electrical components of battery pack controller 800.

In the example embodiment illustrated in FIG. 8, charger switching circuit 804 is coupled to MCU 812. Charger switching circuit 804 and MCU 812 may be used to control operation of a balancing charger, such as balancing charger 632 of FIG. 6C. As described above, a balancing charger may add energy to the battery cells of the battery pack. In an embodiment, temperature monitoring circuit 818 includes one or more temperature sensors that can monitor the temperature heat sources within the battery pack, such as the temperature of the balancing charger that is used to add energy to the battery cells of the battery pack.

Battery pack controller 800 may also include several interfaces and/or connectors for communicating. These interfaces and/or connectors may be coupled to MCU 812 as shown in FIG. 8. In one embodiment, these interfaces and/or connectors include: DIP-switch 806, which may be used to set a portion of software bits used to identify battery pack controller 800; JTAG connection 808, which may be used for testing and debugging battery pack controller 800; CAN (CAN Bus) connection 810, which may be used to communicate with a controller that is outside of the battery pack; and BMC communication connection 824, which may be used to communicate with one or more battery module controllers, such as a distributed, daisy-chained network of battery module controllers (e.g., FIG. 7A). For example, battery pack controller 800 may be coupled to a communication wire, e.g., communication wire 715 of FIG. 7A, via BMC communication connection 824.

Battery pack controller 800 also includes an external EEPROM 816. External EEPROM 816 may store values, measurements, etc., for the battery pack. These values, measurements, etc., may persist when power of the battery pack is turned off (i.e., will not be lost due to loss of power). External EEPROM 816 may also store executable code or instructions, such as executable code or instructions to operate microprocessor unit 812.

Microprocessor unit (MCU) 812 is coupled to memory 814. MCU 812 is used to execute an application program that manages the battery pack. As described herein, in an embodiment the application program may perform the following functions (but is not limited thereto): monitor the voltage and temperature of the battery cells of battery pack 600, balance the battery cells of battery pack 600, monitor and control (if needed) the temperature of battery pack 600, handle communications between the battery pack and other components of a battery energy storage system, and generate warnings and/or alarms, as well as take other appropriate actions, to protect the battery cells of battery pack 600.

As described above, a battery pack controller may obtain temperature and voltage measurements from battery module controllers. The temperature readings may be used to ensure that the battery cells are operated within their specified temperature limits and to adjust temperature related values calculated and/or used by the application program executing on MCU 812. Similarly, the voltage readings are used, for example, to ensure that the battery cells are operated within their specified voltage limits.

Watchdog timer 822 is used to monitor and ensure the proper operation of battery pack controller 800. In the event that an unrecoverable error or unintended infinite software loop should occur during operation of battery pack controller 800, watchdog timer 822 can reset battery pack controller 800 so that it resumes operating normally. Status light and reset button 820 may be used to manually reset operation of battery pack controller 800. As shown in FIG. 8, status light and reset button 820 and watchdog timer 822 may be coupled to MCU 812.

FIG. 9 is a diagram illustrating an example battery module controller 900 according to an embodiment of the disclosure. Battery module controller 638 of FIGS. 6C and 6D may be implemented as described in accordance with battery module controller 900 of FIG. 9. Each of battery module controllers 720, 730, 740, 750, and 760 of FIG. 7A may be implemented as described in accordance with battery module controller 900 of FIG. 9. Battery module controller 900 may be mounted on a battery module of a battery pack and may perform the following functions (but is not limited thereto): measure the voltage of the battery module, measure the temperature of the battery module, and remove energy from (discharge) the battery module.

In FIG. 9, the battery module controller 900 includes processor 905, voltage reference 910, one or more voltage test resistors 915, power supply 920, fail safe circuit 925, shunt switch 930, one or more shunt resistors 935, polarity protection circuit 940, isolation circuit 945, and communication wire 950. Processor 905 controls the battery module controller 900. Processor 905 receives power from the battery module that battery module controller 900 is mounted on via the power supply 920. Power supply 920 may be a DC power supply. As shown in FIG. 9, power supply 920 is coupled to the positive terminal of the battery module, and provides power to processor 905. Processor 905 is also coupled to the negative terminal of the battery module via polarity protection circuit 940, which protects battery module controller 900 in the event that it is improperly mounted on a battery module (e.g., the components of battery module controller 900 that are coupled to the positive terminal in FIG. 9 are improperly coupled to the negative terminal and vice versa).

Battery module controller 900 may communicate with other components of a battery pack (e.g., a battery pack controller, such as battery pack controller 634 of FIG. 6C) via communication wire 950, which may be a single wire. As described with respect to the example communication network of FIG. 7A, communication wire 950 may be used to daisy chain battery module controller 900 to a battery pack controller and/or one or more other battery module controllers to form a communication network. Communication wire 950 may be coupled to battery pack controller 900 via a communication terminal disposed on battery pack controller 900. As such, battery module controller 900 may send and receive messages (including instructions sent from a battery pack controller) via communication wire 950. When functioning as part of a communication network, battery module controller 900 may be assigned a unique network address, which may be stored in a memory device of the processor 905.

Battery module controller 900 may be electrically isolated from other components that are coupled to the communication wire (e.g., battery pack controller, other battery module controllers, computing systems external to the battery pack) via isolation circuit 945. In the embodiment illustrated in FIG. 9, isolation circuit 945 is disposed between communication wire 950 and processor 905. Again, communication wire 950 may be coupled to battery pack controller 900 via a communication terminal disposed on battery pack controller 900. This communication terminal may be disposed between communication wire 950 and isolation circuit 945, or may be part of isolation circuit 945. Isolation circuit 945 may capacitively couple processor 905 to communication wire 950, or may provide other forms of electrical isolation known to those of skill in the art.

As explained above, battery module controller 900 may measure the voltage of the battery module it is mounted on. As shown in FIG. 9, processor 905 is coupled to voltage test resistor 915, which is coupled to the positive terminal of the battery module. Processor 905 may measure the voltage across voltage test resistor 915, and compare this measured voltage to voltage reference 910 to determine the voltage of the battery module. As described with respect to FIG. 7A, battery module controller 900 may be instructed to measure the voltage of the battery module by a battery pack controller. After performing the voltage measurement, processor 905 may report the voltage measurement to a battery pack controller via communication wire 950.

Battery module controller 900 may also remove energy from the battery module that it is mounted on. As shown in FIG. 9, processor 905 is coupled to fail safe circuit 925, which is coupled to shunt switch 930. Shunt switch 930 is also coupled to the negative terminal via polarity protection circuit 940. Shunt resistor 935 is disposed between the positive terminal of the battery module and shunt switch 930. In this embodiment, when shunt switch 930 is open, shunt resistor 935 is not applied across the positive and negative terminals of the battery module; and when shunt switch 930 is closed, shunt resistor 935 is applied across the positive and negative terminals of the battery module in order to remove energy from the battery module. Processor 905 may instruct shunt switch 930 to selectively apply shunt resistor 935 across the positive and negative terminals of the battery module in order to remove energy from the battery module. In one embodiment, processor 905 instructs shunt switch 930 at regular intervals (e.g., once every 30 seconds) to apply shunt resistor 935 in order to continuously discharge the battery module.

Fail safe circuit 925 may prevent shunt switch 930 from removing too much energy from the battery module. In the event that processor 905 malfunctions, fail safe circuit 925 may instruct shunt switch 930 to stop applying shunt resistor 935 across the positive and negative terminals of the battery module. For example, processor 905 may instruct shunt switch 930 at regular intervals (e.g., once every 30 seconds) to apply shunt resistor 935 in order to continuously discharge the battery module. Fail safe circuit 925, which is disposed between processor 905 and shunt switch 930, may monitor the instructions processor 905 sends to shunt switch 930. In the event that processor 905 fails to send a scheduled instruction to the shunt switch 930 (which may be caused by a malfunction of processor 905), fails safe circuit 925 may instruct or cause shunt switch 930 to open, preventing further discharge of the battery module. Processor 905 may instruct fail safe circuit 925 to prevent shunt switch 930 from discharging the battery module below a threshold voltage or state-of-charge level, which may be stored or calculated in battery module controller 900 or in an external controller (e.g., a battery pack controller).

Battery module controller 900 of FIG. 9 also includes temperature sensor 955, which may measure the temperature of the battery module that battery module controller 900 is connected to. As depicted in FIG. 9, temperature sensor 955 is coupled to processor 905, and may provide temperature measurements to processor 905. Any temperature sensor known to those skilled in the art may be used to implement temperature sensor 955.

FIG. 10 is a graph illustrating state of charge (SOC) verses output voltage for an example battery pack. The shape of the curve depicted in FIG. 10 may differ depending on battery chemistry; but, for the sake of this discussion, most or all batteries follow a similar trend. Additionally, different batteries may have different minimum and maximum voltage. For example, Lithium-Cobalt-Manganese batteries have a range close to 2.5V-4.2V, while Lithium-Iron Phosphate batteries have an approximate range of 2.0V-3.65V.

Considering FIG. 10, a BESS unit may allow its battery packs to charge and discharge within a limited range of their SOC (for example between 60% and 85% of their full charge as shown in range 1 in FIG. 10) while performing a first function. For example, battery packs may be charged/discharged within range 1 when a BESS unit is used for frequency stabilization of the power grid. The battery packs may then be charged/discharged within range 2 when the BESS unit is used to supplement an alternative energy source, such as a solar plant, when the alternative energy source is failing to produce the desired amount of energy (e.g., due to clouds passing over the solar array of a solar farm). In another example embodiment, battery packs may be allowed to fully charge and fully discharge, or charge/discharge in another desired operating range of SOC values.

Example String Controller

FIG. 11 is a diagram illustrating an example string controller 1100. Specifically, FIG. 11 illustrates example components of a string controller 1100. The example components depicted in FIG. 11 may be used to implement the disclosed string controller 504 of FIG. 5A. String controller 1100 includes a string control board 1124 that controls the overall operation of string controller 1100. String control board 1124 may be implemented as one or more circuits or integrated circuits mounted on a printed circuit board (for example, string control board 1230 of FIG. 12A). String control board 1124 may include or be implemented as a processing unit, such as a microprocessor unit (MCU) 1125, memory 1127, and executable code. Units 1126, 1128, 1130, 1132, and 1142 illustrated in string control board 1124 may be implemented in hardware, software, or a combination of hardware and software. Units 1126, 1128, 1130, 1132, and 1142 may be individual circuits mounted on a print circuit board or a single integrated circuit.

The functions performed by string controller 1100 may include, but are not limited to, the following: issuing battery string contactor control commands, measuring battery string voltage; measuring battery string current; calculating battery string Amp-hour count; relaying queries between a system controller (e.g., at charging station) and battery pack controllers; processing query response messages; aggregating battery string data; performing software device ID assignment to the battery packs; detecting ground fault current in the battery string; and detect alarm and warning conditions and taking appropriate corrective actions. MCU 1125 may perform these functions by executing code that is stored in memory 1127.

String controller 1100 includes battery string terminals 1102 and 1104 for coupling to the positive and negative terminals, respectively, of a battery string (also referred to as a string of battery packs). Battery string terminals 1102 and 1104 are coupled to voltage sense unit 1142 on string control board 1124 that can be used to measure battery string voltage.

String controller 1100 also includes PC'S terminals 1106 and 1108 for coupling to the positive and negative terminals, respectively of a power control system (PCS). As shown, positive battery string terminal 1102 is coupled to positive PC'S terminal 1106 via contactor 1116, and negative battery string terminal 1104 is coupled to negative PCS terminal 1108 via contactor 1118. String control board 1124 controls contactors 1116 and 1118 (to open and close) via contactor control unit 1126 and 1130, respectively, allowing the battery string to provide energy to the PCS (discharging) or receive energy from the PCS (charging) when contractors 1116 and 1118 are closed. Fuses 1112 and 1114 protect the battery string from excessive current flow.

String controller 1100 also includes communication terminals 1110 and 1112 for coupling to other devices. In an embodiment, communication terminal 1110 may couple string controller 1100 to the battery pack controllers of the battery string, allowing string controller 1100 to issue queries, instructions, and the like. For example, string controller 1100 may issue an instruction used by the battery packs for cell balancing. In an embodiment, communication terminal 1112 may couple string controller 1100 to an array controller, such as array controller 508 of FIG. 5A. Communication terminals 1110 and 1112 may allow string controller 1100 to relay queries between an array controller (e.g., array controller 508 of FIG. 5A) and battery pack controllers, aggregate battery string data, perform software device ID assignment to the battery packs, detect alarm and warning conditions and taking appropriate corrective actions, as well as other functions. In systems that do not include an array controller, the string controller may be coupled to a system controller.

String controller 1100 includes power supply unit 1122. Power supply 1220 of FIG. 12A may be implemented as described with respect to power supply unit 1122 of FIG. 11. In this embodiment, power supply unit 1122 can provide more than one DC supply voltage. For example, power supply unit 1122 can provide one supply voltage to power string control board 1124, and another supply voltage to operate contactors 1116 and 1118. In an embodiment, a +5V DC supply may be used for string control board 1122, and +12V DC may be used to close contactors 1116 and 1118.

String control board 1124 includes current sense unit 1128 which receives input from current sensor 1120, which may allow the string controller to measure battery string current, calculate battery string amp-hour count, as well as other functions. Additionally, current sense unit 1128 may provide an input for overcurrent protection. For example, if overcurrent (a current level higher than a pre-determined threshold) is sensed in current sensor 1120, current sensor unit 1128 may provide a value to MCU 1125, which instructs contactor control units 1126 and 1130 to open contactors 1116 and 1118, respectively, disconnecting battery string from PCS. Again, fuses 1112 and 1114 may also provide overcurrent protection, disconnecting battery sting from the PCS when a threshold current is exceeded.

String controller 1100 includes battery voltage and ground fault detection (for example, battery voltage and ground fault detection 1210 of FIG. 12A). Terminals 1138 and 1140 may couple string controller 1100 to battery packs in the middle of battery pack string. For example, in a string of 22 battery packs, terminal 1138 may be connected to the negative terminal of battery pack 11 and terminal 1140 may be connected to the positive terminal of battery pack 12. Considering FIG. 5B, SC1 may be coupled to BP11 and BP12 via terminals 1138 and 1140. Ground fault detection unit 1132 measures the voltage at the middle of the battery string using a resistor 1134 and provides ground fault detection. Fuse 1136 provides overcurrent protection.

FIGS. 12A-12B are diagrams illustrating an example string controller 1200. As shown in FIG. 12A, string controller 1200 includes battery voltage and ground fault detection unit 1210, power supply 1220, string control board 1230, positive fuse 1240, and positive contactor 1250. FIG. 12B illustrates another angle of string controller 1200 and depicts negative fuse 1260, negative contactor 1270, and current sensor 1280. These components are described in more detail with respect to FIG. 11.

Example Battery Pack Balancing Algorithm

FIG. 13 is a flow diagram illustrating an example method 1300 for balancing a battery pack, such as battery pack 600 of FIGS. 6A-6D that includes a plurality of battery modules, a balancing charger, a battery pack controller, and a network of isolated, distributed, daisy-chained battery module controllers. The method 1300 may be implemented as software or firmware that is executable by a processor. That is, each stage of the method 1300 may be implemented as one or more computer-readable instructions stored on a non-transient computer-readable storage device, which when executed by a processor causes the processor to perform one or more operations. For example, the method 1300 may be implemented as one or more computer-readable instructions that are stored in and executed by a battery pack controller (e.g., battery pack controller 634 of FIG. 6C) in a battery pack (e.g., battery pack 600 of FIGS. 6A-6D).

As the description of FIG. 13 refers to components of a battery pack, for the sake of clarity, the components enumerated in an example embodiment of battery pack 600 of FIGS. 6A-6D are used to refer to specific components when describing different stages of the method 1300 of FIG. 13. However, battery pack 600 of FIGS. 6A-6D is merely an example, and the method 1300 may be implemented using embodiments of a battery pack other than the exemplary embodiment depicted in FIGS. 6A-6D.

Upon starting, the method 1300 proceeds to stage 1310 where a target voltage value is received by a battery pack controller, such as battery pack controller 634. The target value may be used to balance the voltage and/or state of charge of each battery module (e.g., battery module 636) in the battery pack and may be received from an external controller, such as a string controller described with respect to FIG. 5A or FIG. 11 or FIGS. 12A-12B. In stage 1315, the battery modules are polled for voltage measurements. For example, battery pack controller 634 may request a voltage measurement from each of the battery modules controllers (e.g., battery module controller 638) that are mounted on the battery modules. Again, one battery module controller may be mounted on each of the battery modules. Each battery module controller may measure the voltage of the battery module that it is mounted on, and communicate the measured voltage to the battery pack controller 634. And as discussed with respect to FIG. 7A, a battery pack controller and a plurality of isolated, distributed, daisy-chained battery module controllers may be coupled together to form a communication network. Polling may be performed sequentially (e.g., poll BMC 720, followed by BMC 730, followed by BMC 740, and so on). In an embodiment, a target state of charge value may be received at stage 1310 instead of a target voltage value.

In stage 1320, a determination is made as to whether each polled battery module voltage is in an acceptable range. This acceptable range may be determined by one or more threshold voltage values above and/or below the received target voltage. For example, battery pack controller 634 may use a start discharge value, a stop discharge value, a start charge value, and a stop charge value that are used to determine whether balancing of battery modules should be performed. In an embodiment, the start discharge value may be greater than the stop discharge value (both of which may be greater than the target value), and the start charge value may be less than the stop charge value (both of which may be less than the target value). These threshold values may be derived by adding stored offset values to the received target voltage value. In an embodiment, the acceptable range may lie between the start discharge value and the start charge value, indicating a range in which no balancing may be necessary. If all battery module voltages are within the acceptable range, method 1300 proceeds to stage 1325. In stage 1325, a balancing charger (e.g., balancing charger 632) is turned off (if on) and shunt resistors of each battery module controller 638 that have been applied, such as shunt resistors 935 of FIG. 9, are opened to stop removing energy from the battery module. For example, battery pack controller 634 may instruct balancing charger 632 to stop providing energy to the battery modules of battery pack 600. Battery pack controller 634 may also instruct each battery module controller that is applying a shunt resistor to the battery module it is mounted on to stop applying the shunt resistor, and thus stop removing energy from the battery module. Method 1300 then returns to step 1315 where the battery modules of the battery pack are again polled for voltage values.

Returning to stage 1320, if all battery module voltages are not within the acceptable range, the method proceeds to stage 1330. In stage 1330, for each battery module, it is determined whether the battery module voltage is above the start discharge value. If the voltage is above the start discharge value, method 1300 proceeds to stage 1335 where shunt resistors of the battery module controller (e.g., battery module controller 638) coupled to the battery module are applied in order to remove (discharge) energy from the battery module. The method then continues to stage 1340.

In stage 1340, for each battery module, it is determined whether the battery module voltage is below the stop discharge value. If the voltage is below the stop discharge value, method 1300 proceeds to stage 1345 where shunt resistors of the battery module controller (e.g., battery module controller 638) coupled to the battery module are opened in order to stop discharging energy from the battery module. That is, the battery module controller stops applying the shunt resistor(s) across the terminals of the battery module it is mounted on. This prevents the battery module controller from removing energy from the battery module. The method then continues to stage 1350.

In stage 1350, it is determined whether at least one battery module voltage is below the start charge value. If any voltage is below the start charge value, method 1300 proceeds to stage 1355 where a balancing charger is turned on to provide energy to all of the battery modules. For example, battery pack controller 634 may instruct balancing charger 632 to turn on, providing energy to each of the battery modules in the battery pack 600. Method 1300 then continues to stage 1360.

In stage 1360, it is determined whether all battery module voltages are above the stop charge value. If all voltages are above the stop charge value, method 1300 proceeds to stage 1365 where a balancing charger is turned off (if previously on) to stop charging the battery modules of the battery pack. For example, battery pack controller 634 may instruct balancing charger 632 to stop providing energy to the battery modules of battery pack 600. Method 1300 then returns to stage 1315 where the battery modules are again polled for voltage measurements. Thus, as previously described, stages 1315 to 1360 of method 1300 may be used to continuously balance the energy of the battery modules within a battery pack, such as battery pack 600.

Example BESS Housing

FIGS. 14A, 14B, and 14C are diagrams illustrating the housing (e.g., a customized shipping container) of an example BESS 1400. In FIGS. 14A-14C, the back and front of the housing of BESS 1400 are labeled. As shown, one or more PCSs 1410 may be mounted on the back of BESS 1400, which couple BESS 1400 to the power grid. The front of BESS 1400 may include one or more doors (not shown) that provide access to the inside of the housing. An operator may enter BESS 1400 through the doors and access the internal components of BESS 1400 (e.g., battery packs, computers, etc.). FIG. 14A depicts BESS 1400 with the top of its housing in place.

FIG. 14B depicts BESS 1400 with the top of its housing removed. As seen. BESS 1400 includes one or more ceiling panels 1420, one or more lighting units 1430, and one or more fans 1440. Lighting units 1430 and fans 1440 may be disposed at regular intervals in ceiling panels 1420. Lighting units 1430 can provide illumination to the interior of BESS 1400. Fans 1440 are oriented so that they blow down from ceiling panels 1420 toward the floor of BESS 1400 (i.e., they blow into the interior of BESS 1400). Openings 1450, which are above the racks of battery packs housed in BESS 1400, allow warm air to flow up to the space between the top of the housing and ceiling panels 1420, creating a hot air region above ceiling panels 1420. FIG. 14C depicts BESS 1400 with ceiling panels 1420 removed. As can be seen, openings 1450 are disposed above racks of battery packs that are housed in BESS 1400.

FIGS. 15A, 15B, and 15C are diagrams illustrating an example BESS 1500 without its housing (i.e., the internal structures of BESS 1500). FIGS. 15A and 15B show racks of battery packs housed within BESS 1500 from different angles. FIG. 15C illustrates a front view of BESS 1500. This is the view that may be seen by an operator that opens the doors at the front of BESS 1500 and enters BESS 1500 to perform maintenance or testing. FIG. 15C illustrates split A/C unit 1510 at the back of BESS 1500. A/C unit 1510 is controlled (e.g., by an array controller) to regulate the temperature of BESS 1500. A/C unit 1510 provides cool air to the interior of BESS 1500 and creates a cool air region in the aisle of BESS 1500.

FIG. 16 illustrates another front view of an example BESS 1600 and depicts air flow in BESS 1600. As explained with respect to FIGS. 14A-14C and 15A-15C, fans in the ceiling panels of BESS 1600 blow hot air from hot air region 1610 above the ceiling toward the floor of BESS 1600. An A/C unit at the back of BESS 1600 draws the hot air out of BESS 1600 and provides cool air to the interior of BESS 1600, creating cool air region 1620. The cool air regulates the temperature of the battery packs housed in BESS 1600, and raises to hot air region 1610 as it cools the battery packs.

Example Warranty Tracker for a Battery Pack

In an embodiment, a warranty based on battery usage for a battery pack, such as battery pack 600 of FIGS. 6A-6D, may take into account various data associated with the battery pack, such as but not limited to, charge and discharge rates, battery temperature, and battery voltage. As should be apparent to a person of skill in the art, the warranty tracker disclosed below may be implemented and used in the systems and methods described above. A warranty tracker embedded in the battery pack may use this data to compute a warranty value representing battery usage for a period of time. Calculated warranty values may be aggregated over the life of the battery, and the cumulative value may be used to determine warranty coverage. With this approach, the warranty may not only factor in the total discharge of the battery pack, but also the manner in which the battery pack has been used. Various data used to calculate warranty values, according to an embodiment, are discussed further with respect to FIGS. 17-20.

Charge and discharge rates of a battery pack are related to and can be approximated or determined based on the amount of electric current flowing into and out of the battery pack, which can be measured. In general, higher charge and discharge rates may produce more heat (than lower rates), which may cause stress on the battery pack, shorten the life of the battery pack, and/or lead to unexpected failures or other issues. FIG. 17 is a diagram illustrating an example correlation between an electric current measurement and a current factor used in the calculation of a warranty value according to an embodiment. Electric current may be directly measured for a battery pack, such as battery pack 600 of FIGS. 6A-6D, and may provide charge and/or discharge rates of the battery pack.

Normal charge and discharge rates for batteries of different capacities may vary. For this reason, in an embodiment, electric current measurements may be normalized in order to apply a standard for determining normal charge and discharge rates for different battery packs. One of skill in the art will recognize that the measured electric current may be normalized based on the capacity of the battery pack, producing a C-rate. As an example, a normalized rate of discharge of 1C would deliver the battery pack's rated capacity in one hour, e.g., a 1,000 mAh battery would provide a discharge current of 1,000 mA for one hour. The C-rate may allow the same standard to be applied for determining normal charge and discharge, whether the battery pack is rated at 1,000 mAh or 100 Ah or any other rating known to one of ordinary skill in the art.

Still considering FIG. 17, example plot 1702 illustrates current factor 1706 as a function of a normalized C-rate 1704, according to an embodiment. Electric current measurements may be used to calculate warranty values by converting the measured electric current to a corresponding current factor. In an embodiment, the measured electric current is first normalized to produce a C-rate. The C-rate indicates the charge or discharge rate of the battery pack and allows for consistent warranty calculations regardless of the capacity of the battery pack. The C-rate may then be mapped to current factors for use in warranty calculations. For example, a normalized C-rate of 1C may be mapped to a current factor of 2, whereas a C-rate of 3C may be mapped to a current factor of 10, indicating a higher rate of charge or discharge. In an embodiment, separate sets of mappings may be maintained for charge and discharge rates. In an embodiment, these mappings may be stored in a lookup table residing in a computer-readable storage device within the battery pack. In another embodiment, mappings and current factors may be stored in a computer-readable storage device that is external to the battery pack. Alternatively, in an embodiment, a predefined mathematical function may be applied to C-rates or electric current measurements to produce a corresponding current factor, rather than explicitly storing mappings and current factors.

In an embodiment, calculated C-rates above a maximum C-rate warranty threshold 1708 may immediately void the warranty of the battery pack. This threshold may be predefined or set dynamically by the warranty tracker. In a non-limiting example, maximum warranty threshold 1708 may be set to a C-rate of 2C. Calculated C-rates above maximum warranty threshold 1708 may indicate improper usage of the battery pack, and hence the warranty may not cover subsequent issues that arise. In an embodiment, maximum warranty thresholds may be defined for both the rate of charge and discharge of the battery pack, rather than maintaining a single threshold for both charge and discharge.

Temperature is another factor that may affect battery performance. In general, higher temperatures may cause the battery pack to age at a faster rate by generating higher internal temperatures, which causes increased stress on the battery pack. This may shorten the life of a battery pack. On the other hand, lower temperatures may, for example, cause damage when the battery pack is charged.

FIG. 18 is a diagram illustrating an example correlation between a temperature measurement and a temperature factor used in the calculation of a warranty value according to an embodiment. A battery pack, such as battery pack 600 of FIGS. 6A-6D, may include one or more battery temperature measurement circuits that measure the temperature of the individual battery cells or the individual battery modules within the battery pack. Example plot 1802 illustrates temperature factor 1806 as a function of measured temperature 1804, according to an embodiment. Temperature measurements may be used to calculate warranty values by converting the measured temperature to a corresponding temperature factor. In an embodiment, temperature measurements may be mapped to temperature factors for use in warranty calculations. For example, a normal operating temperature of 20° C. may be mapped to a temperature factor of 1, whereas a higher temperature of 40° C. would be mapped to a higher temperature factor. A higher temperature factor may indicate that battery wear is occurring at a faster rate. In an embodiment, these mappings may be stored in a lookup table residing in a computer-readable memory device within the battery pack. In another embodiment, mappings and temperature factors may be stored in a computer-readable memory device that is external to the battery pack. Alternatively, in an embodiment, a predefined mathematical function may be applied to temperature measurements to produce a corresponding temperature factor, rather than explicitly storing mappings and temperature factors.

Warranty thresholds may also be a function of battery temperature such as, for example, charging the battery pack when the temperature is below a predefined value. In an embodiment, operating temperatures below a minimum temperature warranty threshold 1808 or above a maximum temperature warranty threshold 1810 may immediately void the warranty of the battery pack. These thresholds may be predefined or set dynamically by the warranty tracker. Operating temperatures below minimum warranty threshold 1808 or above maximum warranty threshold 1810 may indicate improper usage of the battery pack, and hence the warranty may not cover subsequent operating issues or defects that arise. In an embodiment, minimum and maximum warranty thresholds may be defined for both charging and discharging the battery pack rather than maintaining the same thresholds for both charging and discharging.

Voltage and/or state-of-charge are additional factors that may affect battery performance. The voltage of a battery pack, which may be measured, may be used to calculate or otherwise determine the state-of-charge of the battery pack. In general, very high or very low states of charge or voltages cause increased stress on the battery pack. This, again, may shorten the life of the battery pack.

FIG. 19 is a diagram illustrating an example correlation between a voltage measurement and a voltage factor used in the calculation of a warranty value according to an embodiment. A battery pack, such as battery pack 600 of FIGS. 6A-6D, may include a battery voltage measurement circuit that measures the voltage of individual battery cells or the voltage of battery modules within the battery pack. These voltage measurements may be aggregated or averaged for use in calculating warranty values for the battery pack. In an embodiment, the state-of-charge of the battery pack may be calculated and used in the calculation of a warranty value; however, this calculation is not always accurate and so care must be taken in determining a warranty calculation factor. In an embodiment, the measured voltage of the battery pack may be the average measured voltage of each battery cell or each battery module contained within the battery pack.

In FIG. 19, example plot 1902 illustrates voltage factor 1906 as a function of measured voltage 1904, according to an embodiment. Voltage measurements may be used to calculate warranty values by converting the measured voltage to a corresponding voltage factor. In an embodiment, voltage measurements may be mapped to voltage factors for use in warranty calculations. These mappings may be specific to the type of battery cells contained in the battery pack. For example, a battery pack including one or more lithium-ion battery cells may have an average cell voltage measurement of 3.2V, which may be mapped to a voltage factor of 1. In contrast, a voltage measurement of 3.6V or 2.8V may be mapped to a higher voltage factor. In an embodiment, these mappings may be stored in a lookup table residing in a computer-readable memory device within the battery pack. In another embodiment, mappings and voltage factors may be stored in a computer-readable memory device external to the battery pack. Alternatively, in an embodiment, a predefined mathematical function may be applied to voltage measurements to produce a corresponding voltage factor, rather than explicitly storing mappings and voltage factors.

In an embodiment, measured voltages below a minimum voltage warranty threshold 1908 or above a maximum voltage warranty threshold 1910 may immediately void the warranty of the battery pack. These thresholds may be predefined or set dynamically by the warranty tracker. In a non-limiting example, minimum and maximum warranty thresholds 1908 and 1910 may be set to voltages indicating the over-discharging and over-charging of the battery cells, respectively. Measured voltages below minimum warranty threshold 1908 or above maximum warranty threshold 1910 may indicate improper usage of the battery pack, and hence the warranty may not cover subsequent issues that arise.

FIG. 20 is a diagram illustrating example warranty thresholds used for voiding a warranty for a battery pack according to an embodiment. As previously described, improper usage of a battery pack may cause a warranty to be automatically voided. For example, extreme operating temperatures, voltages, or charge/discharge rates may immediately void a warranty.

In various embodiments, a battery pack may store the minimum recorded voltage 2001, maximum recorded voltage 2002, minimum recorded temperature 2003, maximum recorded temperature 2004, maximum recorded charging electric current 2005, and maximum recorded discharging electric current 2006 for the life of the battery pack. These values may be recorded by any device or combination of devices capable of measuring or calculating the aforementioned data, such as (but not limited to) one or more battery voltage measurement circuit(s), battery temperature measurement circuit(s), and electric current measurement circuit(s), respectively, which are further described with respect to FIGS. 19-20. In an alternate embodiment, the battery pack may store in a computer-readable memory device a maximum recorded electric current, rather than both a maximum charging and discharging electric current. In an embodiment, data measurements may be recorded in a computer-readable memory device periodically during the life of the battery. For minimum values 2001 and 2003, if a newly recorded value is less than the stored minimum value, the previously stored minimum value is overwritten with the newly recorded value. For maximum values 2002, 2004, 2005, and 2006, if a newly recorded value is greater than the stored maximum value, the previously stored maximum value is overwritten with the newly recorded value.

In an embodiment, each battery pack may maintain a list of warranty threshold values, for example warranty threshold values 2011-2016, in a computer-readable storage device. In another embodiment, the list of warranty threshold values may be maintained in a computer-readable storage device that is external to the battery pack. Warranty threshold values may indicate minimum and maximum limits used to determine uses of the battery pack that are outside the warranty coverage. The warranty tracker may periodically compare the stored minimum and maximum values 2001-2006 to warranty threshold values 2011-2016 to determine whether a warranty for the battery pack should be voided.

In an embodiment, the battery pack may store a warranty status in a computer-readable storage device. The warranty status may be any type of data capable of representing a status. For example, the warranty status may be a binary flag that indicates whether the warranty has been voided. The warranty status may also be, for example, an enumerated type having a set of possible values, such as but not limited to, active, expired, and void.

As illustrated in FIG. 20, the warranty status is set based on a comparison of the recorded maximum and minimum values 2001-2006 to predefined warranty thresholds 2011-2016. For example, minimum recorded voltage 2001 is 1.6 V and minimum voltage threshold 2011 is 2.0 V. In this example, minimum recorded voltage 2001 is less than minimum voltage threshold 2011, and therefore the warranty is voided, as indicated at box 2021. This will be reflected in the warranty status and stored. In various embodiments, when the warranty is voided, an electronic communication may be generated and sent by the battery pack and/or system in which the battery pack is used to notify selected individuals that the warranty has been voided. The electronic communication may also include details regarding the conditions or use that caused the warranty to be voided.

FIG. 21 is a diagram illustrating example usage of a battery pack according to an embodiment. In addition to minimum and maximum data values being recorded, as described with respect to FIG. 20, usage frequency statistics may also be collected. For example, usage statistics may be recorded based on battery voltage measurements, battery temperature measurements, and charge/discharge current measurements.

In an embodiment, one or more ranges of values may be defined for each type of recorded data. In the example illustrated in FIG. 21, defined ranges for measured voltage are 2.0 V-2.2 V, 2.2 V-2.4 V, 2.4 V-2.6 V, 2.6 V-2.8 V, 2.8 V-3.0 V, 3.0 V-3.2 V, 3.2 V-3.3 V, 3.3 V-3.4 V, 3.4 V-3.5 V, 3.5 V to 3.6 V, and 3.6 V-3.7 V. These ranges may be common for lithium-ion batteries, for example, in order to capture typical voltages associated with such batteries. Each defined range may be associated with a counter. In an embodiment, each counter is stored in a computer-readable storage device within a battery pack. In other embodiments, counters may be stored external to a battery pack, for example in a string controller, an array controller, or a system controller (e.g., see FIG. 5A). This may allow for further aggregation of usage statistics across multiple battery packs.

In an embodiment, voltage measurements may be taken periodically. When a measured value falls within a defined range, the associated counter may be incremented. The value of each counter then represents the frequency of measurements falling within the associated range of values. Frequency statistics may then be used to create a histogram displaying the distribution of usage measurements for the life of a battery pack, or during a period of time. Likewise, frequency statistics may be recorded for other measured or calculated data, such as but not limited to, battery temperature measurements and charge/discharge current measurements.

For example, battery usage 2102 represents the distribution of voltage measurements taken during the life of a battery pack. Battery usage 2102 may indicate ordinary or proper usage of a battery pack, having the highest frequency of measurements between 3.0 V and 3.2 V. In contrast, battery usage 2104 may indicate more unfavorable usage.

Histograms, such as those displayed in FIG. 21, may be useful to a manufacturer or seller in determining the extent of improper or uncovered usage of a battery pack. In an embodiment, the distribution data may also be used for analysis and diagnosis of battery pack defects and warranty claims.

FIG. 22 is a diagram illustrating an example warranty tracker according to an embodiment. Warranty tracker 2210 includes a processor 2212, a memory 2214, a battery voltage measurement circuit 2216, and a battery temperature measurement circuit 2218. The battery voltage measurement circuit 2216 and the battery temperature measurement circuit 2218 may be implemented as a single circuit or as separate circuits disposed on a printed circuit board. In some embodiments, such as those detailed above, each battery module disposed in a battery pack may be coupled to a battery module controller that includes a battery voltage measurement circuitry as well as battery temperature measurement circuitry. In these embodiments, the processor 2212 and memory 2214 of example warranty tracker 2210 may part of or implemented within a battery pack controller, such as battery pack controller 800 of FIG. 8. For example, warranty tracker may be implemented as executable code stored in memory 814, which is executed by MCU 812 of battery pack controller 800 to perform the warranty tracker's functions.

In various embodiments, voltage may be measured as an aggregate voltage or average voltage of the battery cells or battery modules contained within the battery pack. Battery temperature measurement circuit 2218 may include one or more temperature sensors to periodically measure battery cell temperatures or battery module temperatures within the battery pack and send an aggregate or average temperature measurement to processor 2212.

In an embodiment, processor 2212 also receives periodic electric current measurements from battery current measurement circuit 2222. Battery current measurement circuit 2222 may be external to warranty tracker 2210. For example, battery current measurement circuit 2222 may reside within string controller 2220 (e.g., string controller 1100 of FIG. 11). In another embodiment, battery current measurement circuit 2222 may be part of warranty tracker 2210.

Processor 2212 may compute warranty values based on received voltage, temperature, and electric current measurements. In an embodiment, each warranty value represents battery usage at the time the received measurements were recorded. Once received, measurements may be converted to associated factors for use in calculating a warranty value. For example, a voltage measurement received from battery voltage measurement circuit 2216 may be converted to a corresponding voltage factor as described with respect to FIG. 19. Similarly, received temperature measurements and electric current measurements may be converted to corresponding temperature and current factors as described with respect to FIGS. 17 and 18.

In an embodiment, processor 2212 may calculate a warranty value by multiplying the voltage factor, temperature factor, and current factor together. For example, the current factor may be 0 when a battery pack is neither charging nor discharging. The calculated warranty value will therefore also be 0, indicating that no usage is occurring. In another example, when battery temperature and voltage are at optimal levels, the corresponding temperature and voltage factors may be 1. The calculated warranty value will then be equal to the current factor corresponding to the measured electric current. When all factors are greater than zero, the warranty value indicates battery usage based on each of the voltage, temperature, and electric current measurements.

As described previously, additional measured or calculated data may also be used in the calculation of a warranty value. A warranty value may also be calculated based on any combination voltage, temperature, and current factors, according to an embodiment.

While a warranty value represents battery usage at a point in time, a warranty for a battery pack is based on battery usage for the life of the battery pack (which may be defined by the manufacturer of the battery pack). In an embodiment, memory 2214 stores a cumulative warranty value that represents battery usage over the life of the battery pack. Each time a warranty value is calculated, processor 2212 may add the warranty value to the cumulative warranty value stored in memory 2214. The cumulative warranty value may then be used to determine whether the battery pack warranty is active or expired.

FIG. 23 is an example method for calculating and storing a cumulative warranty value according to an embodiment. Each stage of the example method may represent a computer-readable instruction stored on a computer-readable storage device, which when executed by a processor causes the processor to perform one or more operations.

Method 2300 begins at stage 2304 by measuring battery cell voltages within a battery pack. In an embodiment, battery cell voltage measurements for different battery cells or battery modules may be aggregated or averaged across a battery pack. At stage 2306, battery cell temperatures may be measured. In an embodiment, battery cell temperature measurements for different battery cells or battery modules may be aggregated or averaged across a battery pack. At stage 2308, an electric charge/discharge current measurement may be received. Stages 2304, 2306, and 2308 may be performed concurrently or in any order.

At stage 2310, a warranty value is calculated using the measured battery voltage, measured battery temperature, and received electric current measurement. In an embodiment, each warranty value represents battery usage at the time the measurements were recorded. Once received, measurements may be converted to associated factors for use in calculating a warranty value. For example, a voltage measurement may be converted to a corresponding voltage factor as described with respect to FIG. 19. Similarly, temperature measurements and received electric current measurements may be converted to corresponding temperature and current factors as described with respect to FIGS. 17 and 18.

In an embodiment, a warranty value may be calculated by multiplying the voltage factor, temperature factor, and current factor together. For example, the current factor may be 0 when a battery pack is neither charging nor discharging. The calculated warranty value will therefore also be 0, indicating that no usage is occurring. In another example, when battery temperature and voltage are at optimal levels, the corresponding temperature and voltage factors may be 1. The calculated warranty value will then be equal to the current factor corresponding to the measured electric current. When all factors are greater than zero, the warranty value indicates battery usage based on each of the voltage, temperature, and electric current measurements.

As described previously, additional measured or calculated data may also be used in the calculation of a warranty value. A warranty value may also be calculated based on any combination voltage, temperature, and current factors, according to an embodiment.

At stage 2312, the calculated warranty value is added to a stored cumulative warranty value. In an embodiment the cumulative warranty value may be stored within the battery pack. In other embodiments, the cumulative warranty value may be stored external to the battery pack. The cumulative warranty value may then be used to determine whether the battery pack warranty is active or expired, as will be discussed further with respect to FIGS. 24 and 25.

FIG. 24 is an example method for using a warranty tracker according to an embodiment. FIG. 24 may be performed by a computer or a human operator at an energy management system, such as energy management system 360 of FIG. 3. FIG. 24 begins at stage 2402 when a warning or alert is received indicating that a battery pack has an operating issue or is otherwise defective. In an embodiment, the alert may be issued as an email or other electronic communication to an operator responsible for monitoring the battery pack. In other embodiments, warnings or alerts may be audial or visual alerts, for example, a flashing red light on the defective battery pack, such as the warnings described above with respect to status button 608 of FIGS. 6A and 6B.

At stage 2404, the cumulative warranty value stored in the defective battery pack is compared to a predefined threshold value. This threshold value may be set to provide a certain warranty period based on normal usage of the battery pack. For example, the threshold may be set such that a battery pack may be covered under warranty for 10 years based on normal usage. In this manner, aggressive usage of the battery pack may reduce the active warranty period for the battery pack.

At stage 2406, it is determined whether the stored cumulative warranty value exceeds the predefined threshold value. If the stored cumulative value exceeds the predefined threshold value, method 2400 proceeds to stage 2408. At stage 2408, the warranty for the battery pack is determined to be expired. If the stored cumulative value does not exceed the threshold value, the method ends, indicating that the battery pack warranty has not expired.

FIG. 25 is a diagram illustrating an example battery pack and associated warranty information according to an embodiment. When a battery pack is reported to be defective, analysis of warranty information may be conducted. As illustrated in FIG. 25, battery pack 2504 resides in an electrical storage unit 2502, similar to that of electrical storage unit 502 of FIGS. 5A and 5B. In response to an alert that battery pack 2504 has an operating issue, battery pack 2504 may be removed from electrical storage unit 2502 for analysis.

In an embodiment, battery pack 2504 may be connected to a computing device with display 2506. In this manner, the battery pack operator, seller, or manufacturer may be able to view various warranty information and status in order to determine which party is financially responsible for repairing battery pack 2504. In the example illustrated in FIG. 25, a warranty threshold value may be set to 500,000,000, and the cumulative warranty value of the battery pack is 500,000,049. Because the cumulative warranty value exceeds the warranty threshold, the battery pack warranty is determined to be expired, and the battery pack operator or owner should be financially responsible for repairs.

In an embodiment, warranty information for battery pack 2504 may be viewed without physically removing battery pack 2504 from electrical storage unit 2502. For example, stored warranty information may be sent via accessible networks to a device external to battery pack 2504 for analysis.

Example Detection of a Battery Pack Having an Operating Issue or Defect

FIG. 26 is a diagram illustrating example distributions of battery packs based, for example, on self-discharge rates and charge times, according to an embodiment. Plot 2602 shows an example distribution of battery packs based on the self-discharge rate 2606 of each battery pack over a period of time. Axis 2604 indicates the number of battery packs having a particular self-discharge rate. Plot 2602 indicates a normal distribution, with some battery packs having higher or lower self-discharge.

Plot 2608 shows an analogous distribution of battery packs based on the charge time 2610 of each battery pack. In an embodiment, a timer may track the operating time of a balancing charger, such as balancing charger 632 of FIG. 6C, to determine the charge time of a battery pack during a period of time. Axis 2612 indicates the number of battery packs having similar charge times during a period of time.

As illustrated in FIG. 26, the self-discharge rate and charge time of a battery pack are expected to be similar. In an embodiment, data may be gathered for a plurality of battery packs during a period of time in order to determine battery distributions 2602 and 2608. The mean charge time of the plurality of battery packs may provide a reliable indication of the expected charge time for a healthy battery pack, e.g., a battery pack that is operating within accepted tolerances. From these distributions, a maximum expected variance 2614 above the mean charge time may be chosen. For example, maximum variance 2614 may be set to two standard deviations from the mean charge time of the plurality of battery packs. In an embodiment, a charge time that exceeds maximum variance 2614 may indicate a battery pack having an operating issue or defect. One of skill in the art will recognize that maximum variance 2614 may be any value above the expected charge time of a battery pack and may be static or updated dynamically as additional data is gathered.

FIG. 27 is a diagram illustrating correlation between temperature and charge time of a battery pack (such as battery pack 600 of FIGS. 6A-6D), according to an embodiment. Plot 2702 shows an example distribution of battery packs based on the charge time 2706 of each battery pack. Axis 2704 indicates the number of battery packs having similar charge times during a period of time. As illustrated in FIG. 27, plot 2702 represents the battery distribution based on a consistent battery temperature of 20° C. for each of the battery packs. In an embodiment, the battery temperature may be, for example, an average temperature of each battery cell or each battery module contained within a battery pack.

Temperature has a significant effect on the performance of a battery pack. For example, higher temperatures may increase the rate of self-discharge of a battery. In a non-limiting example, a battery pack may self-discharge 2% per month at a constant 20° C. and increase to 10% per month at a constant 30° C. Plot 710 shows the distribution of battery packs based on charge time 2706 with each battery pack having a temperature of 30° C. At 30° C., the charge times of each battery pack maintain a normal distribution, but the mean and expected charge time is shifted.

Because of distribution shifts at different temperatures, maximum variance 2708 may be updated to compensate for temperature fluctuations. In an embodiment, one or more temperature sensors may monitor the average battery cell or battery module temperature of a battery pack. The temperature sensors may be internal or external to the battery pack. Maximum variance 2708 may then be adjusted dynamically in response to temperature changes. For example, if the average battery module temperature of a battery pack is determined to be 30° C., the maximum expected variance may be adjusted to maximum variance 2712. This may prevent replacement of healthy battery packs, for example, when charge time of a battery pack falls between maximum variance 2708 and maximum variance 2712 at a temperature of 30° C. In other embodiments, environmental temperature may be monitored instead of or in combination with battery module temperatures, and maximum variance 2708 may be adjusted dynamically in response to environmental temperature changes.

FIG. 28 is a diagram illustrating an example system for detecting a battery pack having an operating issue or defect, according to an embodiment. In an embodiment, system 2800 includes a battery pack 2802 and an analyzer 2808. As should be apparent to a person of skill in the art, the detection techniques disclosed below may be implemented and used in the systems and methods described above. Battery pack 2802 may include a balancing charger 2804, such as balancing charger 632 of FIG. 6C, and a timer 2806. Battery pack 2802 may be coupled to an electrical power grid 2810. This enables balancing charger 2804 to be turned on and off when appropriate to charge the cells of battery pack 2802.

In an embodiment, timer 2806 records the amount of time that balancing charger 2804 is operating. Timer 2806 may be embedded in the battery pack as part of a battery pack controller, such as battery pack controller 800 of FIG. 8. Alternatively, timer 2806 may be separate from the battery pack controller. In an embodiment, timer 2806 may be reset after a certain period of time or at particular intervals of time. For example, timer 2806 may be reset on the first of each month in order to record the amount of time balancing charger 2804 operates during the month. Alternatively, timer 2806 may maintain a cumulative operating time or the time the charger operated during a specified period of time, for example, the last 30 days.

In an embodiment, timer 2806 may periodically send recorded operating times to analyzer 2808. In an embodiment, analyzer 2808 may be a part of battery pack 2802. For example, analyzer 2808 may be integrated into a battery pack controller of battery pack 2802, such as battery pack controller 800 of FIG. 8. In other embodiments, analyzer 2808 may be external to battery pack 2802 and may be implemented on any computing system. In an embodiment where battery pack 2802 is part of BESS, such as BESS 502 of FIGS. 5A and 5B, analyzer 2808 may be part of a string controller, array controller, or system controller as described with respect to FIG. 5A.

In an embodiment, analyzer 2808 may select a time period and compare recorded operating times for the selected time period to a threshold time. The threshold time may indicate a maximum determined variance from the expected operating time of balancing charger 2806. The expected operating time may represent the expected charge time of the battery pack for the selected time period, taking into account factors such as, but not limited to, battery usage and self-discharge rate. Analyzer 2808 may set expected operating times and threshold times based on statistical analysis of data collected from a plurality of battery packs and may be adjusted as additional data is collected. If battery pack 2802 is part of an array of battery packs, expected and threshold operating times may be determined based on analysis of all or a subset of battery packs in the array. Additionally, in an embodiment, the threshold time may be dynamically adjusted based on the average battery cell or battery module temperature of the battery back or the environmental temperature surrounding the battery pack, as described with respect to FIG. 27. In an embodiment, one or more temperature sensors may monitor the battery pack temperature or environmental temperature and provide measurements to analyzer 2808. Analyzer 2808 may then use the received temperature measurements to adjust the threshold time.

In an embodiment, if the recorded operating time exceeds the threshold time, analyzer 2808 may determine that the battery pack has an operating issue or defect and may require maintenance and/or replacement. In this case, analyzer 2808 may issue an alert to an appropriate party, such as an operator responsible for monitoring the battery pack. In an embodiment, the alert may be issued as an email or other electronic communication. In other embodiments, the issued alert may be audial or visual, for example a flashing red light on the battery pack, such as the warnings described above with respect to status button 608 of FIGS. 6A and 6B.

In an embodiment, analyzer 2808 may also halt operation of the battery pack in response to determining that the battery pack has an operating issue or defect. This may act as a mechanism to preclude any adverse effects that may occur from operating a battery pack having an operating issue or defect.

FIG. 29 is a diagram illustrating aggregation of data for analysis from an array of battery packs, according to an embodiment. As explained, an energy system, such as electrical storage unit 502 of FIG. 5A, comprises a plurality of battery packs 2902. Each battery pack 2902 may include a timer to record the amount of time that the battery pack is charging. The recorded times may be stored in each battery pack, as shown at 2904. In an embodiment, each timer may be integrated into a battery pack controller of each battery pack, such as battery pack controller 800 of FIG. 8, comprising a processor and a memory to store the recorded time.

In an embodiment, recorded times for each battery pack may be aggregated by one or more string controllers (such as string controller 504 of FIG. 5A), as indicated at 2906, and/or by an array controller (such as array controller 508 of FIG. 5A) and/or by a system controller (such as system controller 512 of FIG. 5A) as indicated at 2908. As illustrated in FIG. 29, each string controller may manage a subset of the plurality of battery packs.

In an embodiment, the aggregated recorded times may be sent by the one or more string controllers or the array or system controller to one or more analyzers 2910, such as analyzer 2808 of FIG. 28. Analyzer 2910 may collect various data about the plurality of battery packs in an effort to detect and identify battery packs having an operating issue or defect, as described with respect to FIG. 28. In an embodiment, an analyzer 2910 may be part of each string controller and/or the array or system controller. In this manner, analysis may be localized based on groupings of battery packs, or conducted for an entire system. In an embodiment, analyzer 2910 may be external to the plurality of battery packs, string controllers, array controller, and system controller.

FIG. 30 is a flowchart illustrating an example method for detecting a battery pack having an operating issue or defect according to an embodiment. Each stage of the example method may represent a computer-readable instruction stored on a computer-readable storage device, which when executed by a processor causes the processor to perform one or more operations.

Method 3000 begins at stage 3002 by recording the amount of time that a balancing charger is operating. The balancing charger may be part of the battery pack, such as balancing charger 632 of FIG. 6C, and configured to charge the cells of the battery pack.

At stage 3004, the recorded operating time for a particular time period is compared to a threshold time. The threshold time may indicate a maximum determined variance from the expected operating time of the balancing charger. The expected operating time may represent the expected charge time of the battery pack for the time period, taking into account factors such as, but not limited to, battery usage and self-discharge rate.

At stage 3006, it is determined whether the recorded operating time exceeds the threshold time. This may indicate that the battery pack is charging longer than expected and may require maintenance and/or replacement. At stage 3008, if the recorded operating time exceeds the threshold time, an alert may be provided to an appropriate party, such as a computer or a human operator responsible for monitoring the battery pack (e.g., at energy management system 360 of FIG. 3). In an embodiment, the alert may be issued as an email or other electronic communication. In other embodiments, the issued alert may be audial or visual, for example a red light on the battery pack. Returning to stage 3006, if the recorded operating time does not exceed the threshold time, the method ends.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. Also, Identifiers, such as "(a)," "(b)," "(i)," "(ii)," etc., are sometimes used for different elements or steps. These identifiers are used for clarity and do not necessarily designate an order for the elements or steps.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described embodiments, but should be defined only in accordance with the following claims and their equivalents.

What is claimed is:

1. A battery energy storage system comprising:
 a plurality of battery packs;
 a string controller coupled to the plurality of battery packs and configured to control charging and discharging of the plurality of battery packs via a power control system that is external to the battery energy storage system; and
 an array controller coupled to the string controller and configured to instruct the string controller to charge or discharge the plurality of battery packs via a first communication bus,
 wherein the array controller is coupled to a system controller that comprises a communication interface that is configured to couple to a communications network.

2. A battery energy storage system of claim 1, further comprising:
 another plurality of battery packs;
 another string controller coupled to the another plurality of battery packs and configured to control charging and discharging of the another plurality of battery packs via the power control system,
 wherein the array controller is coupled to the another string controller and is further configured to instruct the another string controller to charge or discharge the another plurality of battery packs via the first communication bus.

3. The battery energy storage system of claim 1, wherein the first communication bus is a control area network (CAN) bus.

4. The battery energy storage system of claim 1, wherein the system controller is further configured to encrypt communications transmitted over the communications network.

5. The battery energy storage system of claim 1, wherein the system controller is further configured to receive instructions over the communications network and instruct the array controller to charge or discharge the plurality of battery packs in response to receiving the instructions.

6. The battery energy storage system of claim 1, wherein the system controller is further configured to transmit a status report of the battery energy storage system over the communications network.

7. The battery energy storage system of claim 1, wherein the plurality of battery packs are vertically stacked.

8. The battery energy storage system of claim 1, wherein the plurality of battery packs are connected in series to form a string of battery packs.

9. The battery energy storage system of claim 7, wherein the string controller is coupled to a terminal of a first battery pack and a terminal of a last battery pack of the string of battery packs.

10. The battery energy storage system of claim 7, wherein the string controller comprises a ground fault detection system that is coupled to a middle battery pack of the string of battery packs.

11. The battery energy storage system of claim 1, wherein the string controller comprises a controller that is configured to monitor current of the plurality of battery packs.

12. A battery energy storage system comprising:
 a battery pack array comprising n battery pack strings, wherein each battery pack string comprises m battery packs connected in series;
 n string controllers, wherein each string control box is coupled to one of the n battery pack strings and configured to control charging and discharging of the m battery packs; and
 an array controller configured to instruct the n string controllers to charge or discharge each of the m battery packs via control area network (CAN) bus, wherein n is greater than or equal to 2 and m is greater than 2,
 wherein the array controller is coupled to a system controller that comprises a communication interface that is configured to couple to a communications network, and is further configured to receive instructions over the communications network and instruct the n string controllers to charge or discharge each of the m battery packs in response to receiving the instructions.

13. The battery energy storage system of claim 12, further comprising an enclosure housing the battery pack array, n string controllers, and the array controller.

14. The battery energy storage system of claim 13, wherein an exterior of the enclosure is configured to support a power converter.

15. The battery energy storage system of claim 12, wherein, for each of the n battery pack strings, the m battery packs are vertically stacked on server racks.

16. The battery energy storage system of claim 12, wherein each of the n string controllers are coupled to a terminal of a first battery pack and a terminal of a last battery pack of the m battery packs.

17. The battery energy storage system of claim 16, wherein each of the n string controllers comprise a power interface that is configured to couple to a power control system, and are further configured to charge or discharge the m battery packs via the power control system.

18. The battery energy storage system of claim 16, wherein each of the n string controllers comprises a ground fault detection system coupled to a middle battery pack of the m battery packs.

* * * * *